(12) United States Patent
Moon et al.

(10) Patent No.: US 11,003,222 B2
(45) Date of Patent: May 11, 2021

(54) ELECTRONIC DEVICE COMPRISING MULTIPLE DISPLAYS

(71) Applicant: Samsung Electronics Co., Ltd., Gyeonggi-do (KR)

(72) Inventors: Hee-Cheul Moon, Gyeonggi-do (KR); Gyeong-Tae Kim, Gyeonggi-do (KR); Gi-Dae Kim, Seoul (KR); Young-Sun Park, Gyeonggi-do (KR); Sun-Keun Cho, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/313,408

(22) PCT Filed: Jun. 16, 2017

(86) PCT No.: PCT/KR2017/006294
§ 371 (c)(1),
(2) Date: Dec. 26, 2018

(87) PCT Pub. No.: WO2017/222243
PCT Pub. Date: Dec. 28, 2017

(65) Prior Publication Data
US 2019/0163241 A1 May 30, 2019

(30) Foreign Application Priority Data
Jun. 24, 2016 (KR) .......................... 10-2016-0079501

(51) Int. Cl.
*G06F 1/16* (2006.01)
*G06F 3/0488* (2013.01)
(Continued)

(52) U.S. Cl.
CPC .......... *G06F 1/1681* (2013.01); *G06F 1/1605* (2013.01); *G06F 1/1618* (2013.01);
(Continued)

(58) Field of Classification Search
CPC ............................. G06F 1/1618; G06F 1/1641
See application file for complete search history.

(56) References Cited

U.S. PATENT DOCUMENTS 9,173,288 B1   10/2015  Kim
2012/0147535 A1*  6/2012  Ahn ...................... G06F 1/1641
                                                361/679.01
(Continued)

FOREIGN PATENT DOCUMENTS

EP    2 426 573    3/2012
EP    2 669 759    12/2013
(Continued)

OTHER PUBLICATIONS

European Search Report dated Jun. 4, 2019 issued in counterpart application No. 17815656.8-1221, 13 pages.
(Continued)

*Primary Examiner* — Roy P Rabindranath
(74) *Attorney, Agent, or Firm* — The Farrell Law Firm, P.C.

(57) ABSTRACT

An electronic device is provided that includes a first housing including a first touchscreen display; a second housing including a second touchscreen display and rotatably coupled with the first housing; and a hinge structure provided between the first housing and the second housing and coupling the first housing and the second housing so as to be rotatable about each other, wherein a first side surface of the first touchscreen display positioned adjacent to the hinge structure is formed of a curved surface, and a second side surface of the second touchscreen display positioned adjacent to the hinge structure is formed of a curved surface and faces the first side surface of the first touchscreen display. The electronic device can be variously implemented according to examples.

14 Claims, 50 Drawing Sheets

(51) Int. Cl.
  *H04M 1/02*  (2006.01)
  *G06F 3/041*  (2006.01)
  *H04M 1/03*  (2006.01)
(52) U.S. Cl.
  CPC .......... *G06F 1/1641* (2013.01); *G06F 1/1647* (2013.01); *G06F 1/1652* (2013.01); *G06F 1/1688* (2013.01); *G06F 3/041* (2013.01); *G06F 3/0488* (2013.01); *H04M 1/022* (2013.01); *G06F 2203/04102* (2013.01); *H04M 1/0268* (2013.01); *H04M 1/03* (2013.01); *H04M 2250/16* (2013.01)

(56) References Cited

U.S. PATENT DOCUMENTS

| | | | |
|---|---|---|---|
| 2013/0083467 | A1 | 4/2013 | Becze |
| 2014/0101535 | A1* | 4/2014 | Kim .................. G06F 3/04886 715/234 |
| 2014/0101578 | A1 | 4/2014 | Kwak et al. |
| 2014/0282059 | A1 | 9/2014 | Oh et al. |
| 2015/0160698 | A1 | 6/2015 | Tsukamoto et al. |
| 2015/0220299 | A1* | 8/2015 | Kim ...................... G06F 3/0488 345/1.3 |
| 2015/0233162 | A1 | 8/2015 | Lee et al. |
| 2015/0241925 | A1 | 8/2015 | Seo et al. |
| 2015/0248149 | A1 | 9/2015 | Yamazaki et al. |
| 2018/0074553 | A1* | 3/2018 | Yamazaki ................ G09F 9/00 |

FOREIGN PATENT DOCUMENTS

| | | |
|---|---|---|
| JP | 2002064604 | 2/2002 |
| KR | 200465990 | 3/2013 |
| KR | 1020140046343 | 4/2014 |
| KR | 1020150096827 | 8/2015 |
| KR | 1020160027625 | 3/2016 |
| WO | WO 2017/213968 | 12/2017 |

OTHER PUBLICATIONS

PCT/ISA/210 Search Report issued on PCT/KR2017/006294 (pp. 5).

PCT/ISA/237 Written Opinion issued on PCT/KR2017/006294 (pp. 9).

* cited by examiner

ELECTRONIC DEVICE COMPRISING MULTIPLE DISPLAYS

CROSS-REFERENCE TO RELATED APPLICATION(S)

This application is a National Phase Entry of PCT International Application No. PCT/KR2017/006294, which was filed on Jun. 16, 2017, and claims priority to Korean Patent Application No. 10-2016-0079501, which was filed on Jun. 24, 2016, the contents of which are incorporated herein by reference.

BACKGROUND

1. Field

Various embodiments of the disclosure relates to electronic devices, e.g., electronic devices having multiple display devices hinged together to be foldable or unfoldable.

2. Description of the Related Art

The term "electronic device" may mean a device for performing a particular function according to its equipped programs, such as a home appliance, an electronic scheduler, a portable multimedia player, a mobile communication terminal, a tablet PC, a video/sound device, a desktop PC or laptop computer, a navigation system for an automobile, etc. For example, electronic devices may output stored information as voices or images. As electronic devices are highly integrated, and high-speed, high-volume wireless communication becomes commonplace, electronic devices, such as a mobile communication terminal, have recently been equipped with various functions. For example, electronic devices come with integrated functionality, including entertainment functions, such as playing video games, multimedia functions, such as replaying music/videos, communication and security functions for mobile banking, and scheduling or e-wallet functions. Such electronic devices have become compact enough for users to carry in a convenient way.

As mobile communication services extend up to multimedia service sectors, electronic devices require a larger display to allow users to satisfyingly use multimedia services in addition to voice call or text messaging services. This, however, trades off the trend of electronic devices being compact.

SUMMARY

An electronic device with two displays hinged together to enable a larger screen may be unfolded to display a single continuous image on the two displays, thus implementing a larger screen, and may be folded, leading to increased portability. However, the two displays may fail to implement fully seamless images due to a gap between the two displays.

For the two displays to pivot around each other, a physical space is required between the two displays. A user's body part (e.g., their finger) may be stuck in the space and thus may get hurt.

According to an embodiment, an electronic device, according to various embodiments, intends to reliably implement a single continuous image on the two displays even when the displays are in an unfolded position.

Further, an electronic device, according to various embodiments, may prevent the user's body part (e.g., their finger) from getting stuck in the space between the two displays and resultantly becoming injured.

According to various embodiments of the disclosure, an electronic device comprises a first housing including a first surface and a second surface facing away from the first surface, wherein the first surface includes a first touchscreen display, and wherein the first housing includes a first side portion and a second side portion on a first periphery, when viewed from above the first surface, a second housing including a third surface and a fourth surface facing away from the third surface, wherein the third surface includes a second touchscreen display, and wherein the second housing includes a third side portion and a fourth side portion on a second periphery extending adjacent to the first periphery, when viewed from above the third surface, a first hinge structure connected with the first side portion and the third side portion, a second hinge structure connected with the second side portion and the fourth side portion, at least one processor positioned in at least one of the first housing or the second housing and electrically connected with the first touchscreen display and/or the second touchscreen display via at least one of the first hinge structure or the second hinge structure, and a memory positioned in at least one of the first housing or the second housing and electrically connected with the processor, wherein the first hinge structure and the second hinge structure may allow the first housing and the second housing to rotate relative to each other between a first state and a second state, and wherein the first surface may face the third surface in the first state, and the second surface may face the fourth surface in the second state.

Further, according to various embodiments of the disclosure, an electronic device comprises a first housing including a first touchscreen display, a second housing including a second touchscreen display and rotatably coupled with the first housing, and a hinge structure provided between the first housing and the second housing and coupling the first housing and the second housing so as to be rotatable about each other, wherein a first side surface of the first touchscreen display positioned adjacent to the hinge structure may be formed of a curved surface, and a second side surface of the second touchscreen display positioned adjacent to the hinge structure may be formed of a curved surface and faces the first side surface of the first touchscreen display.

According to various embodiments of the disclosure, as the first side surfaces of the first and second touchscreen displays are made curved, the electronic device may minimize disconnections in the screen output on the first and second touchscreen displays compared to the conventional art, which implements continuous screens only with flat surfaces.

Further, the first side surfaces of the first and second touchscreen displays, since they are made curved, do not interfere with the rotation of the first and second touchscreen displays, thus eliminating the need for a space for rotation of the first and second touchscreen displays that would otherwise be required as per the conventional art. Therefore, according to various embodiments of the disclosure, as the first side surfaces of the first and second touchscreen displays are made curved, the electronic device may prevent the user's finger from getting stuck in the gap between the first and second touchscreen displays.

BRIEF DESCRIPTION OF THE DRAWINGS

FIG. 27b is an enlarged view of portion C1 of FIG. 27a;

Figure 1:
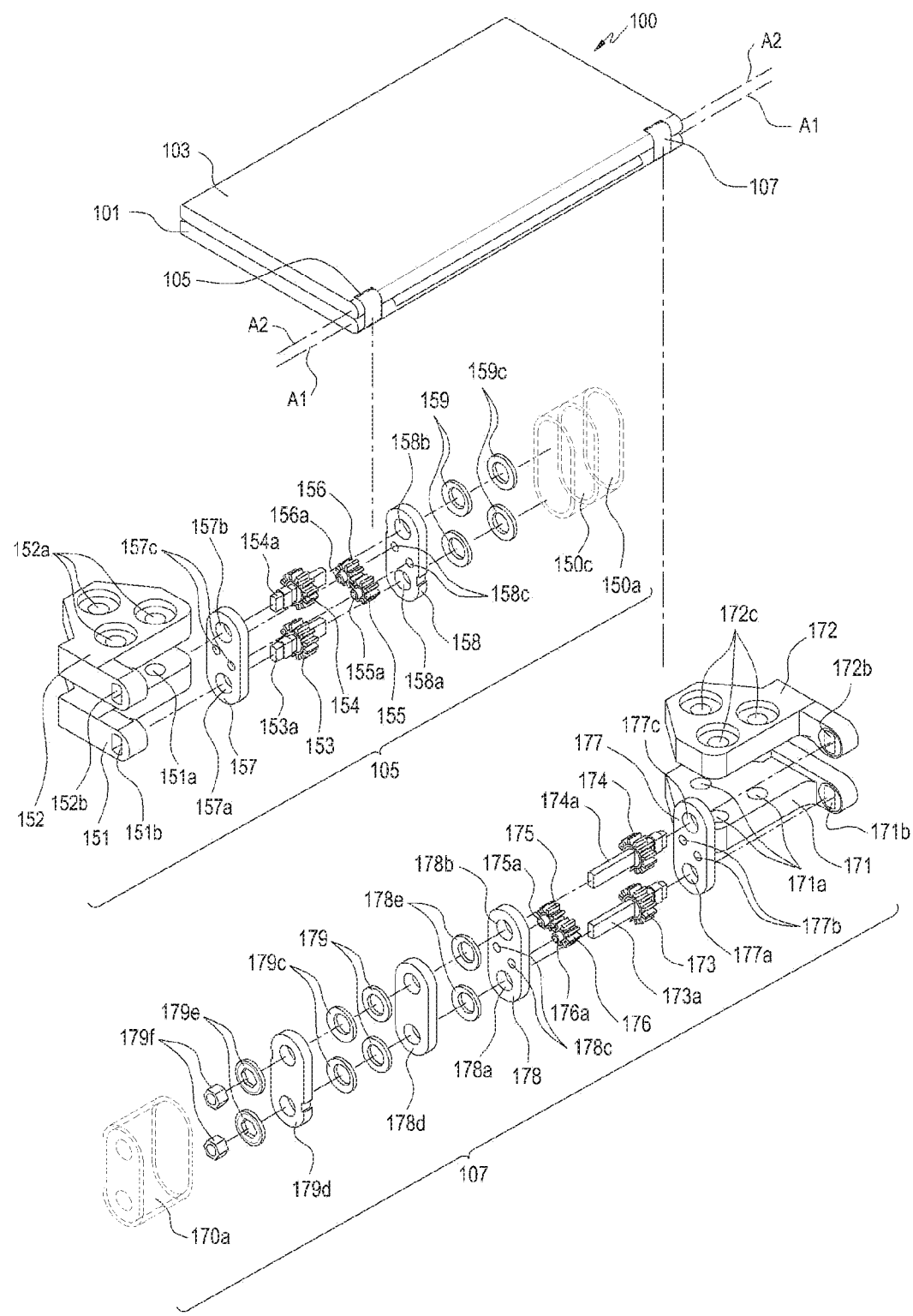
FIG. 1 is an exploded perspective view illustrating a hinge structure of an electronic device according to an embodiment of the disclosure.

| 100: electronic device | 101: first housing |
| 103: second housing | 105: first hinge structure |
| 107: second hinge structure | |

DETAILED DESCRIPTION

Hereinafter, various embodiments of the disclosure will be described with reference to the accompanying drawings. However, it should be understood that there is no intent to limit the disclosure to the particular forms disclosed herein; rather, the disclosure should be construed to cover various modifications, equivalents, and/or alternatives of embodiments of the disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

FIG. 1 is an enlarged perspective view illustrating a hinge structure of an electronic device according to an embodiment of the disclosure.

Referring to FIG. 1, according to an embodiment of the disclosure, an electronic device 100 may include a first housing 101, a second housing 103, and hinge structures 105 and 107. The hinge structures 105 and 107 may couple the first housing 101 and the second housing 103 to be rotatable about each other so that the second housing 103 opens or closes the first housing 101.

The hinge structures 105 and 107 may include a first hinge structure 105 and a second hinge structure 107 respectively provided at both ends of the first housing 101 and the second housing 103.

The first hinge structure 105 may include a first hinge connecting part 151, a first gear 153, a first idle gear 155, a second idle gear 156, a second gear 154, a second hinge connecting part 152, supports 157 and 158, and a hinge housing 150a.

The first hinge connecting part 151 may have a first coupling hole 151a to couple with the first housing 101 and may be coupled to the first housing 101 via a bolt (not shown). A thread may be formed on the inner surface of the first coupling hole 151a. The first hinge connecting part 151 may be coupled to the first housing 101 via a bolt. The first housing 101 may have a second coupling hole (not shown) corresponding to the first coupling hole 151a. Since a bolt is inserted into the first coupling hole 151a and the second coupling hole, the first hinge connecting part 151 may be coupled to the first housing 101.

The first hinge connecting part 151 may have a third coupling hole 151b into which a first gear shaft 153a of the first gear 153 is inserted. The first gear shaft 153a may be polygonal in shape, and the third coupling hole 151b may have a shape corresponding to the first gear shaft 153a. If the first gear shaft 153a is inserted and coupled into the third coupling hole 151b, the first gear 153 may be rotated along with the first hinge connecting part 151.

The first idle gear 155 may be rotatably engaged with the first gear 153. The second idle gear 156 may be rotatably engaged with the first idle gear 155. The second gear 154 may be rotatably engaged with the second idle gear 156.

The second hinge connecting part 152 may have a fourth coupling hole 152a to couple with the second housing 103 and may be coupled to the second housing 103 via a rivet (not shown). A thread may be formed on the inner surface of the fourth coupling hole 152a. The second hinge connecting part 152 may be coupled to the second housing 103 via a bolt. The second housing 103 may have a fifth coupling hole (not shown) corresponding to the fourth coupling hole 152a. Since a bolt is inserted into the fourth coupling hole 152a and the fifth coupling hole, the second hinge connecting part 152 may be coupled to the second housing 103.

The second hinge connecting part 152 may have a sixth coupling hole 152b into which the second gear shaft 154a of the second gear 154 is inserted. The second gear shaft 154a may be polygonal in shape, and the sixth coupling hole 152b may have a shape corresponding to the second gear shaft 154a. If the second gear shaft 154a is inserted and coupled into the sixth coupling hole 152b, the second gear 154 may be rotated along with the second hinge connecting part 152.

The supports 157 and 158 may include a first support 157 and a second support 158 that rotatably support the first and second gears 153 and 154 and the first idle gears 155 and 156. The first support 157 may have a plurality of first supporting holes 157a and 157b through which first ends of the first and second gear shafts 153a and 154a and first ends of the first and second idle gear shafts 155a and 156a of the first and second idle gears 155 and 156 are inserted. The second support 158 may have a plurality of second supporting holes 158a and 158b through which second ends of the first and second gear shafts 153a and 154a and second ends of the first and second idle gear shafts 155a and 156a of the first and second idle gears 155 and 156 are inserted.

The hinge housing 150a may receive the first and second gears 153 and 154, the first and second idle gears 155 and 156, and the supports 157 and 158.

According to an embodiment of the disclosure, the first hinge structure 105 of the electronic device 100 may further include an elastic member 159 to pressurize the second support 158 and a washer 159c contacting one surface of the elastic member 159.

The elastic member 159 may be received in the hinge housing 150a and may be passed through by the first and second gear shafts 153a and 154a to connect with the first and second gears 153 and 154. The elastic member 159 may be formed of a disc spring. The washer 159c may be received in the hinge housing 150a and may be passed through by the first and second gear shafts 153a and 154a to connect with the first and second gears 153 and 154. A wall 150c may be formed inside the hinge housing 150a. The washer 159c may be disposed between the wall 150c and the elastic member 159. The elastic member 159 may be supported by the wall 150c while pressurizing the second support 158.

The second hinge structure 107 may include a first hinge connecting part 171, a second hinge connecting part 172, a first gear 173, a second gear 174, a first idle gear 175, a second idle gear 176, supports 177 and 178, an elastic member 179, and a hinge housing 170a. The first hinge connecting part 171 may have a first coupling hole 171a and a third coupling hole 171b. The second hinge connecting part 172 may have a fourth coupling hole 172a and a sixth coupling hole 172b. The first gear 173 may include a first gear shaft 173a, and the second gear 174 may include a second gear shaft 174a. The first idle gear 175 may include a first idle gear shaft 175a, and the second idle gear 176 may include a second idle gear shaft 176a. The supports 177 and 178 may include a first support 177 and a second support 178. The first support 177 may have first supporting holes 177a and 177b, and the second support 178 may have second supporting holes 178a and 178b. Where components of the second hinge structure 107 are similar to components of the first hinge structure 105, no detailed description thereof is given, and the description focuses primarily on the elastic members 179 and 179c and the washer 178e.

The elastic members 179 and 179c may include a first elastic member 179 and a second elastic member 179c provided on one surface of the first elastic member 179, thereby increasing the elasticity to pressurize the second support 178 compared to the first hinge structure 105. A third support 178d may be provided between the first elastic member 179 and the second support 178. The washer 178e may be provided between the second support 178 and the third support 178d.

The second hinge structure 107 may include a fourth support 179d, a nut 179f, and a second washer 179e. The fourth support 179d may contact one surface of the second elastic member 179c. The nut 179f may be coupled to the first and second gear shafts 173a and 174a while contacting one surface of the fourth support 179d. The second ends of the first and second gear shafts 173a and 174a may be threaded to pressurize the fourth support 179d as the nut 179f is coupled along the thread. If the fourth support 179d is pressurized, the elastic members 179 and 179c may pressurize the second support 178 at further increased elasticity. The second washer 179e may be provided between the fourth support 179d and the nut 179f.

The first gear shaft 153a of the first hinge structure 105 and the first gear shaft 173a of the second hinge structure 107 may form a first imaginary axis A1, and the first housing 101 may have, and may rotate around, the first imaginary axis A1. The second gear shaft 154a of the first hinge structure 105 and the second gear shaft 174a of the second hinge structure 107 may form a second imaginary axis A2, and the second housing 103 may have, and may rotate around, the second imaginary axis A2. As the first housing 101 and the second housing 103 rotate around different hinge axes (e.g., the first imaginary axis A1 and the second imaginary axis A2), the second housing 103 may rotate about the first housing 101 at an angle from 0 degrees to 360 degrees. For ease of description, the angle from 0 degrees to 360 degrees may be the angle of the second housing 103 with respect to the first housing 101. For example, referring to FIG. 1, the angle between the first housing 101 and the second housing 103 may be defined as 0 degrees.

Figure 2:
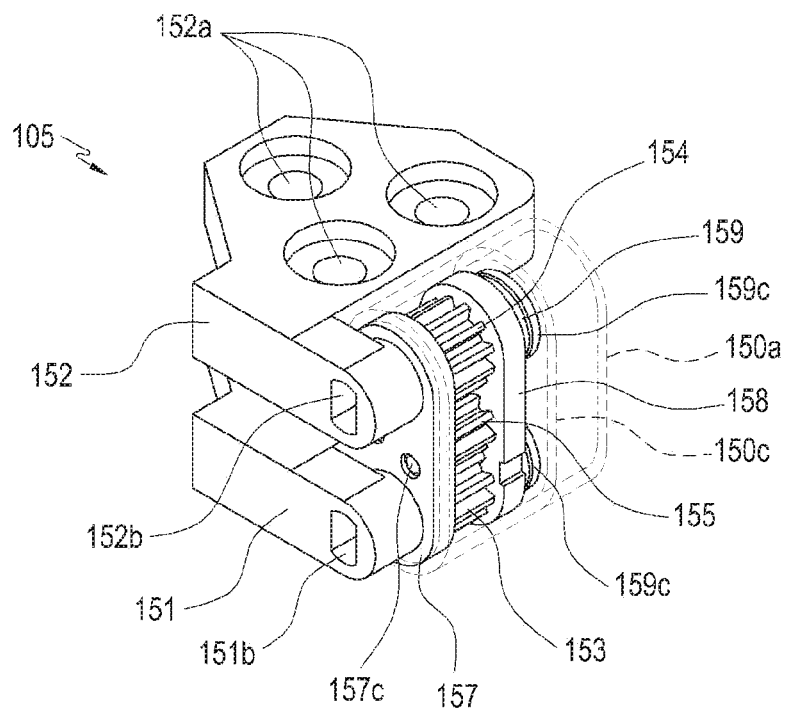
FIG. 2 is a perspective view illustrating a first hinge structure of an electronic device according to an embodiment of the disclosure.

FIG. 2 is a perspective view illustrating a first hinge structure of an electronic device according to an embodiment of the disclosure.

Referring to FIGS. 1 and 2, the first and second gears 153 and 154 and the first and second idle gears 155 and 156 may be rotated, engaged with each other between the first support 157 and the second support 158.

If the first hinge connecting part 151 is rotated along with the first gear 153, the first idle gear 155 engaged with the first gear 153 is rotated in the opposite direction of the first gear 153, the second idle gear 155 engaged with the first idle gear 155 is rotated in the same direction as the first gear 153, and the second gear 154 engaged with the second idle gear 155 may be rotated together with the second hinge connecting part 152 in the opposite direction of the first gear 153. In other words, the first hinge connecting part 151 may be rotated in the opposite direction of the second hinge connecting part 152.

Figure 3:
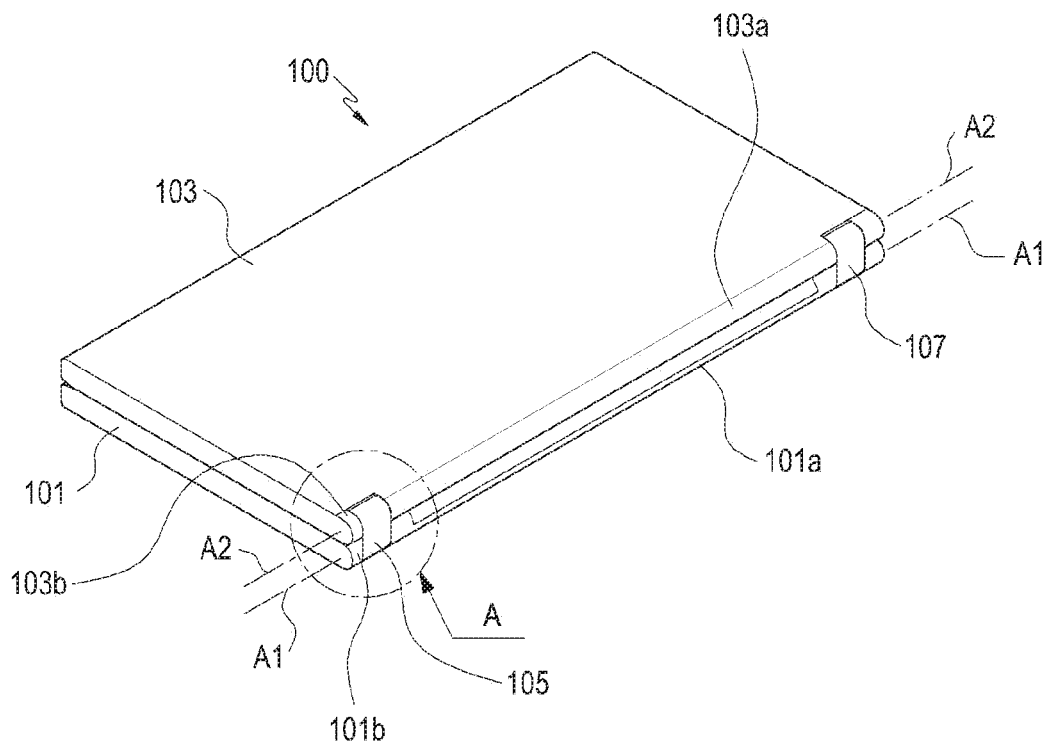
FIG. 3 is a perspective view illustrating an electronic device with a first hinge structure coupled between a first housing and a second housing, according to an embodiment of the disclosure.
Figure 4:
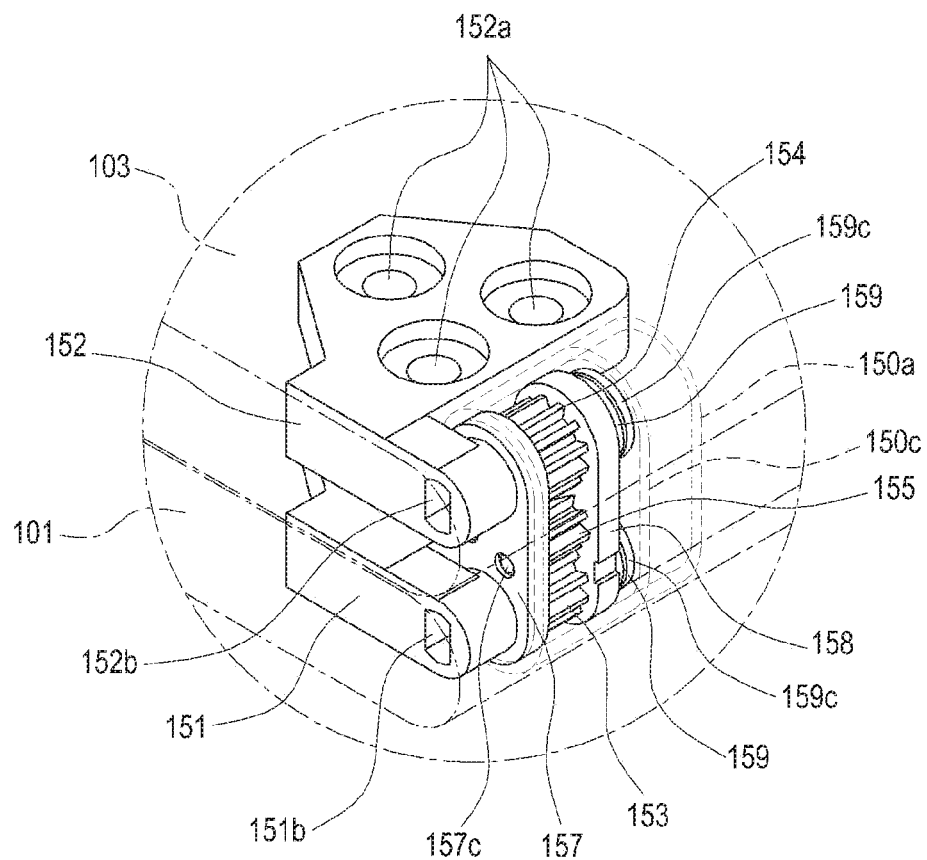
FIG. 4 is an enlarged view of portion A of FIG. 3.
Figure 5:
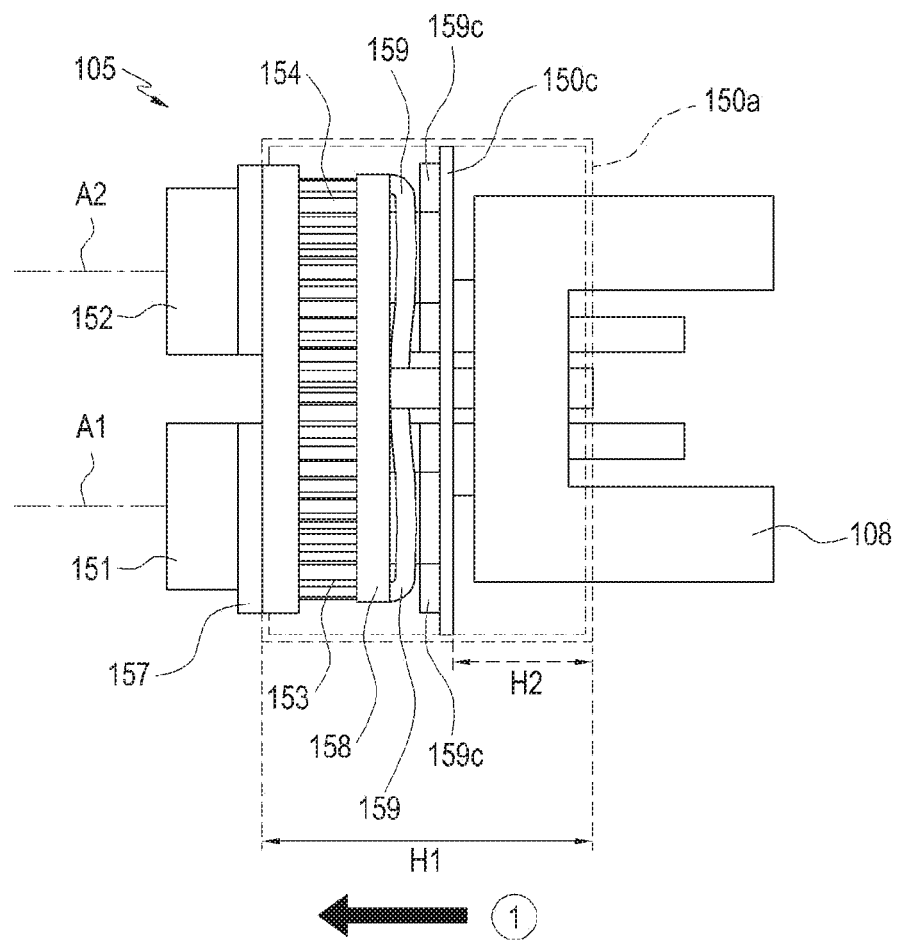
FIG. 5 is a cross-sectional view illustrating a first hinge structure of an electronic device according to an embodiment of the disclosure.

FIG. 3 is a perspective view illustrating an electronic device with a first hinge structure coupled between a first housing and a second housing, according to an embodiment of the disclosure. FIG. 4 is an enlarged view of portion A of FIG. 3. FIG. 5 is a cross-sectional view illustrating a first hinge structure of an electronic device according to an embodiment of the disclosure.

Referring to FIGS. 3 to 5, the first housing 101 may include a first side portion 101b at one end of a first periphery 110a, and the second housing 103 may include a third side portion 103b at one end of a second periphery 103a. The first hinge structure 105 may connect the first side portion 101b and the third side portion 103b.

The first housing 101 may be rotated together with the first hinge connecting part 151 as the first side portion 101b is coupled with the first hinge connecting part 151. The second housing 103 may be rotated together with the second hinge connecting part 152 as the third side portion 103b is coupled with the second hinge connecting part 152. As set forth above, the first hinge connecting part 151 may be rotated in the opposite direction of the second hinge connecting part 152 as it sequentially connects to the first gear 153, the first idle gear 155, the second idle gear 156, and the second gear 154.

The elastic member 159 may be supported by the wall 150c while providing an elastic force in a first direction ① towards the second support 158, thereby pressurizing the second support 158. As the elastic member 159 pressurizes the second support 158, the second support 158 may come into surface contact with the first and second gears 153 and 154 while restricting the rotation of the first and second gears 153 and 154. As the elastic member 159 restricts the rotation of the first and second gears 153 and 154, the rotation of the second housing 103 about the first housing 101 may be restricted.

According to an embodiment of the disclosure, the electronic device 100 may further include a flexible circuit board 108 to electrically connect the first housing 101 and the second housing 103 through the hinge case 150a. The hinge housing 150a in the first hinge structure may have a first width h1 along the lengthwise direction. A second width H2, which is part of the first width H1, may correspond to the length of the flexible circuit board 108 received in the hinge housing 150a. The flexible circuit board 108 is described below.

Figure 6:
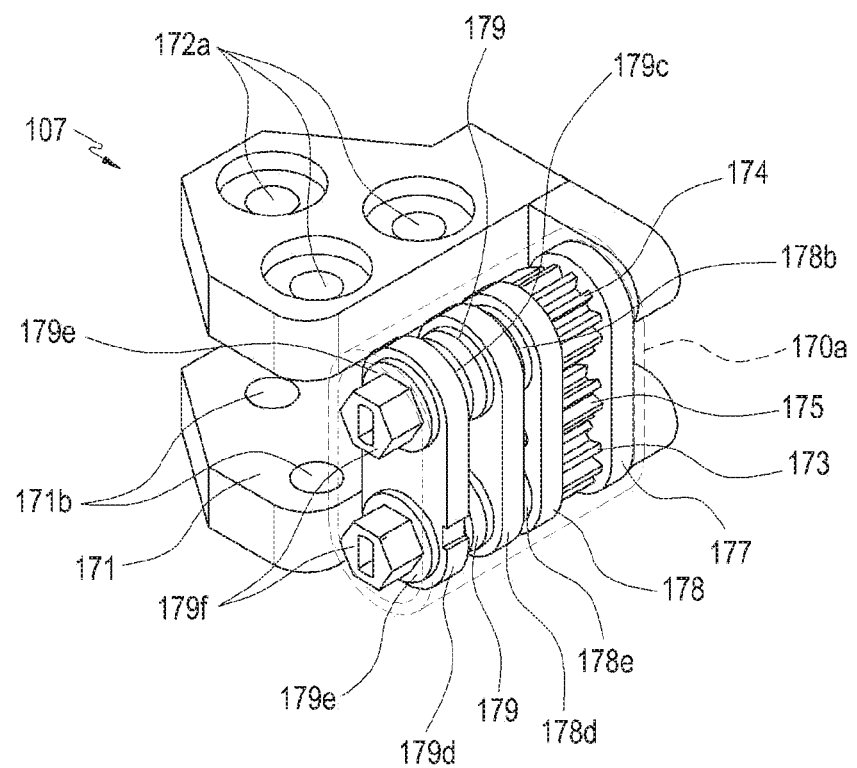
FIG. 6 is a perspective view illustrating a second hinge structure of an electronic device according to an embodiment of the disclosure.

FIG. 6 is a perspective view illustrating a second hinge structure of an electronic device according to an embodiment of the disclosure.

Referring to FIGS. 1 and 6, the first and second gears 173 and 174 and the first and second idle gears 175 and 176 may be rotated, engaged with each other between the first support 177 and the second support 178.

If the first hinge connecting part 171 is rotated along with the first gear 173, the first idle gear 175 engaged with the first gear 153 is rotated in the opposite direction of the first gear 173, the second idle gear 175 engaged with the first idle gear 175 is rotated in the same direction as the first gear 173, and the second gear 174 engaged with the second idle gear 175 may be rotated together with the second hinge connecting part 172 in the opposite direction of the first gear 173. In other words, the first hinge connecting part 171 may be rotated in the opposite direction of the second hinge connecting part 172.

Figure 7:
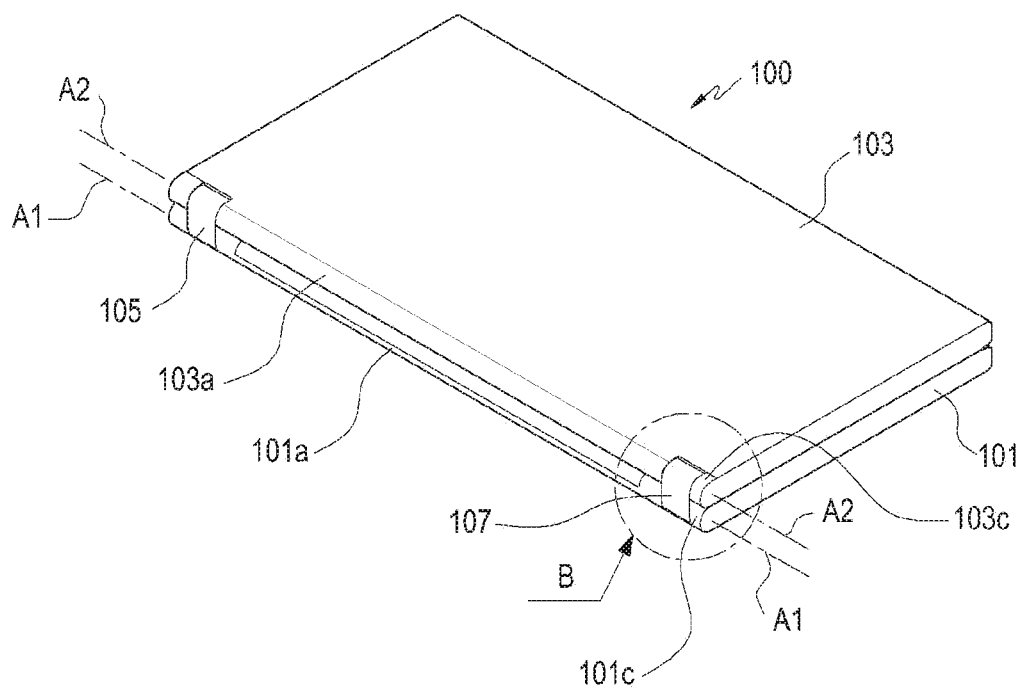
FIG. 7 is a perspective view illustrating an electronic device with a second hinge structure coupled between a first housing and a second housing, according to an embodiment of the disclosure.
Figure 8:
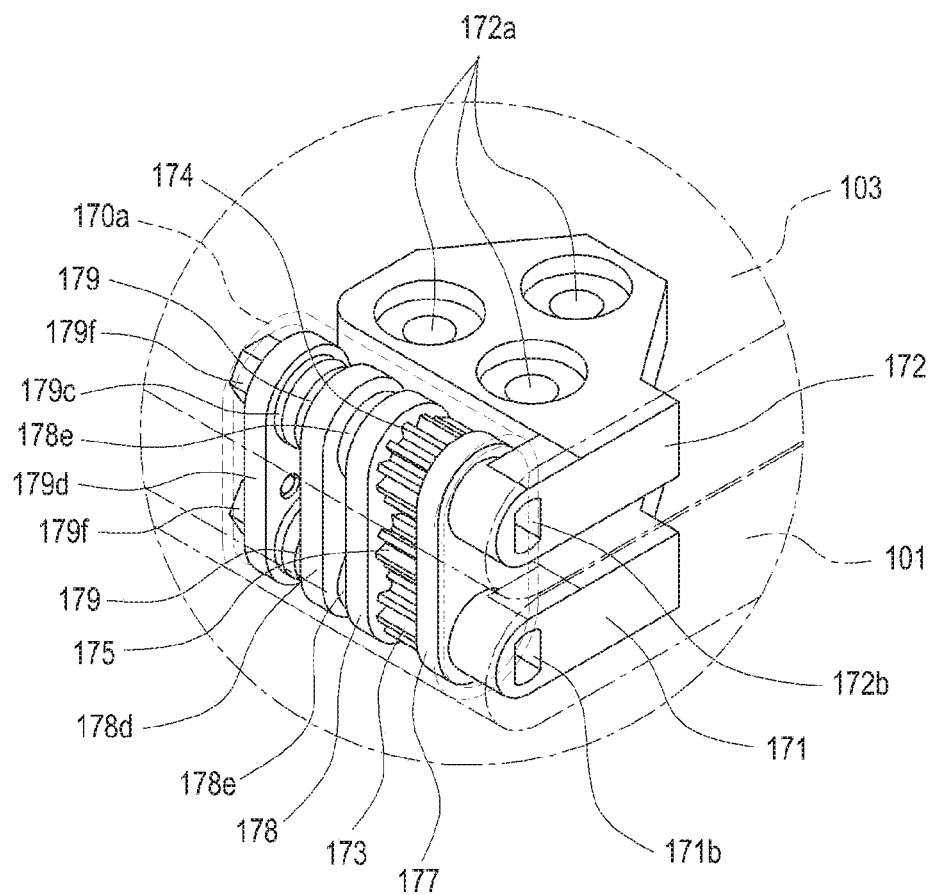
FIG. 8 is an enlarged view of portion B of FIG. 7.
Figure 9:
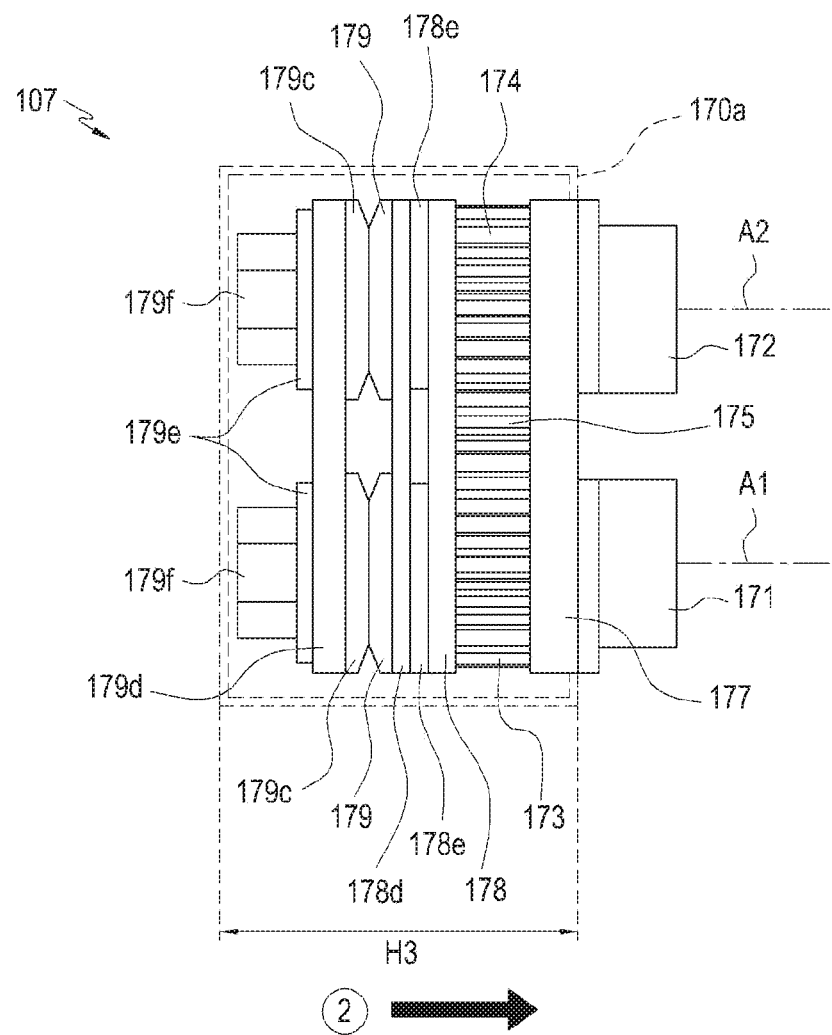
FIG. 9 is a cross-sectional view illustrating a second hinge structure of an electronic device according to an embodiment of the disclosure.

FIG. 7 is a perspective view illustrating an electronic device with a second hinge structure coupled between a first housing and a second housing, according to an embodiment of the disclosure. FIG. 8 is an enlarged view of portion B of FIG. 7. FIG. 9 is a cross-sectional view illustrating a second hinge structure of an electronic device according to an embodiment of the disclosure.

Referring to FIGS. 7 to 9, the first housing 101 may include a second side portion 101c at the other end of the first periphery 110a, and the second housing 103 may include a fourth side portion 103c at the other end of the second periphery 103a. The first housing 101 may be rotated together with the first hinge connecting part 171 as the second side portion 101c is coupled with the first hinge connecting part 171. The second housing 103 may be rotated together with the second hinge connecting part 172 as the fourth side portion 103c is coupled with the second hinge connecting part 172. As set forth above, the first hinge connecting part 171 may be rotated in the opposite direction of the second hinge connecting part 172 as it sequentially connects to the first gear 173, the first idle gear 175, the second idle gear 176, and the second gear 174.

Accordingly, the first housing 101 may be relatively rotated along the first imaginary axis A1 in the first and second hinge structures 105 and 107, and the second housing 103 may be relatively rotated along the second imaginary axis A2 in the first and second hinge structures 105 and 107.

The elastic members 179 and 179c may provide an elastic force in a second direction ② towards the second support 178, thereby pressurizing the second support 178. Here, the second direction (②) may be a direction opposite to the first direction (①). As the elastic members 179 and 179c pressurize the second support 178, the second support 178 may come into surface contact with the first and second gears 173 and 174 while restricting the rotation of the first and second gears 173 and 174. As the elastic members 179 and 179c restrict the rotation of the first and second gears 173 and 174, the rotation of the second housing 103 about the first housing 101 may be restricted.

Meanwhile, since the first hinge structure 105 (FIG. 5) has the flexible circuit board 108 (FIG. 5) with the length corresponding to the second width H2, the elastic member 159 of the first hinge structure and the washer 159c of the first hinge structure may be received in the first hinge structure except for the second width H2. For example, two or less elastic members 159 of the first hinge structure and two or fewer washers 159c may be received in the hinge housing 150a (FIG. 5) of the first hinge structure. The hinge housing 170a of the second hinge structure 107 may have a third width H3 along the lengthwise direction. The third width H3 may be the same as the first width H1 (FIG. 5) of the hinge housing 150a (FIG. 5) of the first hinge structure in order to match the design of first hinge structure 105 (FIG. 5) with that of the second hinge structure 107.

The hinge housing 170a of the second hinge structure, which lacks the flexible circuit board 108 (FIG. 5), may receive more elastic members 179 and 179c and the washers 178e and 179e than the hinge housing 150a (FIG. 5) of the first hinge structure. For example, two or more elastic members 179 and 179c of the second hinge structure and two or more washers 178e and 179e of the second hinge structure may be received in the hinge housing 170a of the second hinge structure. Since the second hinge structure 107 has more elastic members 179 and 179c than the first hinge structure 105 (FIG. 5), the elastic force of the elastic members 179 and 179c of the second hinge structure may be larger than the elastic force of the elastic members 159 of the first hinge structure. That is, since the second hinge structure 107 provides a larger elastic force than the first hinge structure 105 (FIG. 5), the relative rotation of the first and second housings 101 and 103 may be restricted. For example, the first hinge structure 105 may restrict the relative rotation of the first and second housings 101 and 103 to about 30% through about 40%, and the second hinge structure 107 may restrict the relative rotation of the first and second housings 101 and 103 to about 60% through about 70%. The second hinge structure 107 may receive more washers 178e and 179e than the first hinge structure 105 in order to prevent its components from being damaged by the elastic force of the elastic members 179 and 179c.

Figure 10:
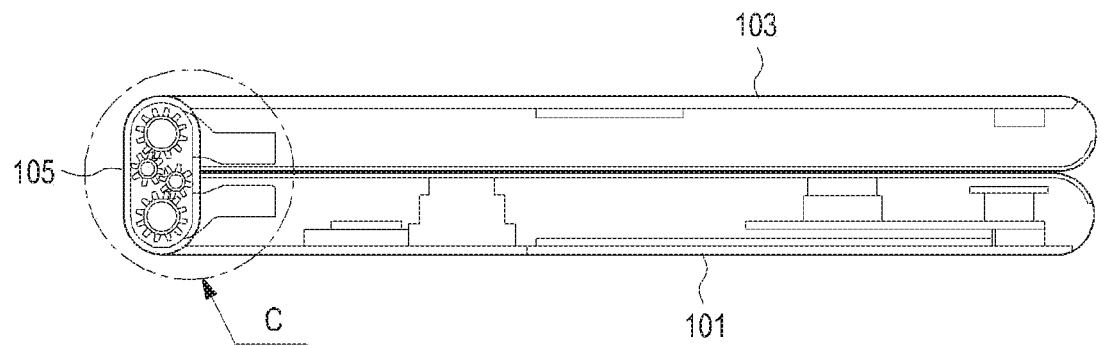
FIG. 10 is a cross-sectional view illustrating an electronic device according to an embodiment of the disclosure.
Figure 11:
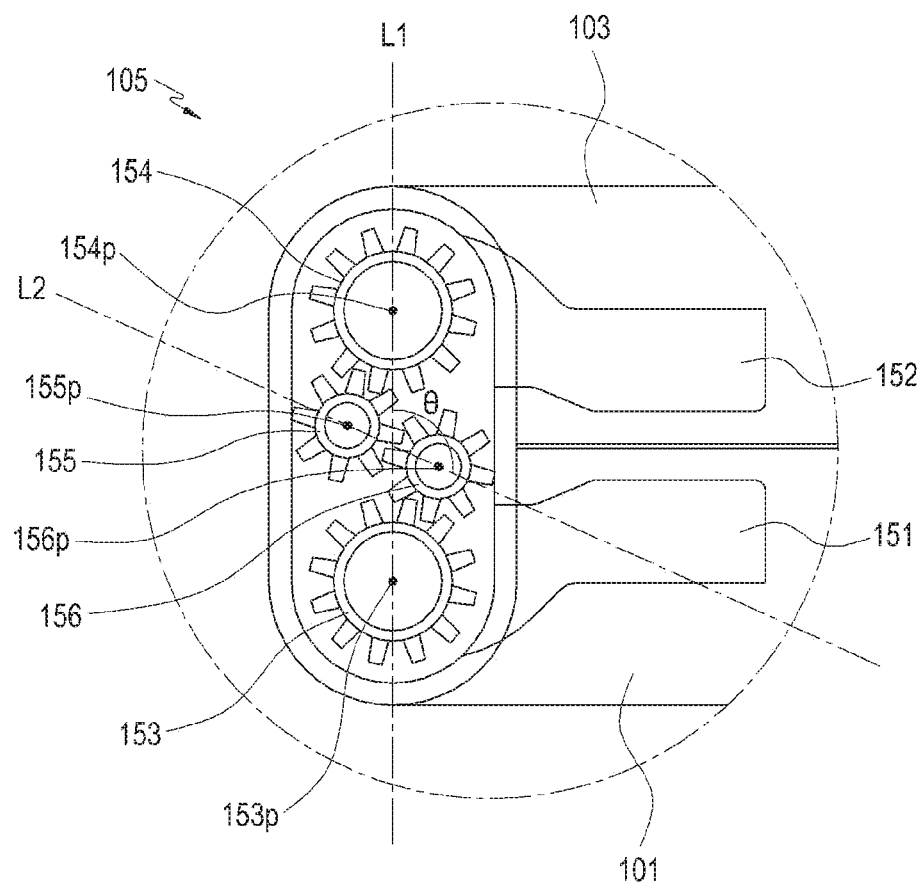
FIG. 11 is an enlarged view of portion C of FIG. 10.

FIG. 10 is a cross-sectional view illustrating an electronic device according to an embodiment of the disclosure. FIG. 11 is an enlarged view of portion C of FIG. 10.

Referring to FIGS. 10 and 1, as the first gear 153 rotates in the opposite direction of the second gear 155, the first housing 101 rotating along with the first gear 153 may be rotated in the opposite direction of the second housing 103 rotating along with the second gear 155.

The first hinge structure 105 has an even number of idle gears 155 and 156 between the first gear 153 and the second gear 154, the first gear 153 and the second gear 154 may be rotated in opposite directions. For example, if the first gear 153, the first idle gear 155, the second idle gear 156, and the second gear 154 are sequentially connected, the first gear 153 and the second idle gear 156 may be rotated in the same direction, and the first idle gear and the second gear 154 may be rotated in the opposite direction of the first gear 153. The first housing 101 may be rotated along with the first gear 153, and the second housing 103 may be rotated along with the second gear 154. As the first gear 154 is rotated in the opposite direction of the second gear 154, the relative rotation of the first housing 103 about the second housing 103 may be interoperated with the rotation of the second housing 103 about the first housing 101. For example, when the first housing 101 is rotated at about 10 degrees about the second housing 103, the second housing 103 may be simultaneously rotated at about 10 degrees about the first housing 101, so that the first housing 101 may be angled at about 20 degrees from the second housing 103.

The first housing 101 may be rotated around the first imaginary axis 153p (e.g., the first imaginary axis A1 of FIG. 7) of the first gear 153, and the second housing 103 may be rotated around the second imaginary axis 154p (e.g., the second imaginary axis A2 of FIG. 7) of the second gear 153.

A first connecting line L1 connecting the first imaginary axis 153p of the first gear 153 and the second imaginary axis 154p of the second gear 154 may cross a second connecting line L2 connecting the hinge axis 155p of the first idle gear 155 and the hinge axis 156p of the second idle gear 156. The first connecting line L1 may be angled at an obtuse angle θ from the second connecting line L2.

Figure 12:
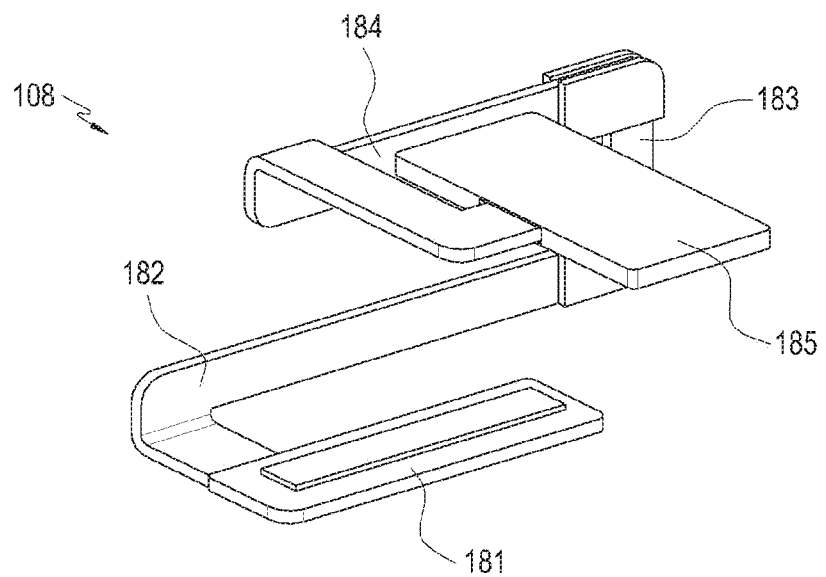
FIG. 12 is a perspective view illustrating a flexible circuit board of an electronic device according to an embodiment of the disclosure.
Figure 13:
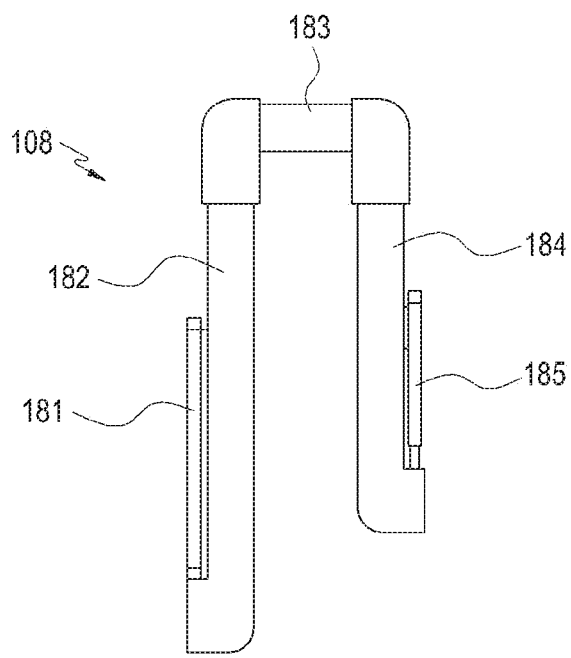
FIG. 13 is a side view illustrating a flexible circuit board of an electronic device according to an embodiment of the disclosure.
Figure 14:
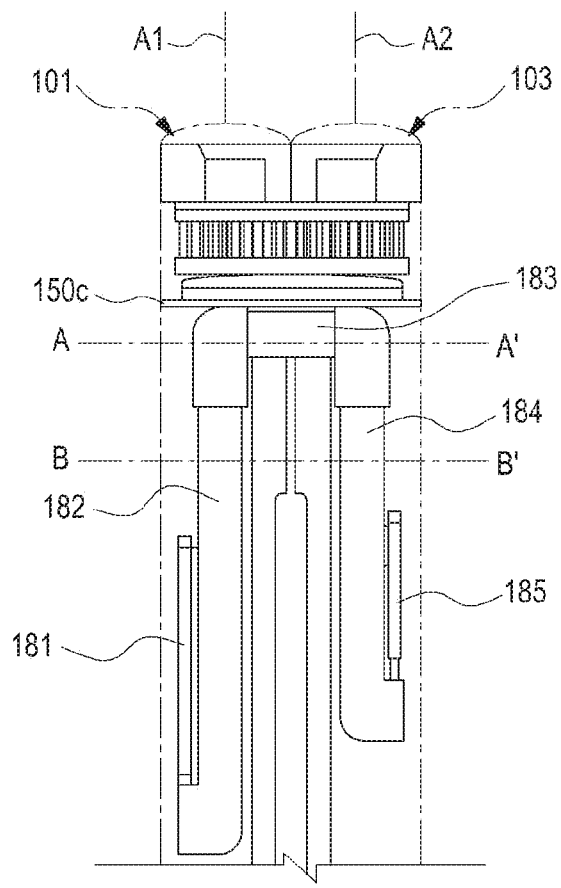
FIG. 14 is a side, cross-sectional view illustrating an example in which a flexible circuit board of an electronic device is coupled to a first housing and a second housing, according to an embodiment of the disclosure.

FIG. 12 is a perspective view illustrating a flexible circuit board of an electronic device according to an embodiment of the disclosure. FIG. 13 is a side view illustrating a flexible circuit board of an electronic device according to an embodiment of the disclosure. FIG. 14 is a side, cross-sectional view illustrating an example in which a flexible circuit board of an electronic device is coupled to a first housing and a second housing, according to an embodiment of the disclosure.

Referring to FIGS. 12 and 14, the flexible circuit board 108 may electrically connect the first circuit board of the first housing 101 with the second circuit board of the second housing 103. The flexible circuit board 108 may include a first accessing part 181, a first connecting part 182, a second connecting part 183, a third connecting part 184, and a second accessing part 185. The first accessing part 181 may be connected with the first circuit board of the first housing 101. The first connecting part 182 may extend from the first accessing part 181 up to the inside of the hinge housing 150a. The second connecting part 183 may extend from the first connecting part 182 and may be received in the hinge housing 150a. The second connecting part 183 may be formed of a flexible material to be bendable. When the second housing 103 is rotated about the first housing 101, the second connecting part 183 may be unfolded or folded. The third connecting part 184 may extend from the second connecting part 183 and may be received in the second housing 103. The second accessing part 185 may extend from the third connecting part 184 to connect to the second circuit board of the second housing 103.

According to an embodiment of the disclosure, the flexible circuit board 108 is not limited to electrically connecting the first circuit board of the first housing 101 with the second circuit board of the second housing 103 through the hinge housing 150a of the first hinge structure and may also connect the first circuit board of the first housing 101 with the second circuit board of the second housing 103 through the hinge housing of the second hinge structure.

Figure 15:
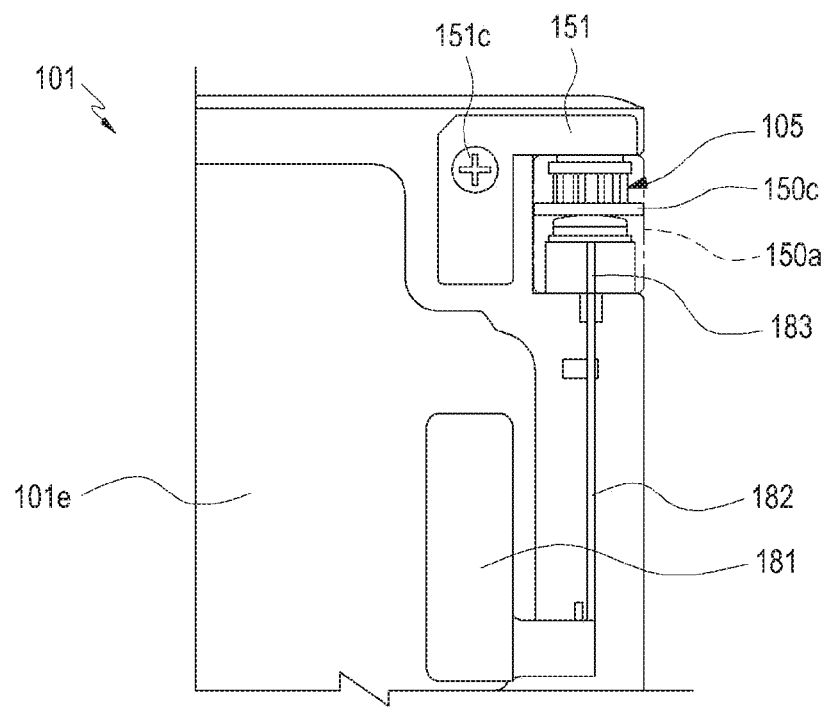
FIG. 15 is a rear view illustrating an example in which a flexible circuit board of an electronic device is coupled to a first housing and a hinge housing, according to an embodiment of the disclosure.
Figure 16:
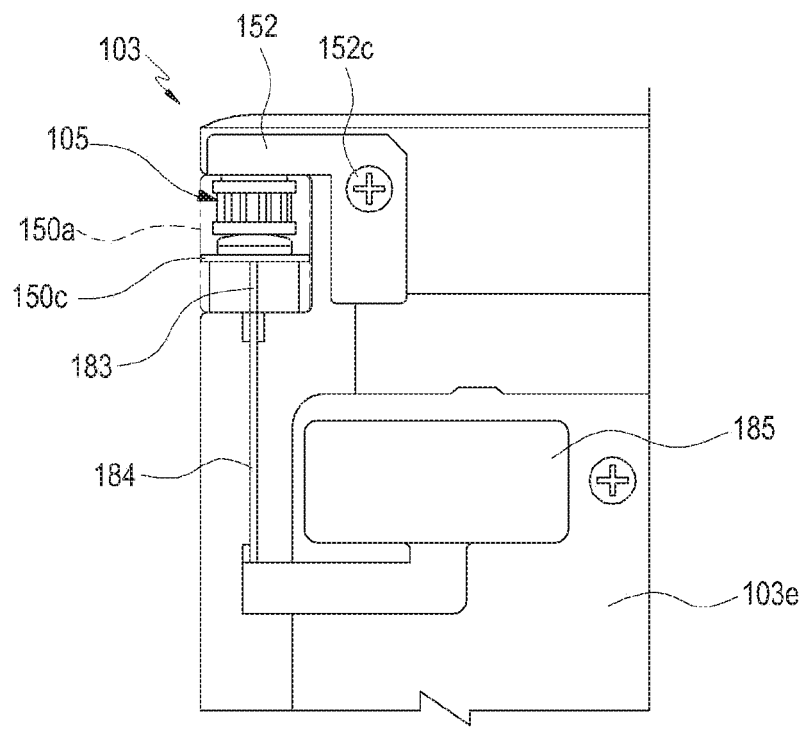
FIG. 16 is a front view illustrating an example in which a flexible circuit board of an electronic device is coupled to a second housing and a hinge housing, according to an embodiment of the disclosure.

FIG. 15 is a rear view illustrating an example in which a flexible circuit board of an electronic device is coupled to a first housing and a hinge housing, according to an embodiment of the disclosure. FIG. 16 is a front view illustrating an example in which a flexible circuit board of an electronic device is coupled to a second housing and a hinge housing, according to an embodiment of the disclosure.

Referring to FIGS. 15 and 16, the first housing 101 may have a first circuit board 101e, and the first accessing part 181 of the flexible circuit board may be attached to the first circuit board 101e. Thus, the flexible circuit board 108 (FIG. 21) may be electrically connected with the first circuit board 101e of the first housing 101.

Figure 21:
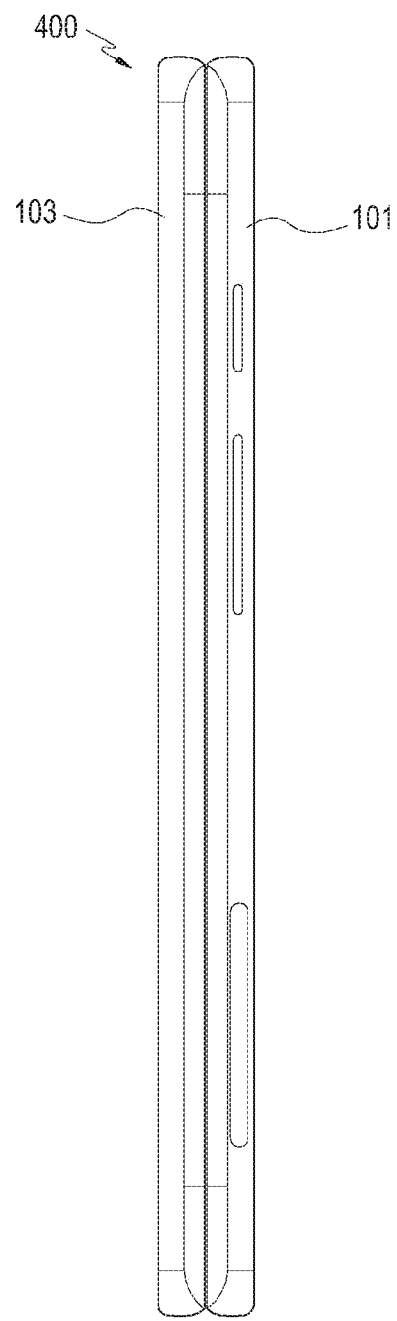
FIG. 21 is a right side view of FIG. 19.

The second housing 103 may have a second circuit board 103e, and the second accessing part 185 of the flexible circuit board may be attached to the second circuit board 103e. Thus, the flexible circuit board 108 (FIG. 21) may be electrically connected with the second circuit board 103e of the second housing 101. For example, when a battery is connected to the first circuit board 101e of the first housing 101, power may be supplied to the second circuit board through the flexible circuit board 108 (FIG. 21).

Figure 17:
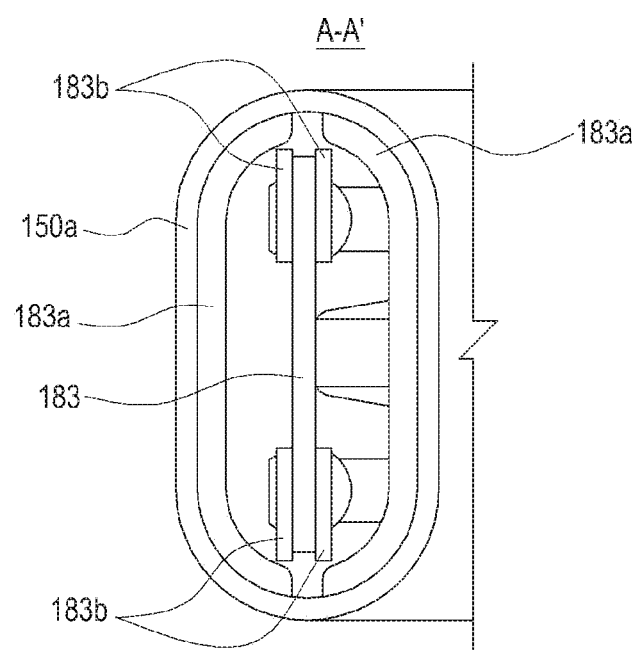
FIG. 17 is a cross-sectional view illustrating an example in which a flexible circuit board of an electronic device is coupled to a hinge housing, according to an embodiment of the disclosure.

FIG. 17 is a cross-sectional view illustrating an example in which a flexible circuit board of an electronic device is coupled to a hinge housing, according to an embodiment of the disclosure.

Referring to FIG. 17, inside the hinge housing 150a may be provided a stopper 183a attached along the internal surface of the hinge housing 150a. The stopper 183a may reduce the internal space of the hinge housing 150a where the second connecting part 183 is received, mitigating warping that may occur when the second connecting part 183 is folded or unfolded.

A reinforcing member 183b may be attached where the first connecting part 182 and the second connecting part 183 cross each other or where the second connecting part 183 and the third connecting part 184 cross each other, mitigating warping at the crossing. That is, the reinforcing member 183b ensures the durability and reliable electrical connections at the crossings of the first, second, and third connecting parts 182, 183, and 184.

Figure 18:
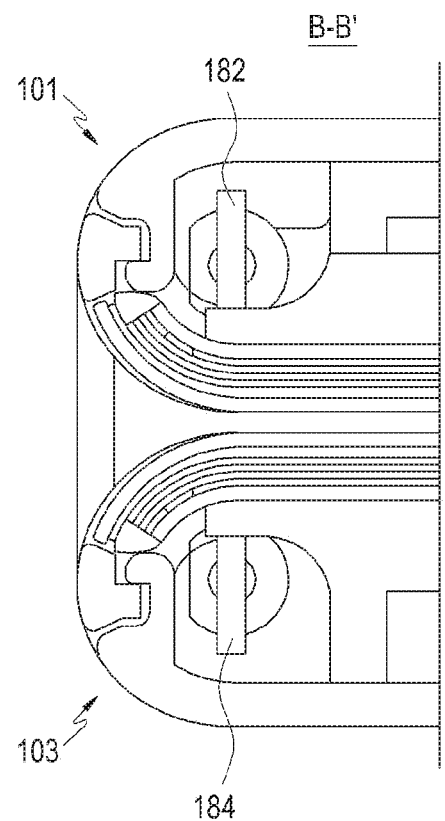
FIG. 18 is a cross-sectional view illustrating an example in which a flexible circuit board of an electronic device is coupled to a hinge housing as viewed at a different angle, according to an embodiment of the disclosure.

FIG. 18 is a cross-sectional view illustrating an example in which a flexible circuit board of an electronic device is coupled to a hinge housing as viewed at a different angle, according to an embodiment of the disclosure.

Referring to FIG. 18, the first connecting part 182 or the second connecting part 184 may be formed of a multi-layer flexible circuit board, thus preventing warping due to the relative rotation between the first housing 101 and the second housing 103.

Figure 19:
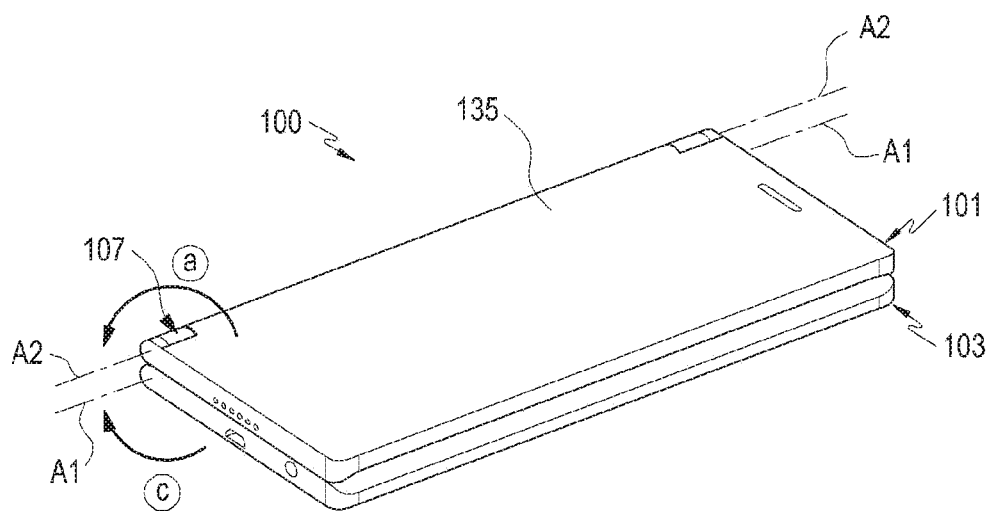
FIG. 19 is a perspective view illustrating a state in which a first surface of a first housing of an electronic device contacts a first surface of a second housing, according to an embodiment of the disclosure.
Figure 20:
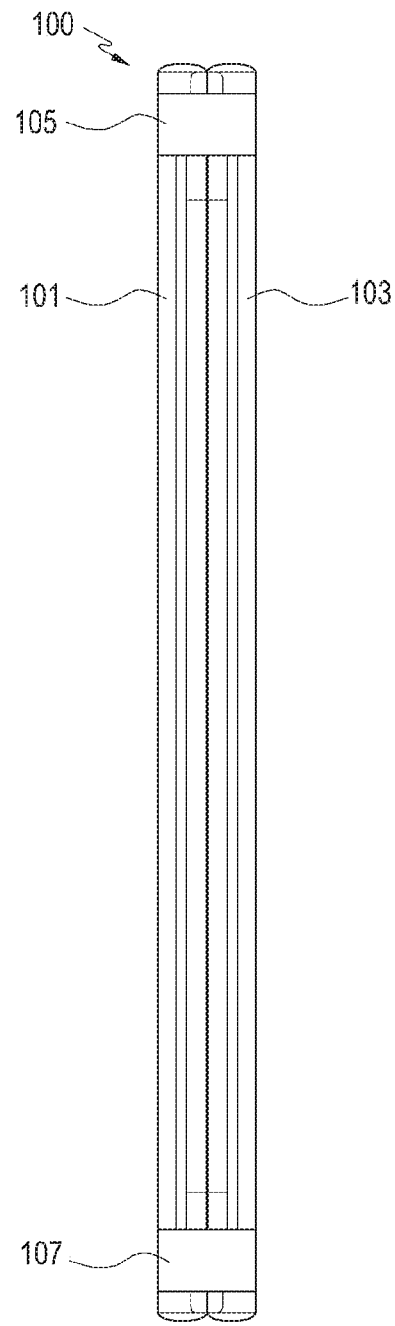
FIG. 20 is a left side view of FIG. 19.

FIG. 19 is a perspective view illustrating a state in which the first surface of a first housing of an electronic device contacts the first surface of a second housing, according to an embodiment of the disclosure. FIG. 20 is a left side view of FIG. 19. FIG. 21 is a right side view of FIG. 19.

Figure 23:
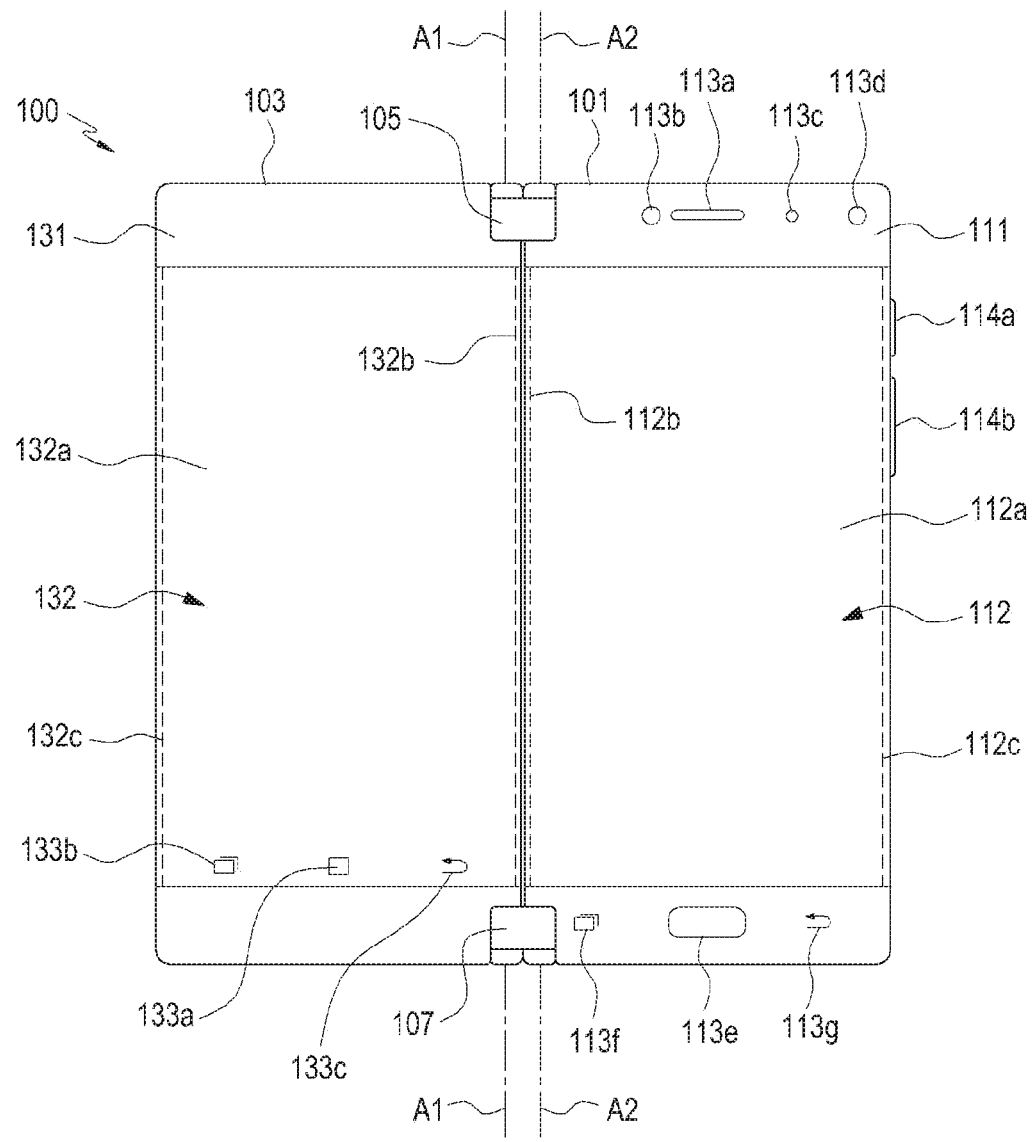
FIG. 23 is a front view illustrating a state in which a second housing of an electronic device has been rotated at 180 degrees about a first housing, according to an embodiment of the disclosure.

Referring to FIGS. 19 to 21, the third surface of the second housing 103 (e.g., a third surface 131 of the second housing 103 of FIG. 23) may contact the first surface of the first housing 101 (e.g., a first surface 111 of the first housing 101 of FIG. 23). In other words, a first touchscreen display 112 (FIG. 23) of the first housing 101 may contact the second touchscreen display 132 (FIG. 23) of the second housing 103. Here, the state in which the first surface 111 of the first housing 101 contacts the third surface 131 of the second housing 103 may be defined as a first state. The first state may be defined as being when the first surface 111 and third surface 132 (FIG. 23) are angled at 0 degrees therebetween. The first and second hinge structures 105 and 107 may be configured to hold the first and second housings to allow the first and third surfaces 111 and 131 to form an angle relatively selected therebetween where there is no external force by using the elastic members 159, 179, and 179c. The selected angle may be an angle from 0 degrees to 360 degrees.

A speaker hole 136 may be formed on the second surface 135 of the second housing. The speaker hole 136 is described below in detail.

The electronic device 100 configured to allow the first surface of the first housing 101 to contact the first surface of the second housing 103 may prevent the first touchscreen display 112 (FIG. 23) and the second touchscreen display 132 (FIG. 23) from being exposed to the outside, protecting the first touchscreen display 112 (FIG. 23) and the second touchscreen display 132 (FIG. 23) from the outside.

Figure 22:
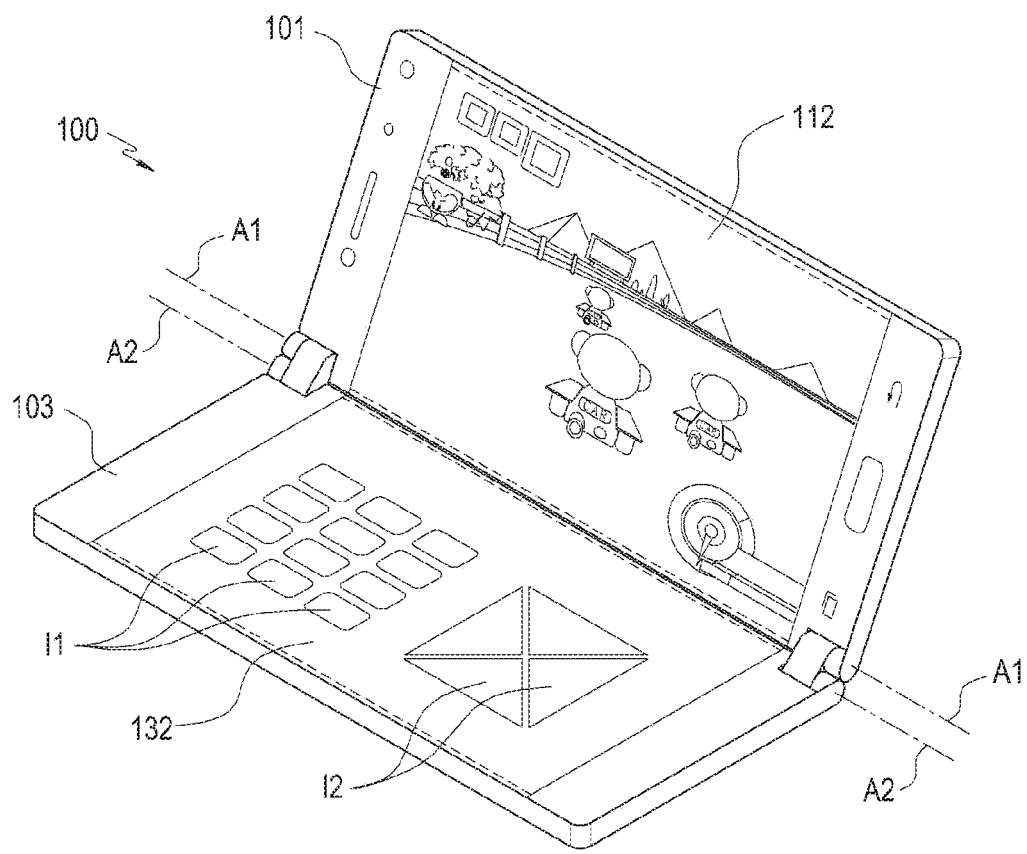
FIG. 22 is a perspective view illustrating an example in which a second touchscreen display of an electronic device is implemented as a keypad, according to an embodiment of the disclosure.

FIG. 22 is a perspective view illustrating an example in which the second touchscreen display of an electronic device is implemented as a keypad, according to an embodiment of the disclosure.

Referring to FIG. 22, the second housing 103 may rotate about the first housing 101, so that the angle between the first housing 101 and the second housing 103 may be not less than about 90 degrees and not more than about 180 degrees.

The second housing 103 may be placed on the user's lap (or a desk). If the user implements an application, a screen may be implemented on the first touchscreen display 112, and keypads I1 and I2 may be implemented on the second touchscreen display 132. For example, if the user runs a game application, then a game screen may be implemented on the first touchscreen display 112, and game control keys I1 and I2 may be implemented on the second touchscreen display 132. That is, the user may comfortably manipulate the game control keys I1 and I2 on the second touchscreen display 132 while viewing the game screen in a broader area on the first second display 112.

According to an embodiment of the disclosure, as the second housing 103 has an angle from about 90 degrees to about 180 degrees with respect to the first housing 101, if the user runs a word processor application, with a fourth screen of the second housing 103 (e.g., the opposite surface of the surface where the first touchscreen display 132 is disposed in the second housing 103) placed on the user's lap, then a word processor application may be implemented on the first touchscreen display 112, and a keypad may be implemented on the second touchscreen display 132. The keypad may include any one or more of an English keypad, a Korean keypad, a numeric keypad, and a symbol keypad. When any one of the English keypad, Korean keypad, numeric keypad, and symbol keypad is implemented on the second touchscreen display 132, the keypad may include a keypad switch button to switch into another of the English keypad, Korean keypad, numeric keypad, and symbol keypad.

FIG. 23 is a front view illustrating a state in which the second housing of an electronic device has been rotated at 180 degrees about a first housing, according to an embodiment of the disclosure.

Figure 24A:
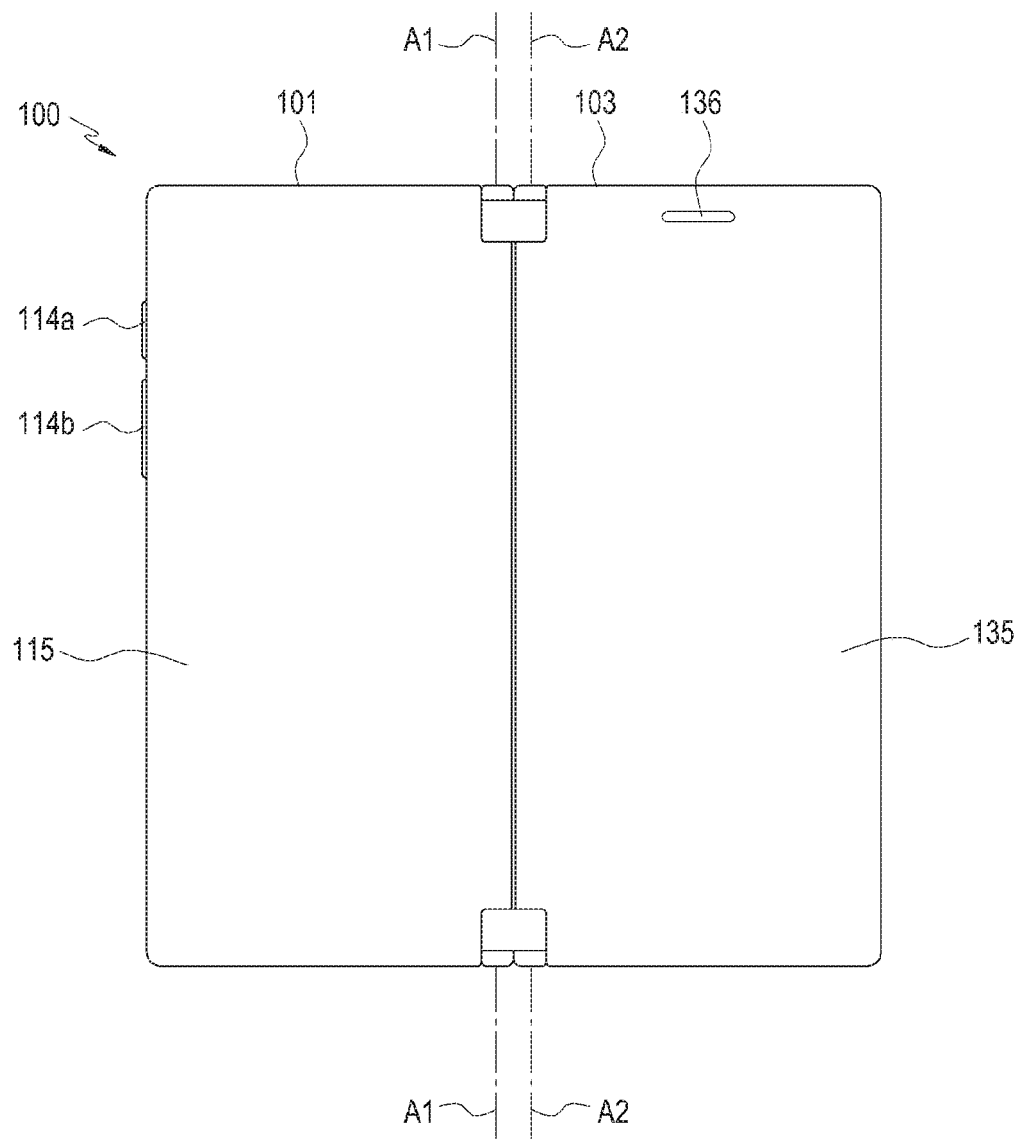
FIG. 24a is a rear view illustrating a state in which a second housing of an electronic device has been rotated at 180 degrees about a first housing, according to an embodiment of the disclosure.
Figure 24B:
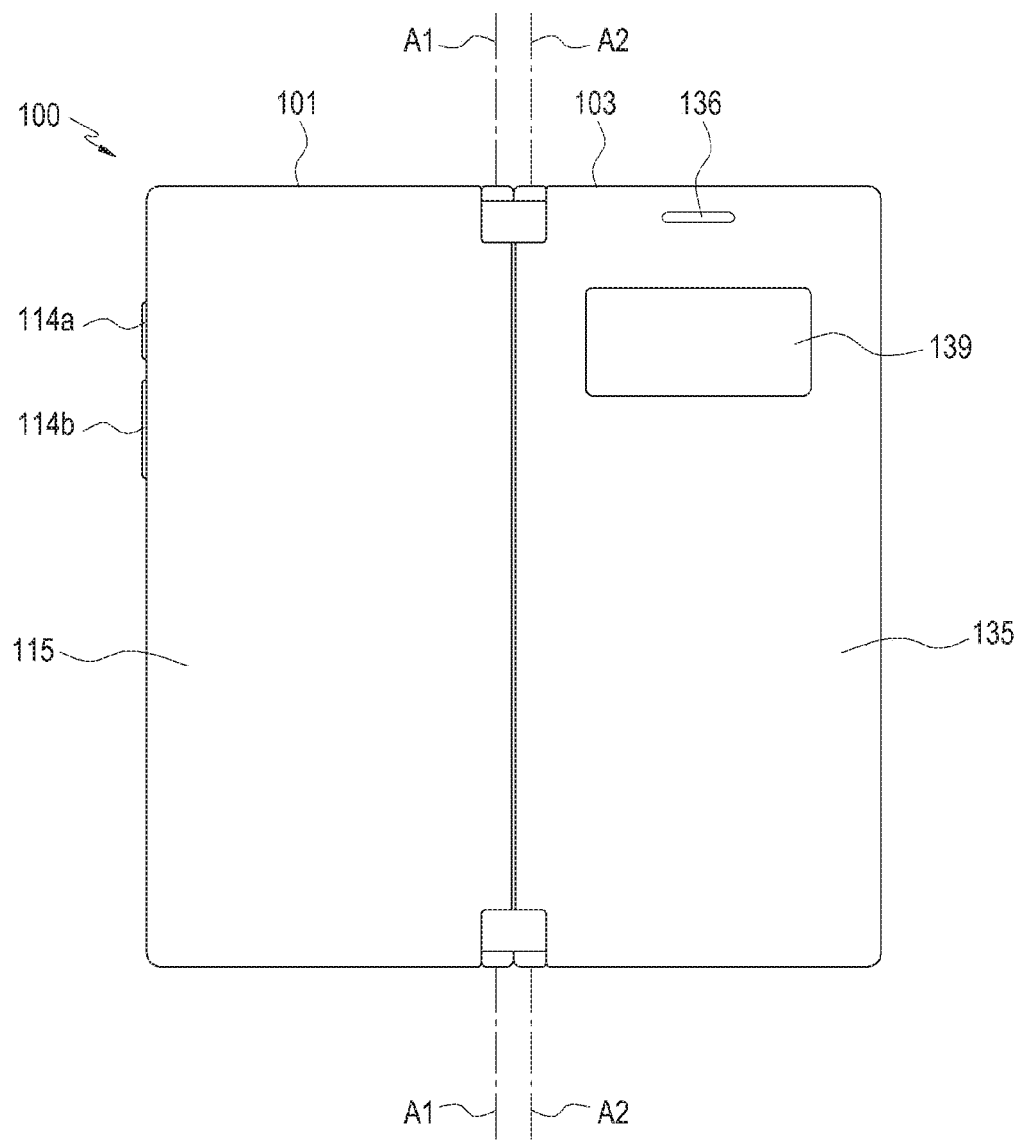
FIG. 24b is a rear view illustrating a state in which a second housing of an electronic device has been rotated at 180 degrees about a first housing, according to a modified embodiment of the disclosure.

Referring to FIG. 23, the first housing 101 may include a first surface 111, a first curved surface, and a third curved surface. The first curved surface may extend along the first periphery 101a (FIG. 3) from the first surface 111 to the second surface 115 (FIG. 24b). The third curved surface may be positioned opposite the first curved surface.

The first touchscreen display 112 may be disposed in the first housing 101. The first touchscreen display 112 may include a first flat part 112a disposed on the first surface 111 of the first housing 101, a first flexible display 112b formed corresponding to the first curved surface, and a third flexible display 112c formed corresponding to the third curved surface.

A speaker 113a, a camera 113b, a sensor 113c, and a flash 113d may be disposed on the first surface 111 of the first housing 101. The sensor 113c may be an optical sensor to detect light. For example, when the user calls on the electronic device, the sensor 113c may detect a variation in light depending on whether the user's body approaches the sensor 113c. The sensor 113c may be a sensor capable of detecting a variation in capacitance that arises when the user's body comes in contact. A home key 113e and function keys 113f and 113g may be disposed on the first surface 111 of the first housing 101. The first housing 101 may have a window member to protect the first touchscreen display 112. For example, the window member may be formed of glass or transparent reinforced plastic.

A power key 114a and a volume key 114b may be disposed on the second side surface of the first housing 101.

The second housing 103 may include a third surface 131, a second curved surface, and a fourth curved surface. The second curved surface may extend along the second periphery 103a (FIG. 3) from the first surface 131 to the second surface 135 (FIG. 24b). The fourth curved surface may be positioned opposite the second curved surface. The first curved surface and the third curved surface may have substantially the same curvature, and the second curved surface and the fourth curved surface may have substantially the same curvature. The first surface 111 and the third surface 131 may have substantially the same area.

The second touchscreen display 132 may be disposed in the second housing 103. The second touchscreen display 132 may include a first flat part 132a disposed on the third surface 131 of the second housing 103, a second flexible display 112c formed corresponding to the second curved surface, and a fourth flexible display 112b formed corresponding to the fourth curved surface. The second housing 103 does not have any separate home key or functional keys. A home key 133a or function keys 133b and 133c may be implemented on the second touchscreen display 132.

The first flexible display 112b of the first touchscreen display 112 and the second flexible display 132b of the second touchscreen display 132 may be provided between the first hinge structure 105 and the second hinge structure 107, thus preventing screens output from the first flexible display 112b and the second flexible display 132b from being interfered with by the first and second hinge structures 105 and 107.

The first touchscreen display 112 and the second touchscreen display 132 may have substantially the same size and be positioned to overlap each other in the first state.

The first flexible display 112b may form the first side surface of the first touchscreen display 112, so that the first side surface of the first touchscreen display 112 may be formed of a curved surface. The second flexible display 132b may form the second surface of the second touchscreen display 132 so that the second surface of the second touchscreen display 132 may be formed of a curved surface. FIG. 24a is a rear view illustrating a state in which a second housing of an electronic device has been rotated at 180 degrees about a first housing, according to an embodiment of the disclosure.

Referring to FIG. 24a, the second surface 115 of the first housing 101 may face away from the first surface 111 (FIG. 23) of the first housing 101 and may be formed of a metal. The fourth surface 135 of the second housing 103 may face away from the third surface 131 (FIG. 23) of the second housing 103 and may be formed of a metal. As shown in FIG. 19, when the second housing 103 is rotated about the first housing 101 so that the third surface 131 (FIG. 23) of the second housing faces and contacts the first surface 111 (FIG. 23) of the first housing, the second housing 103 may have a speaker hole 136 in the position corresponding to the speaker 113a (FIG. 23). If the speaker 113a produces a sound signal, the sound signal may be transferred via the speaker hole 136 to the outside of the fourth surface 135 of the second housing 103. Even when the first and second housings 101 and 103 are in a folded position, the user may receive sound signals through the speaker hole 136 and talk on the phone.

According to an embodiment of the disclosure, the speaker hole 136 may not be formed in the second housing 103, and the second housing 103 may have a second speaker corresponding to the speaker 113a (FIG. 23). The reference number 136 of FIG. 24 may correspond to the second speaker. Even when the first and second housings 101 and 103 are in a folded position, the user may receive sound signals through the second speaker and talk on the phone.

FIG. 24b is a rear view illustrating a state in which a second housing of an electronic device has been rotated at 180 degrees about a first housing, according to a modified embodiment of the disclosure.

Referring to FIG. 24b, according to a modified embodiment of the disclosure, the second housing 103 of the electronic device may include a third touchscreen display 139.

The third touchscreen display 139 may be disposed on the fourth surface 135 of the second housing 103. The third touchscreen display 139 may display a screen to deliver brief information to the user. For example, the third touchscreen display 139 may display one or more of a clock, weather, or call alarm message. However, the third touchscreen display 139 is not limited as displaying a clock, weather, or call alarm message, but instead may display other various pieces of information as briefly displayable by the user's settings. That is, when the angle between the first housing 101 and the second housing 103 is 0 degrees as shown in FIG. 19, the user is not required to unfold the first housing 101 and the second housing 103 to check the time or other brief information, but he may simply check such information on the third touchscreen display 139.

Figure 25:
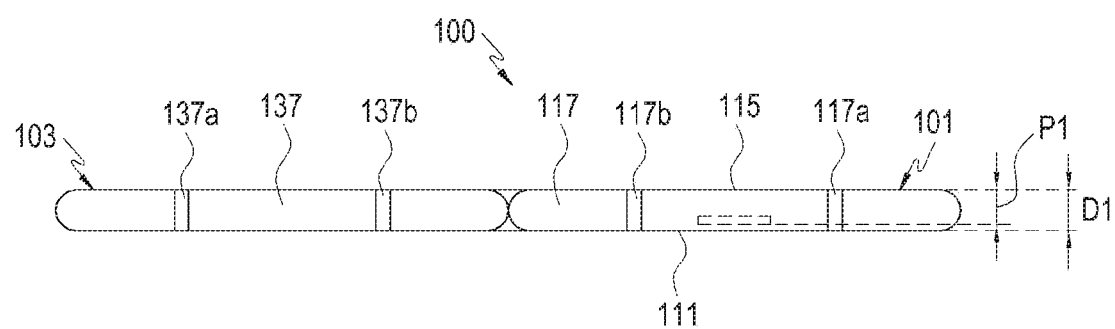
FIG. 25 is a plan view illustrating a state in which a second housing of an electronic device has been rotated at 180 degrees about a first housing, according to an embodiment of the disclosure.

FIG. 25 is a plan view illustrating a state in which a second housing of an electronic device has been rotated at 180 degrees about a first housing, according to an embodiment of the disclosure.

Referring to FIG. 25, an upper side surface 117 of the first housing 101 may be metallic and be utilized as an antenna radiator. Segmenters 117a and 117b may be formed on the upper side surface 117 of the first housing to cut off electrical connection.

The first surface 111 of the first housing may have a first height D1 from the second surface 115 of the first housing. A home key 113e formed on the first surface 111 of the housing may have a second height P1 from the second surface 115 of the first housing. The second height P1 may be smaller than the first height D1, thus preventing the home key 113e from projecting beyond the first surface 111 of the first housing. That is, when the first touchscreen display 112 (FIG. 23) faces the second touchscreen display 132 (FIG. 23), the home key 113e may be prevented from contacting the third surface 131 of the second housing. For example, when the third surface 131 of the second housing is formed of glass, the third surface 131 of the second housing may be prevented from being damaged by the home key 113e. According to an embodiment of the disclosure, the home key 113e is not limited to a button structure which is movable by an external force. The home key 113e may be formed of a pattern printed on the first surface 111, and a touch panel may be provided under the first surface 111 to recognize the user's touch. The home key 113e is not limited to a pattern printed on the first surface 111. A hole may be formed on the first surface 111 to allow the user to feel touching it while preventing the home key 113e from contacting the third surface 131 of the second housing. The hole may be formed as the existing shape of the home key or as other various shapes.

The upper side surface 137 of the second housing 103 may be metallic and be utilized as an antenna radiator. Segmenters 137a and 137b may be formed on the upper side surface 137 of the second housing to cut off electrical connection.

Figure 26A:
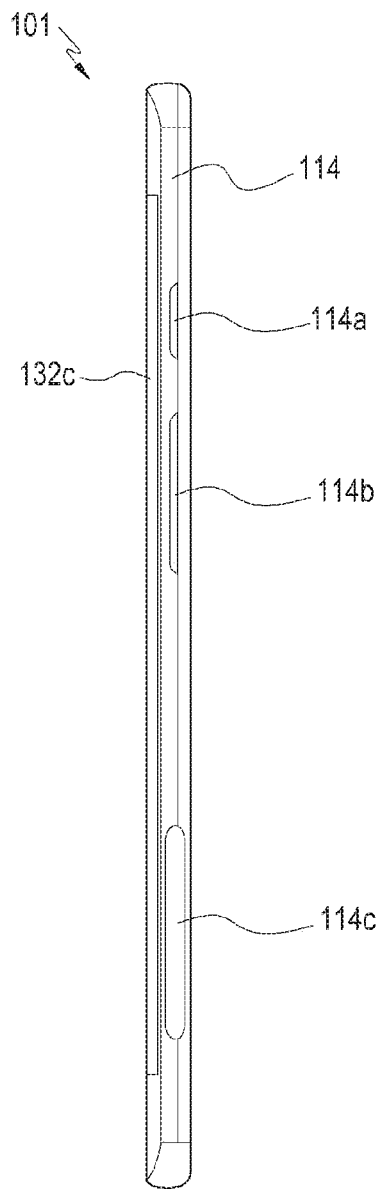
FIG. 26a is a right side view illustrating a state in which a second housing of an electronic device has been rotated at 180 degrees about a first housing, according to an embodiment of the disclosure.

FIG. 26a is a right side view illustrating a state in which a second housing of an electronic device has been rotated at 180 degrees about a first housing, according to an embodiment of the disclosure.

Referring to FIG. 26a, on the third edge 114 of the first housing 101 may be disposed a storage unit 114c for receiving a storage medium, as well as a third flexible display 132c of the first touchscreen display, a power key 114a, and a volume key 114b. The storage medium may be a subscriber identification module (SIM) card or an SD card.

Figure 26B:
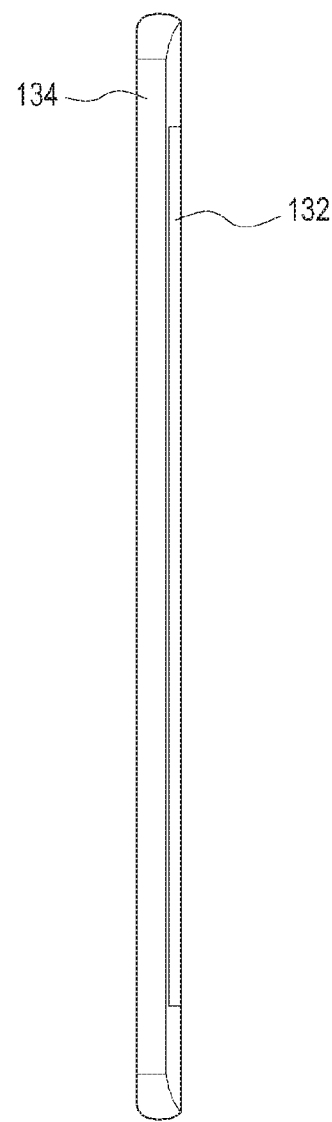
FIG. 26b is a left side view illustrating a state in which a second housing of an electronic device has been rotated at 180 degrees about a first housing, according to an embodiment of the disclosure.

FIG. 26b is a left side view illustrating a state in which a second housing of an electronic device has been rotated at 180 degrees about a first housing, according to an embodiment of the disclosure.

Referring to FIG. 26b, a fourth flexible display 132c of the second touchscreen display may be disposed on the fourth edge 134 of the second housing 103.

The storage unit 114c (FIG. 15) is not limited as disposed on the third edge 114 of the first housing 101 but instead may be disposed on the fourth edge 134 of the second housing 103.

Figure 27A:
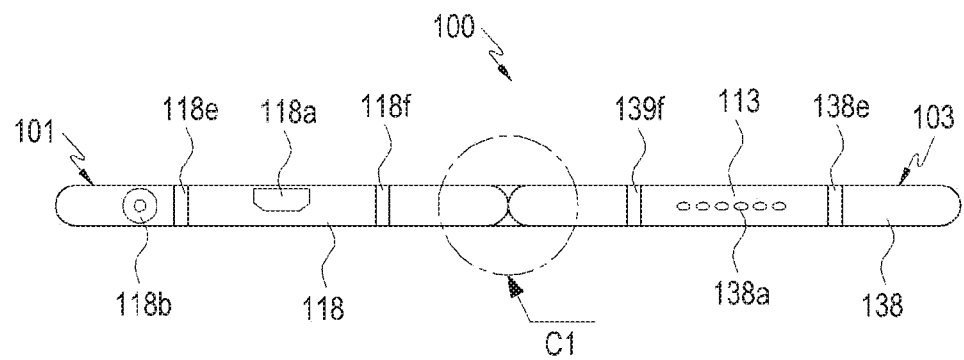
FIG. 27a is a bottom view illustrating a state in which a second housing of an electronic device has been rotated at 180 degrees about a first housing, according to an embodiment of the disclosure.

FIG. 27a is a bottom view illustrating a state in which a second housing of an electronic device has been rotated at 180 degrees about a first housing, according to an embodiment of the disclosure.

Referring to FIG. 27a, a lower side surface 118 of the first housing 101 may be metallic and be utilized as an antenna radiator. Segmenters 118a and 118b may be formed on the lower side surface 118 of the first housing to cut off electrical connection. At the lower side surface 118 of the first housing may be provided a connector 118a for charging the battery and transmitting data and a connecting hole 118b for connection with an earphone jack.

The lower side surface 138 of the second housing 103 may be metallic and be utilized as an antenna radiator. Segmenters 138a and 138b may be formed on the lower side surface 138 of the second housing to cut off electrical connection. A microphone hole 138a may be formed on the lower side surface 138 of the second housing.

Figure 27B:
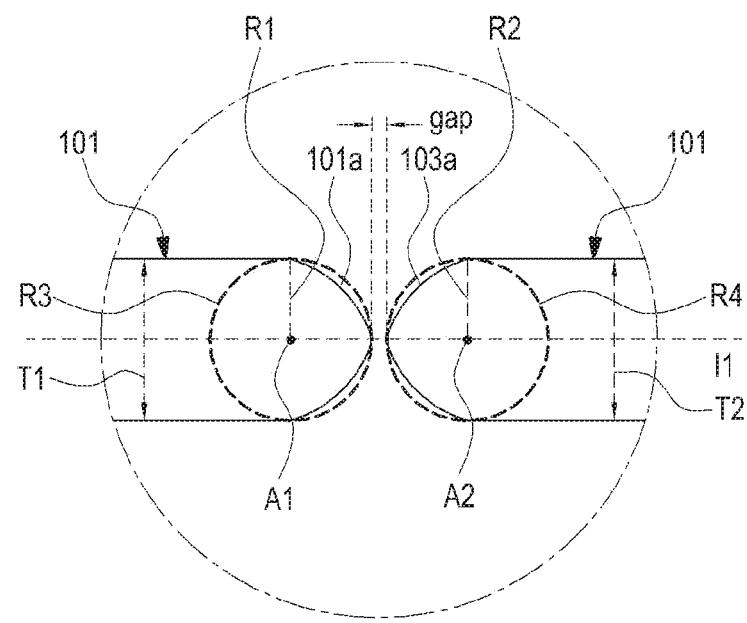
Figure 27C:
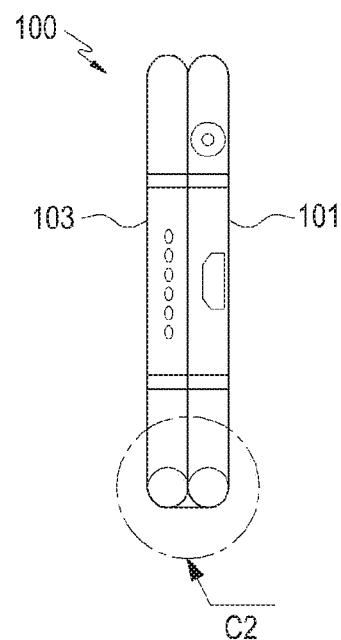
FIG. 27c is a bottom view illustrating a state in which a second housing of an electronic device has been rotated at 0 degrees about a first housing, according to an embodiment of the disclosure.
Figure 27D:
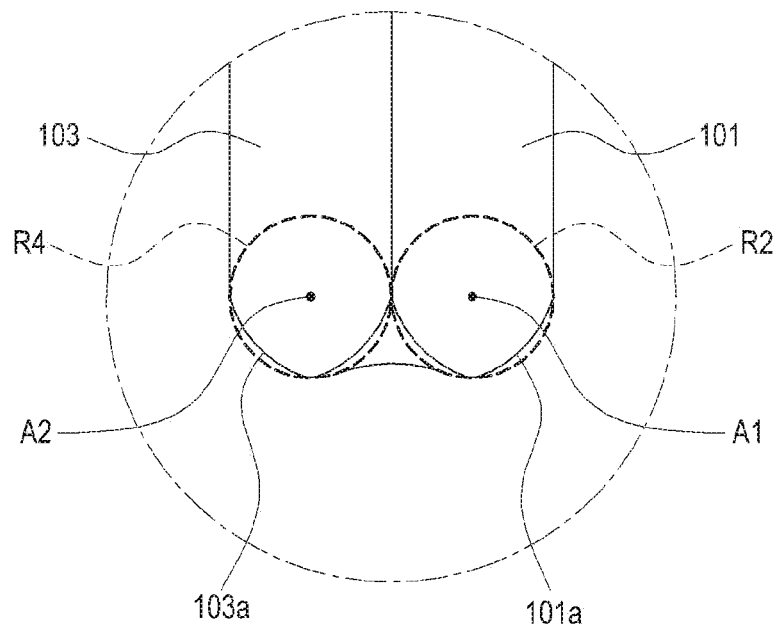
FIG. 27d is an enlarged view of portion C2 of FIG. 27c.
Figure 27E:
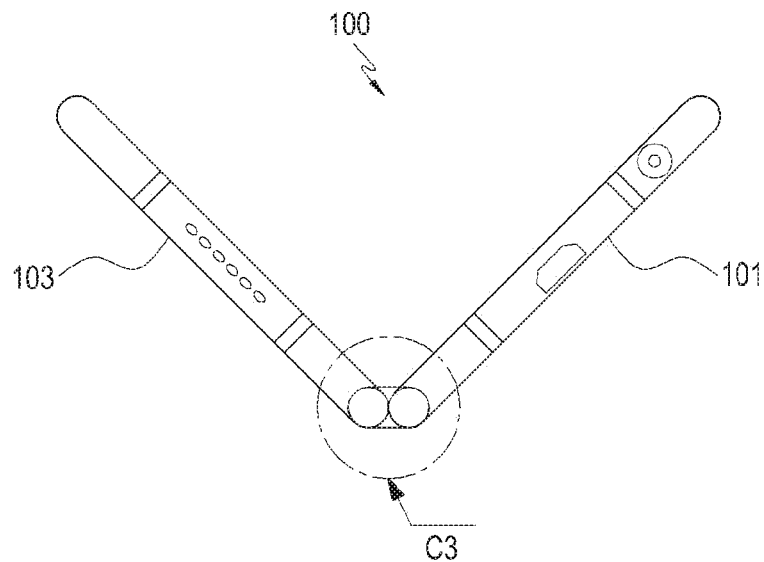
FIG. 27e is a bottom view illustrating a state in which a second housing of an electronic device has been rotated from 0 degrees to 180 degrees about a first housing, according to an embodiment of the disclosure.
Figure 27F:
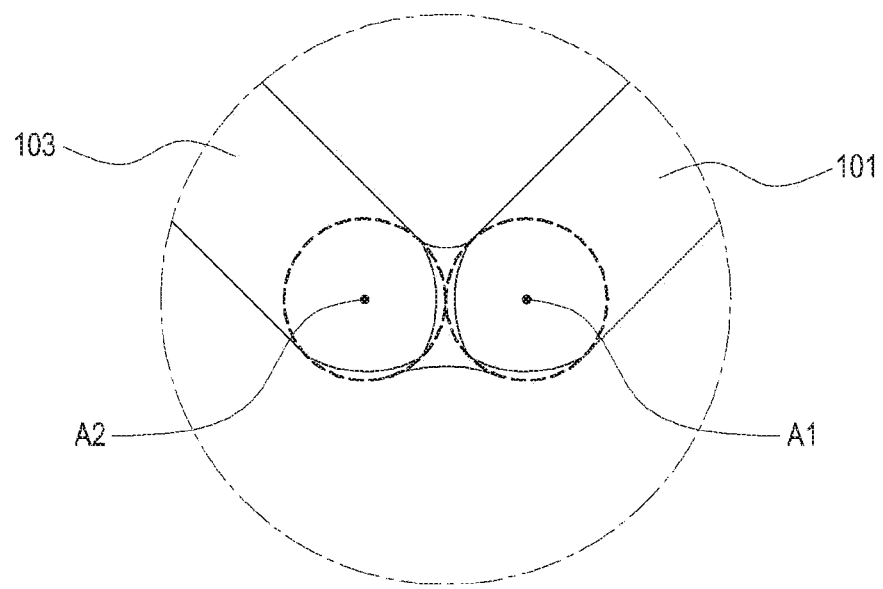
FIG. 27f is an enlarged view of portion C3 of FIG. 27e.

FIG. 27b is an enlarged view of portion C1 of FIG. 27a. FIG. 27c is a bottom view illustrating a state in which a second housing of an electronic device has been rotated at 0 degrees about a first housing, according to an embodiment of the disclosure. FIG. 27d is an enlarged view of portion C2 of FIG. 27c. FIG. 27e is a bottom view illustrating a state in which a second housing of an electronic device has been rotated from 0 degrees to 180 degrees about a first housing, according to an embodiment of the disclosure. FIG. 27f is an enlarged view of portion C3 of FIG. 27e.

Referring to FIGS. 27b to 27f, a gap may be formed between the first periphery 101a of the first housing 101 and the second periphery 103a of the second housing 103, thus preventing the first periphery 110a and the second periphery 103a from contacting each other. The gap may correspond to a length ranging from about 0.1 mm to about 0.3 mm. The first housing 101 may have a first thickness T1 from the first surface to the second surface, and the second housing 103 may have a second thickness T2 from the third surface to the fourth surface.

The first thickness T1 of the first housing 101 may be the same or smaller than the second thickness T2 of the second housing 103. The first imaginary axis A1 may be positioned as high as half the first thickness T1 from the first surface, and the second imaginary axis A2 may be positioned as high as half the second thickness T2 from the third surface. The dashed line connecting the first imaginary axis A1 and the second imaginary axis A2 may be defined as a connecting line I1. The distance from the first imaginary axis A1 to the first surface or the second surface may be defined as the first radius of gyration R1, and the distance from the second imaginary axis A2 to the third surface or the fourth surface may be defined as a second radius of gyration R2. The first radius of gyration R1 may correspond to the value obtained by dividing the sum of the first thickness T and the second thickness T2 by four. The second radius of gyration R2 may be the same as the first radius of gyration R1. The distance between the first imaginary axis A1 and the second imaginary axis A2 may correspond to the length of the sum of the first radius of gyration R1, the second radius of gyration R2, and the gap. The distance between the first imaginary axis A1 and the second imaginary axis A2 may be the same or larger than half the sum of the first thickness T1 and the second thickness T2. The distance between the first periphery 101a and the first imaginary axis A1 along the connecting line I1 may be the same or smaller than the first radius of gyration R1. The distance between the second periphery 103a and the second imaginary axis A2 along the connecting line I1 may be the same or smaller than the second radius of gyration R2. The distance between the first imaginary axis A1 and the first surface along the direction perpendicular to the connecting line I1 may be the same as the distance between the first imaginary axis A1 and the third surface along the direction perpendicular to the connecting line I1. The distance between the second imaginary axis A2 and the second surface along the direction perpendicular to the connecting line I1 may be the same as the distance between the second imaginary axis A2 and the third surface along the direction perpendicular to the connecting line I1. The edge 101a of the first housing 101 may be present inside the first circle R3 with the first radius of gyration R1. The edge 103a of the second housing 103 may be present inside the second circle R4 with the second radius of gyration R2.

As the edge 101a of the first housing 101 is placed in the first circle R3, and the edge 103a of the second housing 103 is placed in the second circle R4, the first housing 101 rotating around the first imaginary axis A1 may be prevented from interfering with the second housing 103 rotating around the second imaginary axis A2. The gap may remain in existence while the first housing 101 rotates about the second housing 103 between 0 degrees and 360 degrees.

Figure 28:
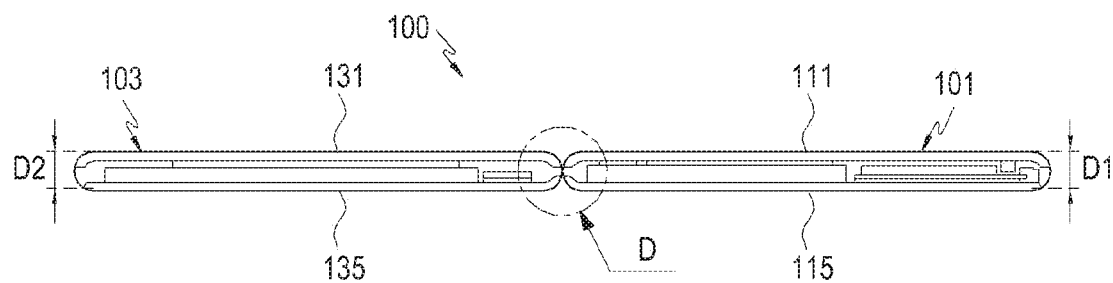
FIG. 28 is a cross-sectional view illustrating a state in which a second housing of an electronic device has been rotated at 180 degrees about a first housing, according to an embodiment of the disclosure.

FIG. 28 is a cross-sectional view illustrating a state in which a second housing of an electronic device has been rotated at 180 degrees about a first housing, according to an embodiment of the disclosure.

Referring to FIG. 28, the first housing 101 may have a first thickness that corresponds to the length from the second surface 115 of the first housing 101 to the first surface 111 of the first housing. The second housing 103 may have a second thickness D2 that corresponds to the length from the fourth surface 135 of the second housing to the third surface 131 of the second housing. As the first thickness D1 is the same as the second thickness D2, the first surface 111 of the first housing and the third surface 131 of the second housing may be placed on the same plane when the second housing 103 is rotated 180 degrees about the first housing 101.

Figure 29:
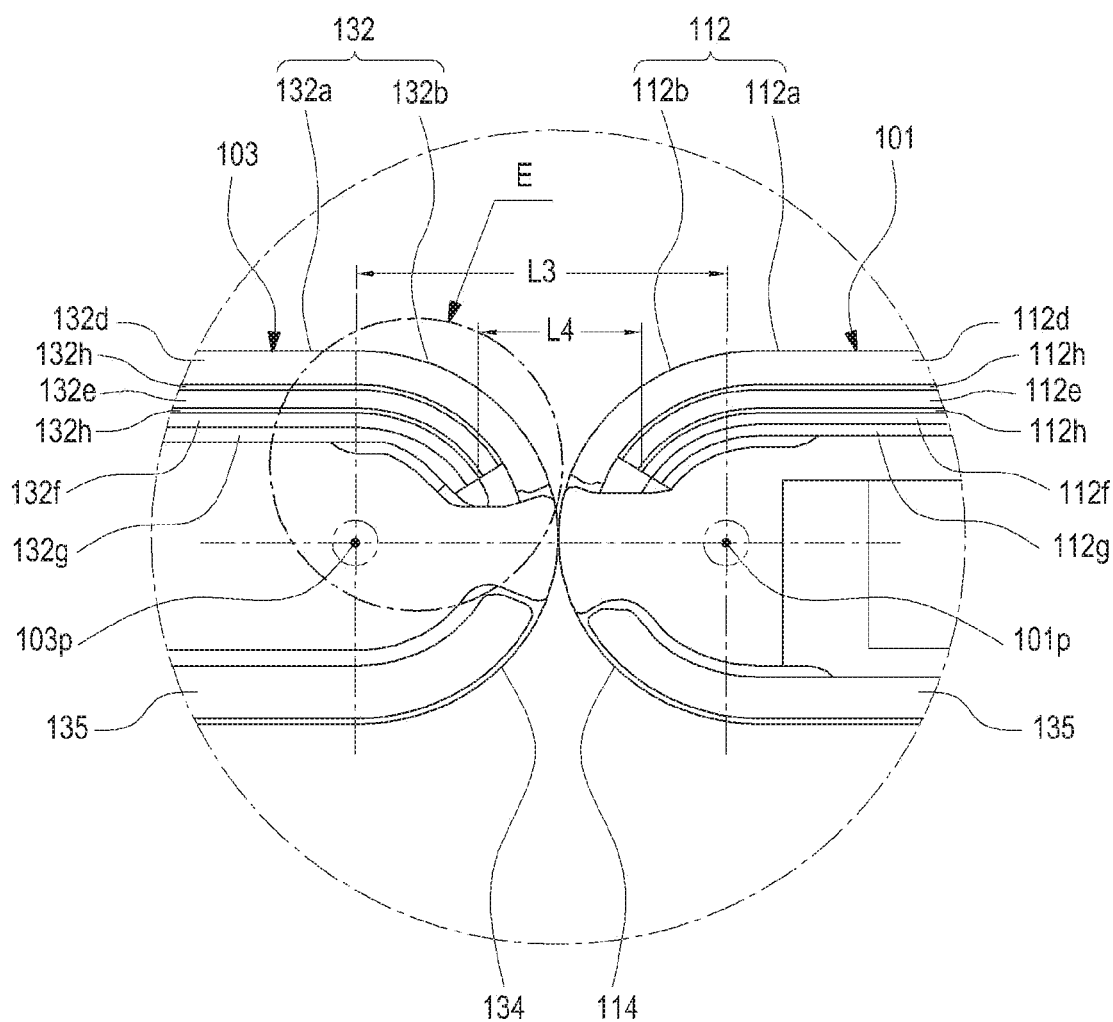
FIG. 29 is an enlarged view of portion D of FIG. 28.

FIG. 29 is an enlarged view of portion D of FIG. 28.

Referring to FIG. 29, the first touchscreen display 112 may include a window member 112d, a touch panel 112e, a display module 112f, and a protecting member 112g.

The window member 112d may protect the inside of the first touchscreen display 112. The touch panel 112e may be attached to one surface of the window member 112d. The touch panel 112e may be attached by an attaching member 112h. The attaching member 112h may be formed of an adhesive or attaching tape. The display module 112f may be attached to one surface of the touch panel 112e by the attaching member 112h. The display module 112f may be an organic light emitting diode (OLED) or an LCD. For example, the first flexible display 132b may include a first OLED. The protecting member 112g may be attached to the display module 112f by the attaching member. The protecting member 112g may protect the display module 112f against probable impacts. The protecting member 112g may be formed as black, reducing reflection of light from the outside by the first touchscreen display 112.

The first housing 101 may be rotated around the first imaginary axis 101p (e.g., the first imaginary axis A1 (FIG. 24)), and the second housing 103 may be rotated around the second imaginary axis 103p (e.g., the second imaginary axis A2 (FIG. 24)). The first display 112 including the window member 112d, the touch panel 112e, the display module 112f, and the protecting member may be bent around the first imaginary axis 101p.

The second touchscreen display 132 may include a window member 132d, a touch panel 132e, a display module 132f, and a protecting member 132g. No detailed description of similar components to those of the first touchscreen display 112 is given below.

The second touchscreen display 132 including the window member 132d, the touch panel 132e, the display module 132f, and the protecting member 132g may be bent around the second imaginary axis 103p. The second flexible display 132b may include a second OLED.

Meanwhile, in some conventional electronic devices, no display module is disposed between the first imaginary axis 101p and the second imaginary axis 103p for the first touchscreen display and the second touchscreen display to rotate relative to each other. Such a conventional electronic device may encounter the problem that no screen is displayed on a space L3 between the first imaginary axis 101p and the second imaginary axis 103p, when the first touchscreen display and the second touchscreen display implement a single large screen. As per other conventional electronic devices, when the first touchscreen display and the second touchscreen display are structured to rotate within 180 degrees while narrowing the gap therebetween, the user's body part (e.g., finger) may be stuck in the gap between the first touchscreen display and the second touchscreen display, and thus injured, when the first and second touchscreen displays are rotated relative to each other.

In the electronic device according to an embodiment of the disclosure, the first periphery of the first housing 101 and the second periphery of the second housing 103 are made curved, thus preventing the first touchscreen display 112 and the second touchscreen display 132 from being interfered with by the relative rotation of the first housing 101 and the second housing 103.

The first flexible display 112b of the first touchscreen display 112 and the second flexible display 132b of the second touchscreen display 132 may be positioned between the first imaginary axis 101p and the second imaginary axis 103p. In other words, the display module of the first touchscreen display 112 and the display module of the second touchscreen display 132 may be positioned adjacent to each other. Further, the first flexible display 112b may include a first display periphery extending along the first periphery, and the second flexible display 132b may include a second display periphery extending along the second periphery. The distance L3 between the first imaginary axis 101p and the second imaginary axis 103p may be larger than the second distance L4 between the first display periphery and the second display periphery. That is, as the first display periphery is positioned adjacent to the second display periphery, the user's body part may be prevented from getting stuck in the second distance L4 even when the first and second housings 101 and 103 are rotated relative to each other.

According to an embodiment of the disclosure, the electronic device, as compared with conventional electronic devices with a screen non-implemented section L3, may have a reduced screen non-implemented section L4 between the end of the display module 112e of the first touchscreen display 112 and the end of the display module 132e of the second touchscreen display 132. That is, as the display module of the first touchscreen display 112 is positioned adjacent to the display module of the second touchscreen display 132, the gap between the first and second touchscreen displays 112 and 132 may be reduced, thus allowing images to be continuously displayed on the first and second touchscreen displays 112 and 132.

Figure 30:
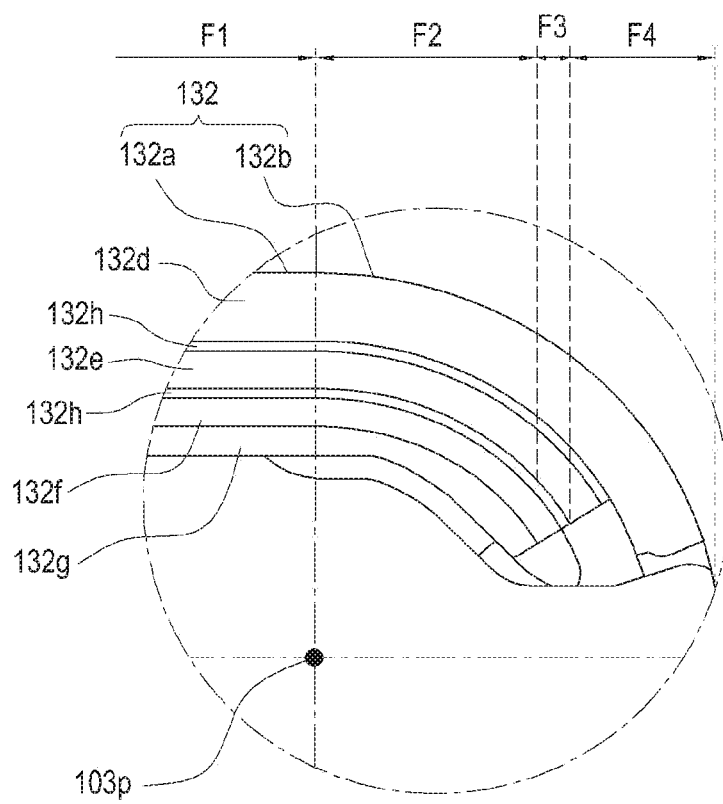
FIG. 30 is an enlarged view of portion E of FIG. 29.

FIG. 30 is an enlarged view of portion E of FIG. 29.

Referring to FIG. 30, the second touchscreen display 132 may include a first area F1, a second area F2, a third area F3, and a fourth area F4. In the first area F1, images may be output on the first flat part 132a. In the second area F2, the display module 132e may be provided to output images. In the third area F3, the display module 132e may be provided but without any pixel to output images, so that no image may be output. In the fourth area F4, the display module 132e is not provided, and thus no image is output.

Figure 31:
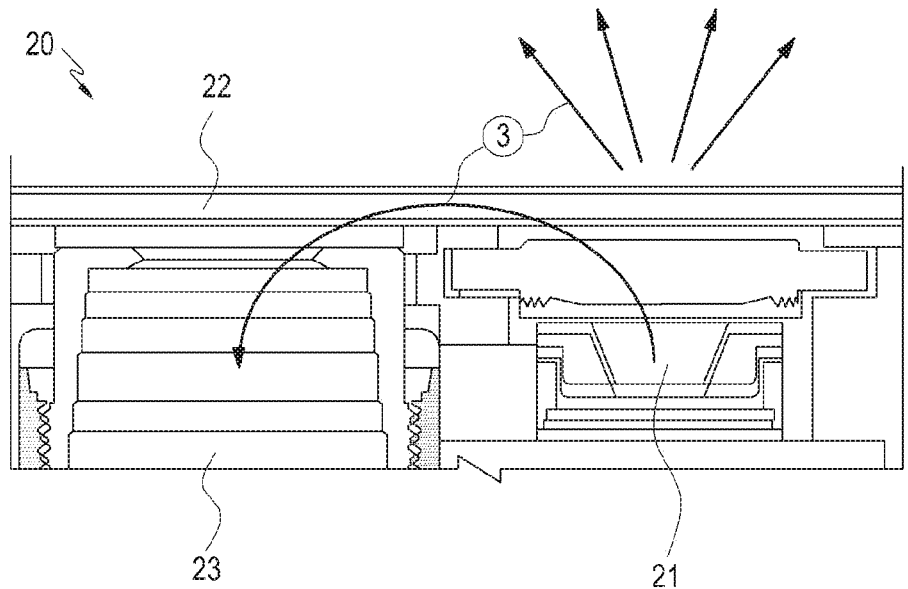
FIG. 31 is a cross-sectional view illustrating an example in which a camera is disposed adjacent a flash.
Figure 32:
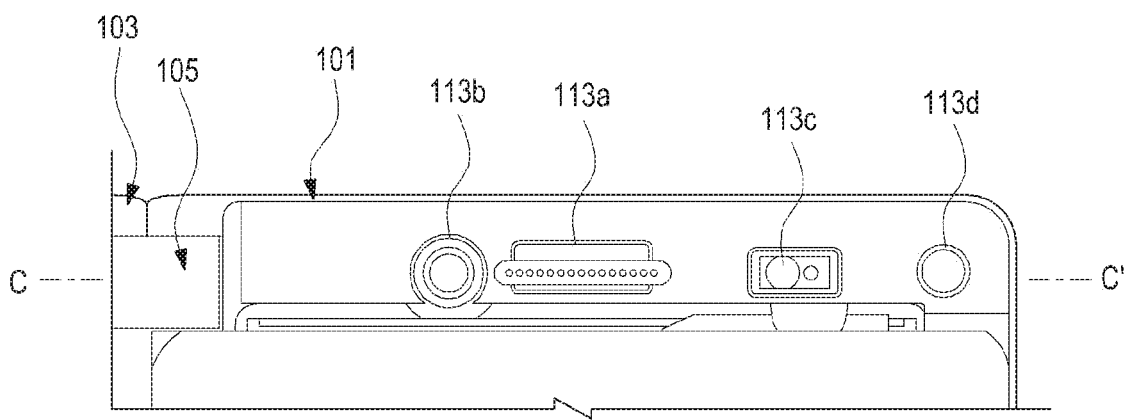
FIG. 32 is a front view illustrating a camera and flash of an electronic device according to an embodiment of the disclosure.
Figure 33:
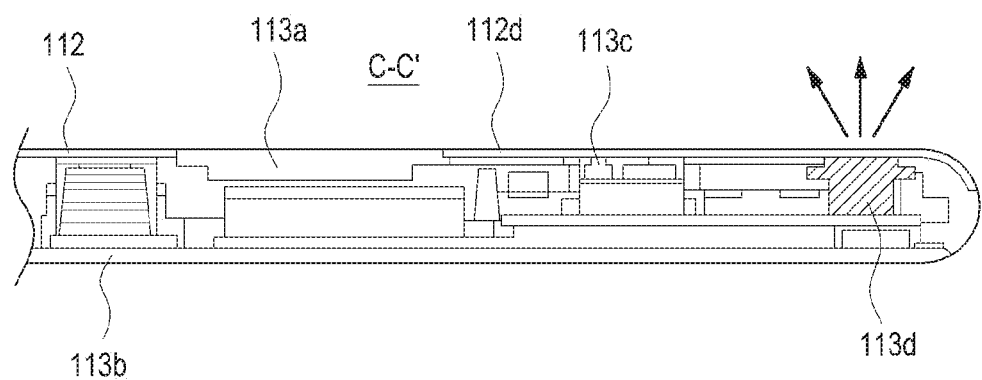
FIG. 33 is a cross-sectional view taken along line C-C' of FIG. 32.

FIG. 31 is a cross-sectional view illustrating an example in which a camera is disposed adjacent to a flash. FIG. 32 is a front view illustrating a camera and flash of an electronic device according to an embodiment of the disclosure. FIG. 33 is a cross-sectional view taken along line C-C' of FIG. 32.

First referring to FIG. 31, when a camera 23 is disposed adjacent to a flash 21, light ③ emitted from the flash 21 may be transferred through the window member 22 to the camera 23. The light ③ may directly affect the image sensor of the camera, resultantly deteriorating the quality of images implemented by the camera.

To address the issue, referring to FIGS. 32 and 33, the camera 113b of the electronic device, according to an embodiment of the disclosure, may be spaced apart from the flash 113d by a predetermined distance (e.g., 30 mm) or more.

The speaker 113a and the sensor 113c may be provided between the camera 113b and the flash 113d, blocking the light traveling through the window member 112d.

According to an embodiment of the disclosure, the window member 112 may include a flash window disposed in the area irradiated by the flash 113d. The flash window may be inserted into a hole formed in the window member 112d. A blocking member may be provided on a side surface of the flash window to block light. The blocking member may include a metal or pigment attached to the side surface of the flash window by plating or painting. According to an embodiment of the disclosure, even when the camera 113b and the flash 113d are disposed adjacent to each other, the flash window with the blocking member may prevent light from the flash 113d from being transmitted to the window.

Figure 34:
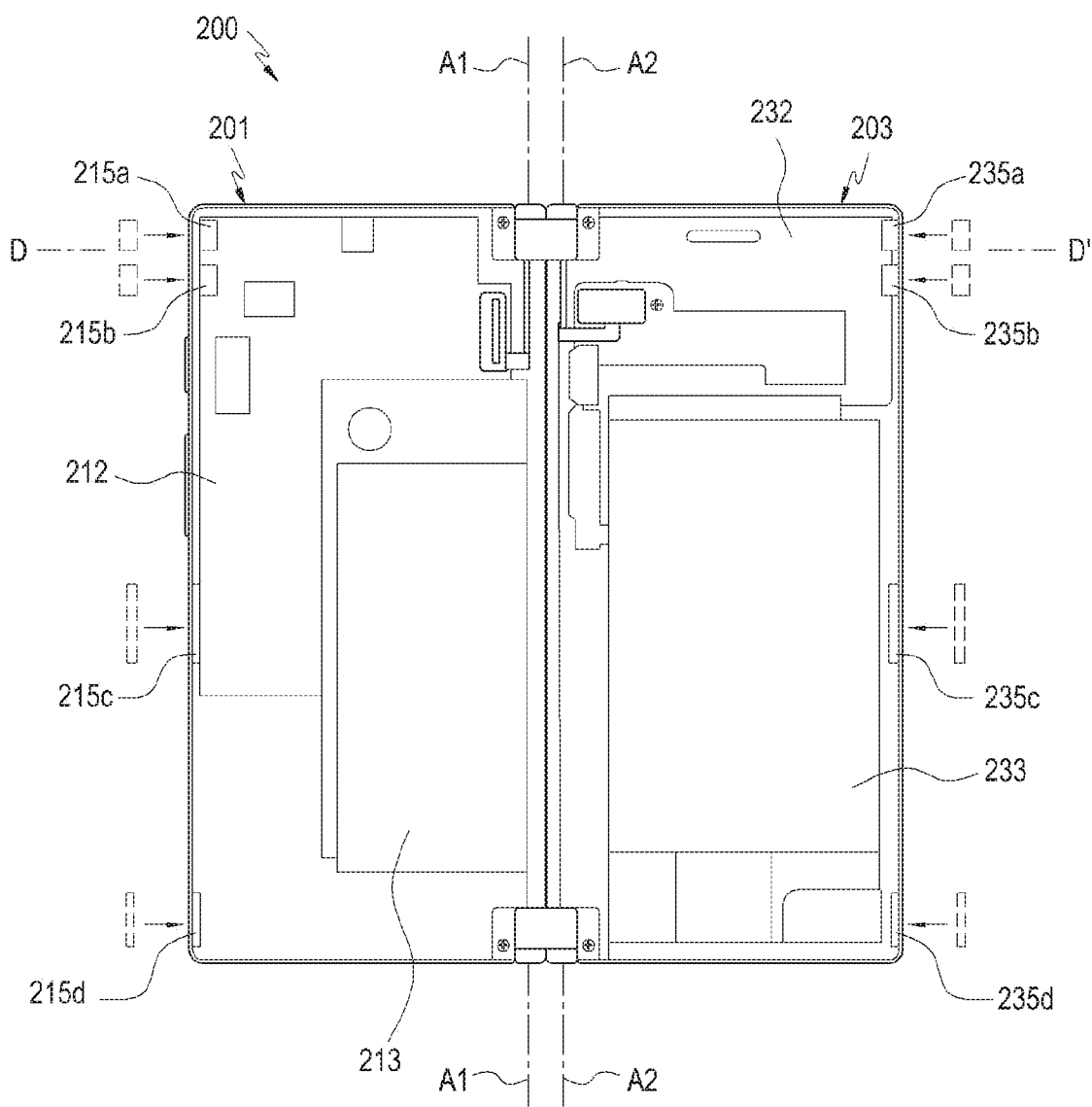
FIG. 34 is a rear view illustrating an electronic device according to an embodiment of the disclosure.
Figure 35:
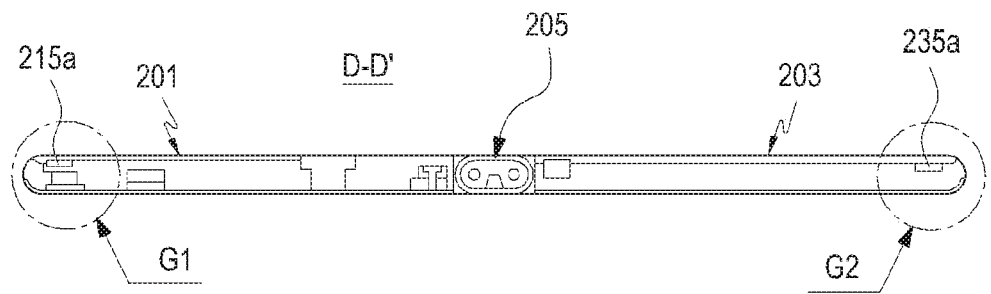
FIG. 35 is a cross-sectional view taken along line D-D' of FIG. 34.
Figure 36:
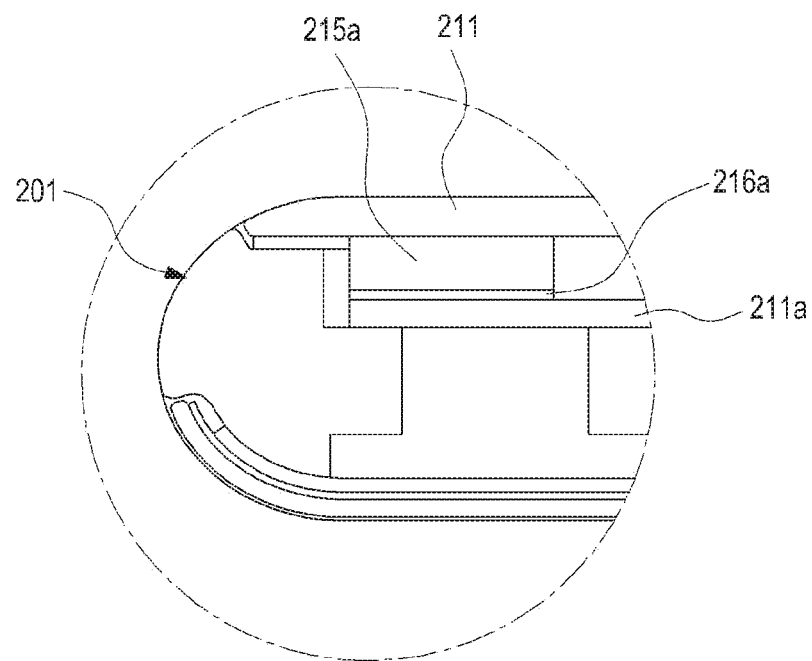
FIG. 36 is an enlarged view of portion G1 of FIG. 35.
Figure 37:
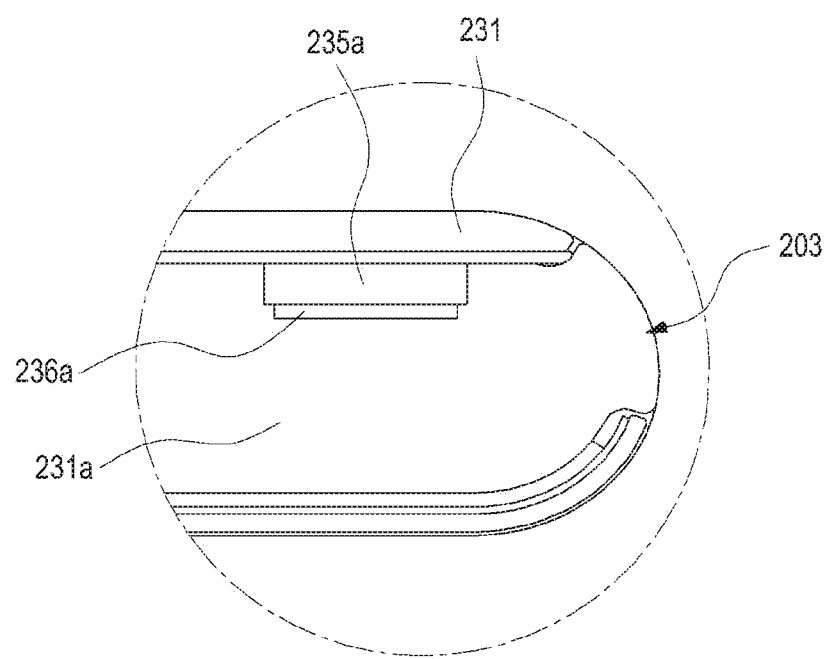
FIG. 37 is an enlarged view of portion G2 of FIG. 35.

FIG. 34 is a rear view illustrating an electronic device according to an embodiment of the disclosure. FIG. 35 is a cross-sectional view taken along line D-D' of FIG. 34. FIG. 36 is an enlarged view of portion G1 of FIG. 35. FIG. 37 is an enlarged view of portion G2 of FIG. 35.

Referring to FIGS. 34 to 37, according to another embodiment of the disclosure, an electronic device 200 may include a first housing 201, a second housing 203, a first hinge structure 205, a second hinge structure 207, and a plurality of magnets 215a, 215b, 215c, 215d, 235a, 235b, 235c, and 235d mounted in the first and second housings 201 and 202. The same or similar components to those in the above-described embodiments are omitted from the description, and the description focuses mainly on the plurality of magnets 215a, 215b, 215c, 215d, 235a, 235b, 235c, and 235d.

The plurality of magnets may include first magnets 215a, 215b, 215c, and 215d mounted in the first housing 201 and second magnets 235a, 235b, 235c, and 235d mounted in the second housing 203. The first magnets 215a, 215b, 215c, and 215d may be mounted on the edge of the first housing 201 which may be maximally spaced apart from the first and second hinge structures 205 and 207. The first magnets 215a, 215b, 215c, and 215d may be attached to the first housing 201 or a first extension 211a from the first housing by using an attaching member 216a. Here, the attaching member 216a may be a double-sided tape or liquid adhesive. The second magnets 235a, 235b, 235c, and 235d may also be mounted on the edge of the second housing 203 which may be maximally spaced apart from the first and second hinge structures 205 and 207. The second magnets 235a, 235b, 235c, and 235d may be attached to the second housing 203 or a second extension 231a from the second housing by using an attaching member 236a. Here, the attaching member 236a may be a double-sided tape or liquid adhesive. When the second housing 203 is rotated to face the first housing 201, the second magnets 235a, 235b, 235c, and 235d may be positioned corresponding to the first magnets 215a, 215b, 215c, and 215d, respectively. At this time, the second magnets 235a, 235b, 235c, and 235d may be formed with the opposite polarity of the first magnets 215a, 215b, 215c, and 215d. For example, when the first magnets 215a, 215b, 215c, and 215d have an N pole towards the second magnets 235a, 235b, 235c, and 235d, the second magnets 235a, 235b, 235c, and 235d may have an S pole towards the first magnets 215a, 215b, 215c, and 215d. Accordingly, when the second surface of the first housing 201 contacts the fourth surface of the second housing 203, the first magnets 215a, 215b, 215c, and 215d may attract the second magnets 235a, 235b, 235c, and 235d, allowing the contact between the second surface of the first housing 201 and the fourth surface of the second housing 203 to remain more stable. The plurality of magnets 215a, 215b, 215c, 215d, 235a, 235b, 235c, and 235d may keep more stable the state in which the selected angle described below is relatively 360 degrees between the first surface and the third surface.

According to an embodiment of the disclosure, the electronic device 200 may include a first rechargeable battery 213 provided in the first housing 201 and a second rechargeable battery 233 provided in the second housing 203. As the first rechargeable battery 213 and the second rechargeable battery 233, respectively, are separately disposed in the first housing 201 and the second housing 203, the first housing 201 and the second housing 203 may be designed to be similar in thickness and weight, leading to an easy-to-use design along with an increase in battery capacity.

Figure 38:
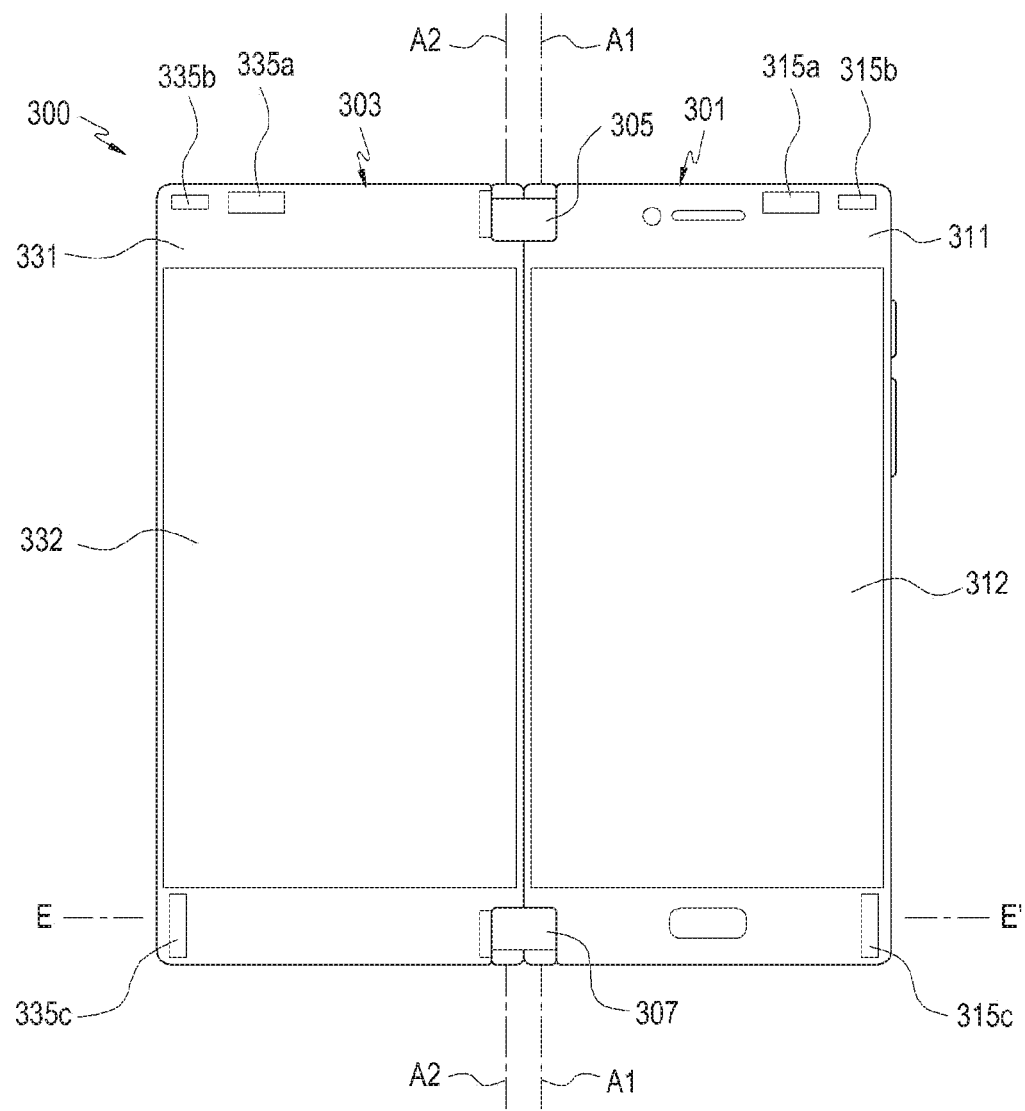
FIG. 38 is a front view illustrating an electronic device according to an embodiment.
Figure 39:
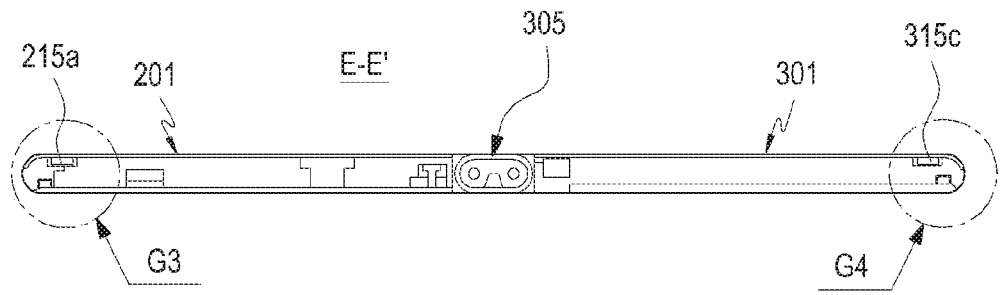
FIG. 39 is a cross-sectional view taken along line E-E' of FIG. 38.
Figure 40:
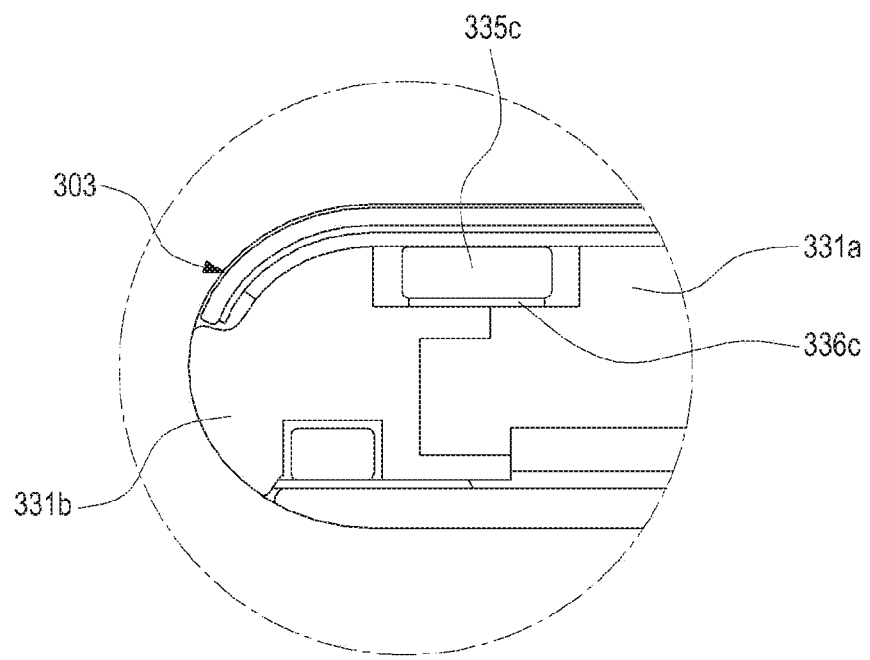
FIG. 40 is an enlarged view of portion G3 of FIG. 39.
Figure 41:
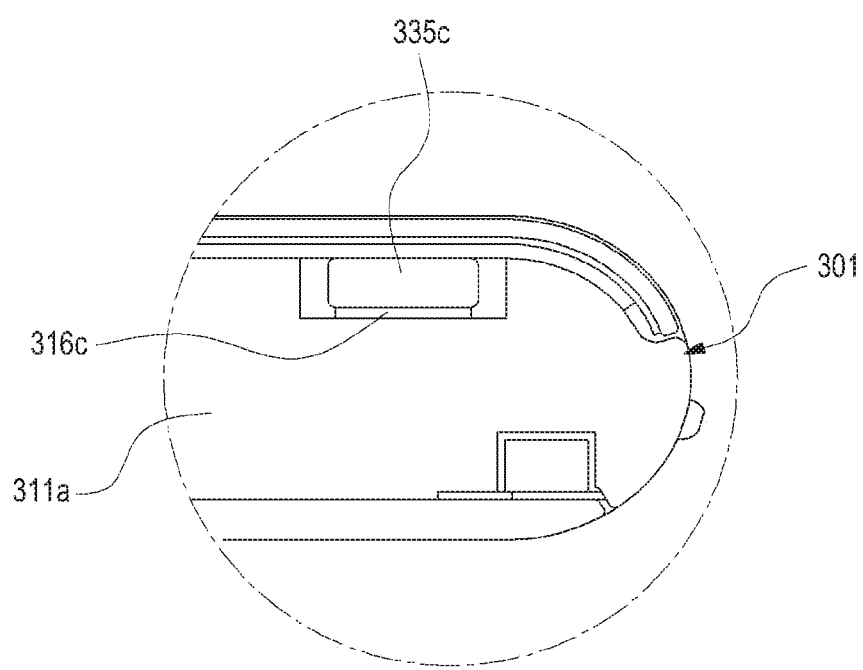
FIG. 41 is an enlarged view of portion G4 of FIG. 39.

FIG. 38 is a front view illustrating an electronic device according to an embodiment. FIG. 39 is a cross-sectional view taken along line E-E' of FIG. 38. FIG. 40 is an enlarged view of portion G3 of FIG. 39. FIG. 41 is an enlarged view of portion G4 of FIG. 39.

Referring to FIGS. 38 to 41, according to another embodiment of the disclosure, an electronic device 300 may include a first housing 301, a second housing 303, a first hinge structure 305, a second hinge structure 307, and a plurality of magnets 315a, 315b, 315c, 335a, 335b, and 335c mounted in the first and second housings 301 and 302. The same or similar components to those in the above-described embodiments are omitted from the description, and the description focuses mainly on the plurality of magnets 315a, 315b, 315c, 335a, 335b, and 335c.

The plurality of magnets may include first magnets 315a, 315b, and 315c mounted in the first housing 301 and second magnets 335a, 335b, and 335c mounted in the second housing 303. The first magnets 315a, 315b, and 315c may be mounted on an edge of the first housing 301. The first magnets 315a, 315b, and 315c may be attached to the first housing 301 or a first extension 311a from the first housing by using an attaching member 316c. Here, the attaching member 316c may be a double-sided tape or liquid adhesive. The second magnets 335a, 335b, and 335c may also be mounted on an edge of the second housing 303. The second magnets 335a, 335b, and 335c may be attached to the second housing 303 or a second extension 331a from the second housing by using an attaching member 336c. Here, the attaching member 336c may be a double-sided tape or liquid adhesive. When the second housing 303 is rotated to face the first housing 301, the second magnets 335a, 335b, and 335c may be positioned corresponding to the first magnets 315a, 315b, and 315c, respectively. At this time, the second magnets 335a, 335b, and 335c may be formed with the opposite polarity of the first magnets 315a, 315b, and 315c. For example, when the first magnets 315a, 315b, and 315c have an N pole towards the second magnets 335a, 335b, and 335c, the second magnets 335a, 335b, and 335c may have an S pole towards the first magnets 315a, 315b, and 315c. Accordingly, when the first surface of the first housing 201 contacts the third surface of the second housing 203, the first magnets 315a, 315b, and 315c may attract the second magnets 335a, 335b, and 335c, allowing the contact between the first surface of the first housing 301 and the fourth surface of the second housing 303 to remain more stable. The plurality of magnets 315a, 315b, 315c, 335a, 335b, and 335c may keep more stable the state in which the selected angle described below is relatively 0 degrees between the first surface and the third surface.

Figure 42:
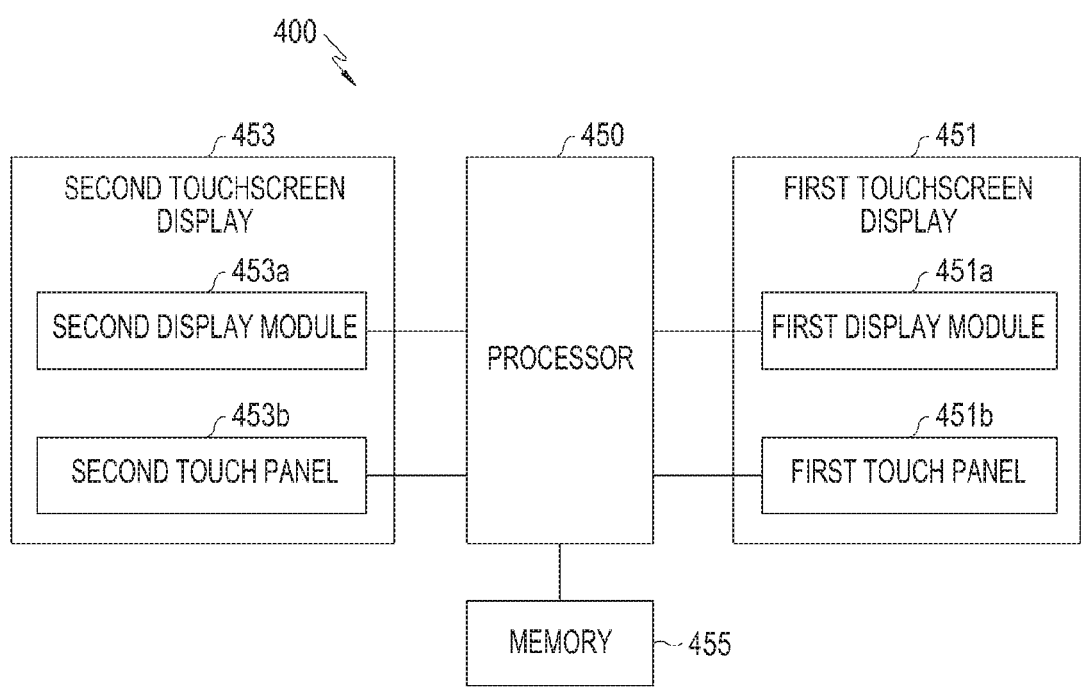
FIG. 42 is a block diagram illustrating an electronic device according to an embodiment of the disclosure.

FIG. 42 is a block diagram illustrating an electronic device according to an embodiment of the disclosure.

First, according to an embodiment of the disclosure, an electronic device 400 may be any one of the above-described electronic devices 100, 200, and 300, and no description of the same or similar components to those of the above-described electronic devices is presented below.

Referring to FIG. 42, according to an embodiment of the disclosure, the electronic device 400 may include a processor 450, a first touchscreen display 451, a second touchscreen display 453, and a memory 451.

The processor 450 may be positioned in at least one of the first housing (e.g., the first housing 101 of FIG. 23) or the second housing (e.g., the second housing 103 of FIG. 23) and may electrically connect to the first touchscreen display 451 and/or the second touchscreen display 453 through at least one of the first hinge structure (e.g., the first hinge structure 105 of FIG. 23) or the second hinge structure (e.g., the second hinge structure 107 of FIG. 23). According to an embodiment of the disclosure, a plurality of processors 450 may be provided in the first housing or the second housing, or a first processor and a second processor, respectively, may be provided in the first housing and the second housing.

The processor 450 may be connected with the first or second touchscreen display 451 to transfer an output signal to the first or second touchscreen display 451 to implement a screen or may receive an input signal from the first or second touchscreen display 451.

The first touchscreen display 451 may include a first touchscreen display module 451a and a first touch panel 451b. The first touchscreen display module 451a may receive an output signal from the processor 450 to implement a screen. The first touch panel 451b may transfer an input signal produced by the user's touch to the processor 450.

The second touchscreen display 453 may include the second display module 453a and a second touch panel 453b. The second display module 453a may receive an output signal from the processor 450 to implement a screen. The second touch panel 453b may transfer an input signal produced by the user's touch to the processor 450.

The memory 455 may be positioned in at least one of the first housing or the second housing and may electrically connect to the processor 450. The memory 455 may store instructions capable of driving the processor. The instructions, after being executed, may drive the processor 450 to display a selected preview image on at least one of the first touchscreen display 451 or the second touchscreen display 453.

Figure 43:
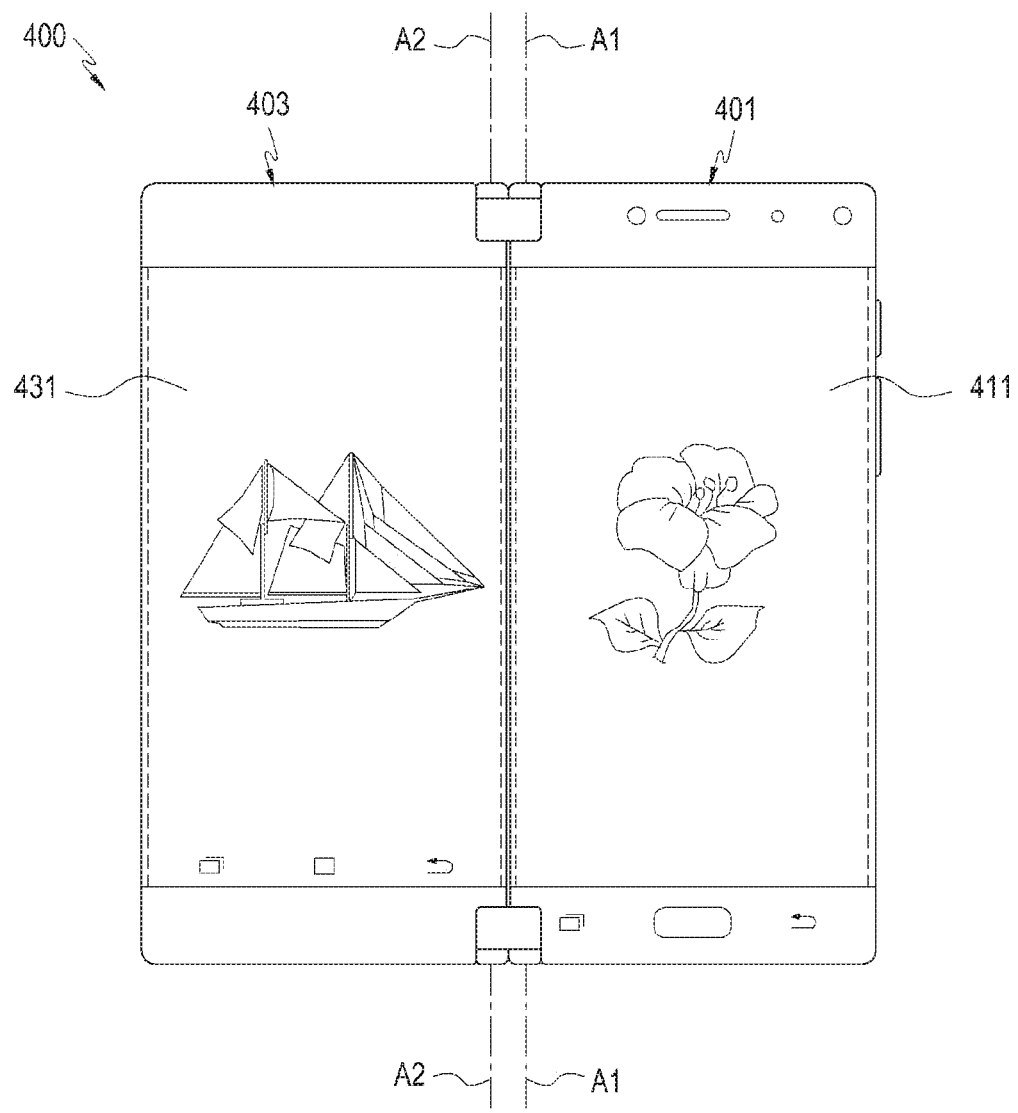
FIG. 43 is a front view illustrating an example of using a first and second touchscreen display of an electronic device according to an embodiment of the disclosure.

FIG. 43 is a front view illustrating an example of using a first and second touchscreen display of an electronic device according to an embodiment of the disclosure.

Referring to FIG. 43, when the second housing 403 is rotated 180 degrees about the first housing 401 to be unfolded, a first screen may be implemented on the first touchscreen display 411 of the first housing 401, and a second screen may be implemented on the second touchscreen display 431 of the second housing 403. For example, when an application (e.g., a gallery) is driven on the electronic device 400, the first screen may be displayed on the first touchscreen display 411, and the second screen may be displayed on the second touchscreen display 431. When the user touches the first touchscreen display 411 or the second touchscreen display 431 in a predetermined pattern, the first screen may be displayed on the second touchscreen display 431 while a third screen may be displayed on the first touchscreen display 411, or the second screen may be displayed on the first touchscreen display 411 while the third screen may be displayed on the second touchscreen display 431.

Figure 44:
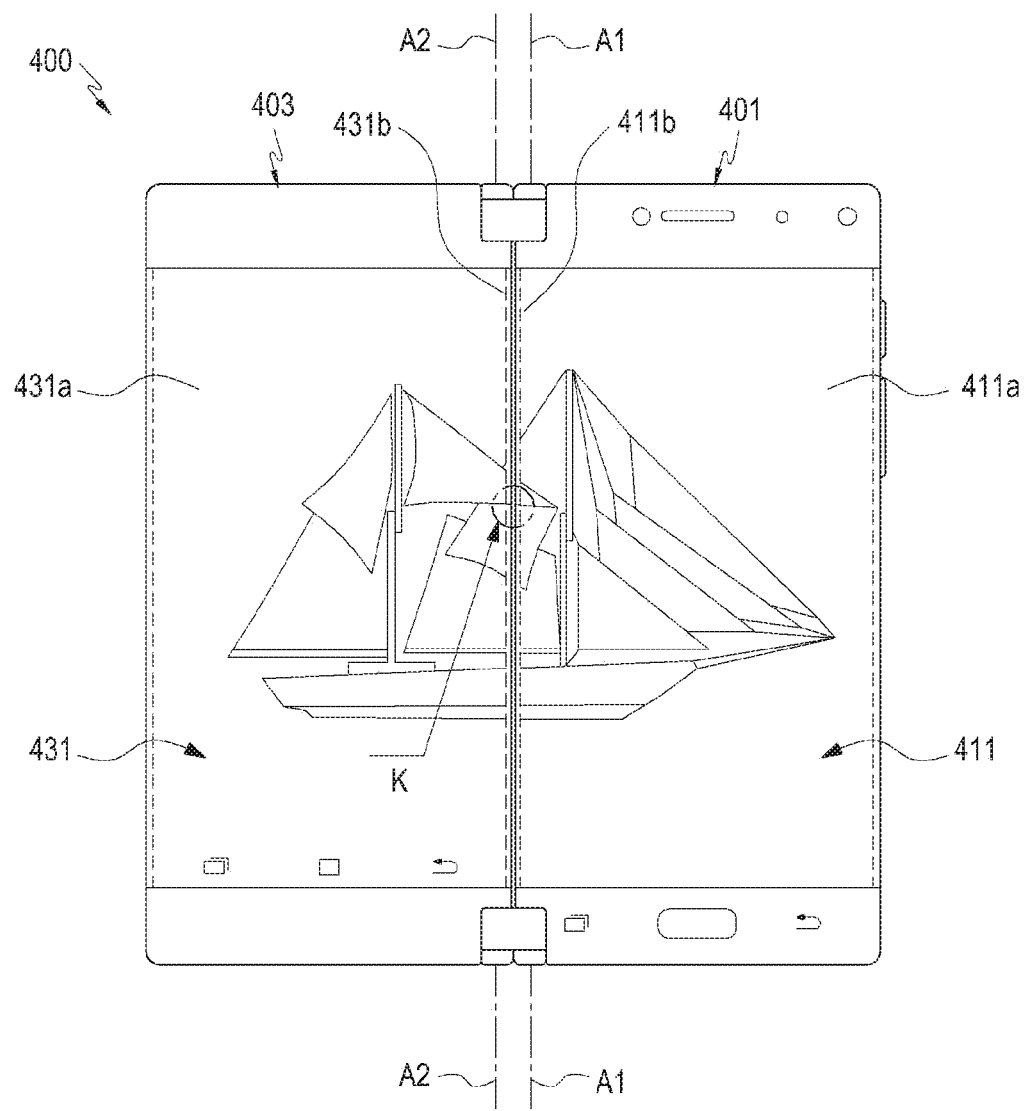
FIG. 44 is a front view illustrating a screen displayed on a first and second touchscreen display of an electronic device according to an embodiment of the disclosure.
Figure 45:
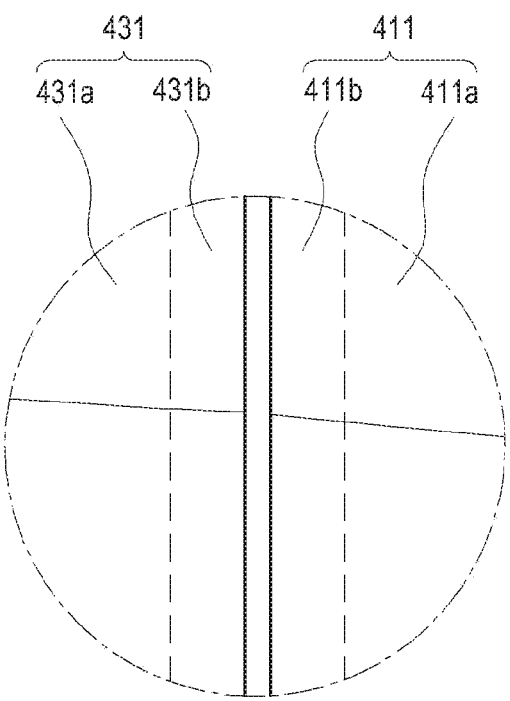
FIG. 45 is an enlarged view of portion K of FIG. 44.

FIG. 44 is a front view illustrating a screen displayed on a first and second touchscreen display of an electronic device according to an embodiment of the disclosure. FIG. 45 is an enlarged view of portion K of FIG. 44.

Referring to FIGS. 44 and 45, the first touchscreen display 411 may include a flat part 411a disposed on the first surface of the first housing 401 and a first flexible display 411b disposed on the first periphery of the first housing 401.

The second touchscreen display 411 may include a flat part 431a disposed on the first surface of the second housing 403 and a second flexible display 431b disposed on the second periphery of the second housing 403.

The electronic device 400 may implement a single continuous screen through the first flat part 411a, the first flexible display 411b, the second flexible display 431b, and the second flat part 431a.

Since the first flexible display 411b and the second flexible display 431b are formed to be curved, and the first flat part 411a and the second flat part 431a are formed to be flat, the image displayed on the first flexible display 411b and the second flexible display 431b may be different from the image displayed on the first flat part 411a and the second flat part 431a.

The processor 450 (FIG. 42) may correct disparities that may be caused by the curves of the first flexible display 411b and the second flexible display 431b.

Figure 46:
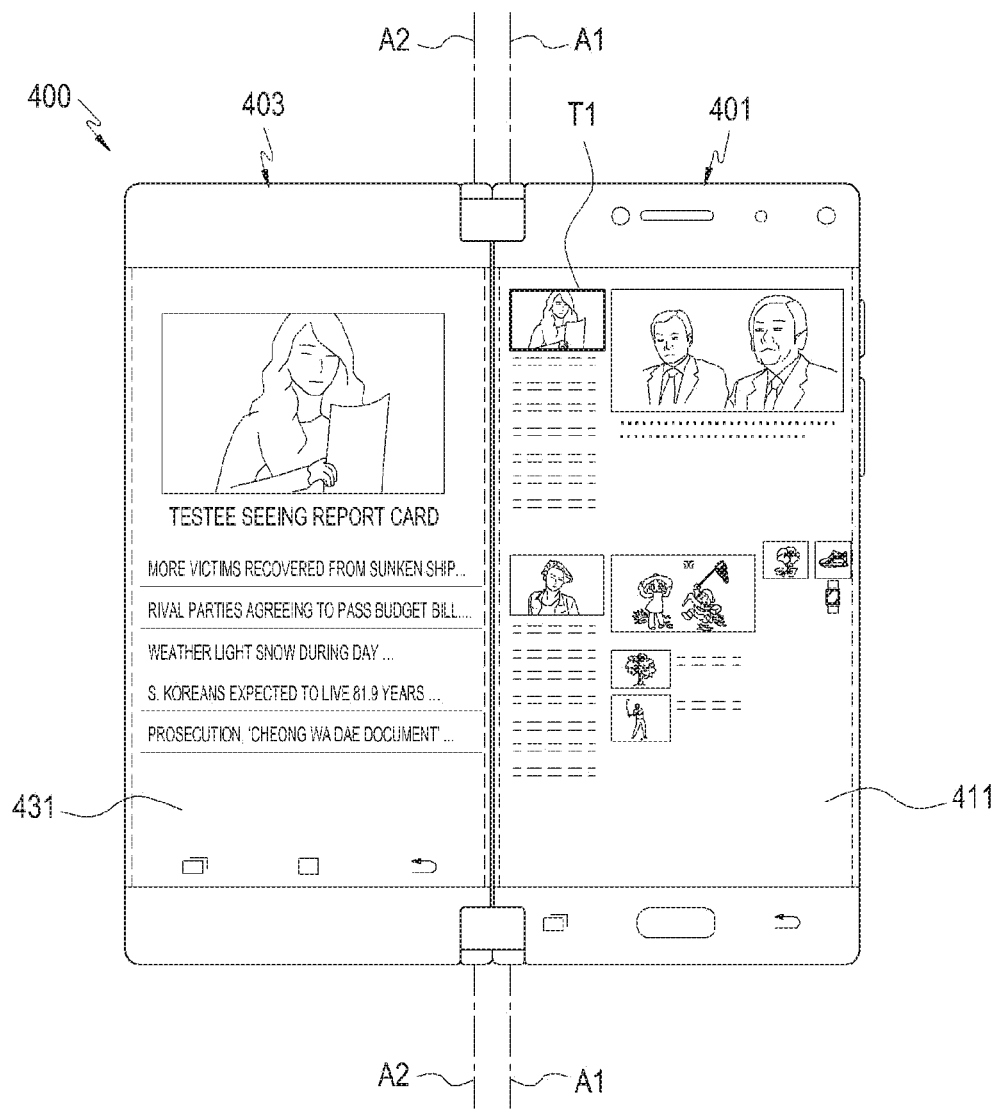
FIG. 46 is a front view illustrating another example of using a first and second touchscreen display of an electronic device according to an embodiment of the disclosure.

FIG. 46 is a front view illustrating another example of using a first and second touchscreen display of an electronic device according to an embodiment of the disclosure.

Referring to FIG. 46, when the second housing 403 is rotated 180 degrees about the first housing 401 to be unfolded, a first screen may be implemented on the first touchscreen display 411 of the first housing 401. When the user touches a portion T1 of the first touchscreen display 411, the portion T of the first touchscreen display 411 may be enlarged and displayed on the second touchscreen display 431.

Figure 47:
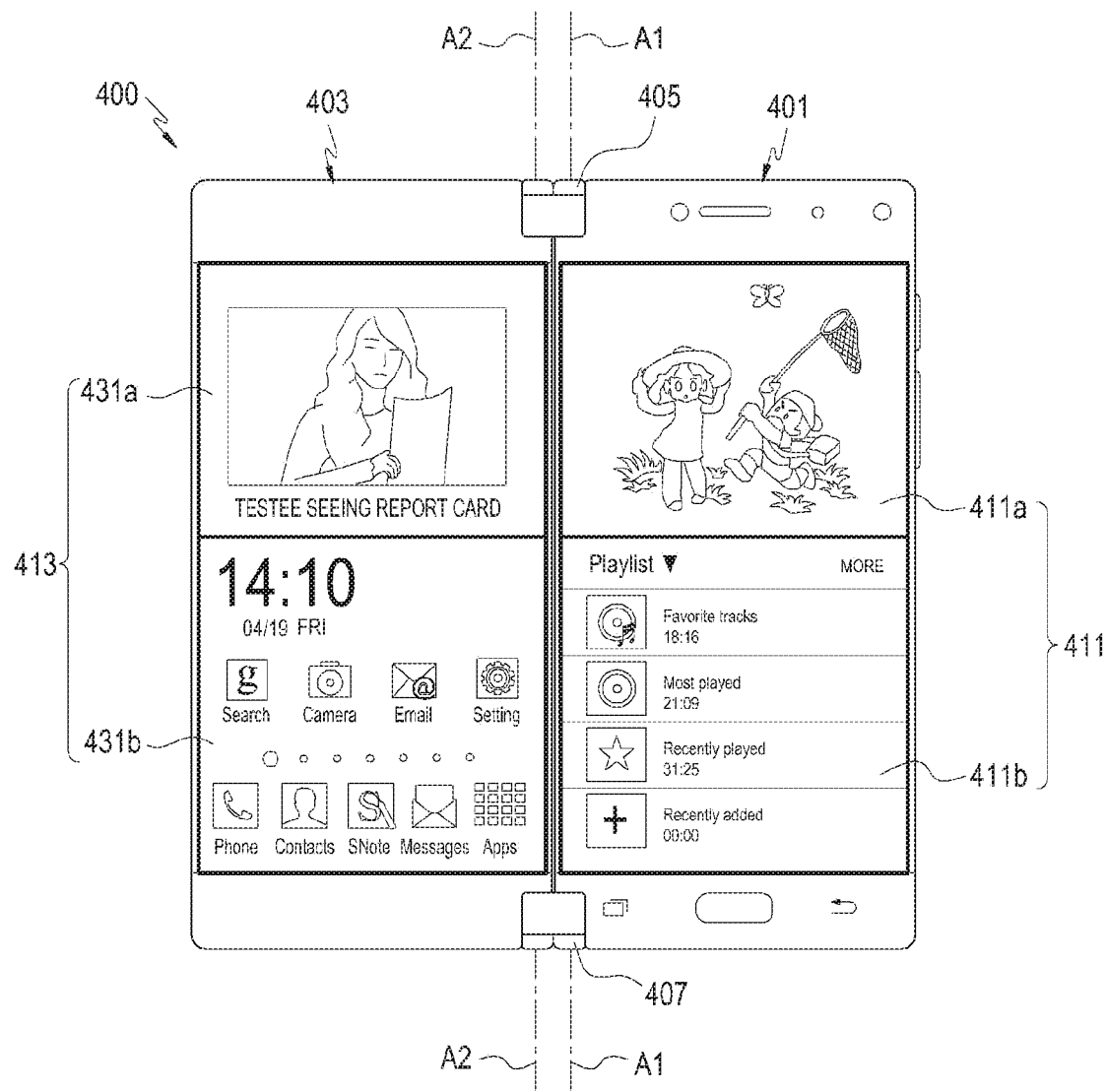
FIG. 47 is a front view illustrating yet another example of using a first and second touchscreen display of an electronic device according to an embodiment of the disclosure.

FIG. 47 is a front view illustrating yet another example of using a first and second touchscreen display of an electronic device according to an embodiment of the disclosure.

Referring to FIG. 47, the first touchscreen display 411 of the first housing 401 may include a first section 411a and a second section 411b. For example, the size of the second section 411b may correspond to the size of the first section 411a. Different applications may be implemented on the first section 411a and the second section 411b. For example, a gallery application to implement photos or pictures may be implemented on the first section 411a, and a music application may be implemented on the second section 411b.

The second touchscreen display 431 of the second housing 403 may include a third section 431a and a fourth section 431b. For example, the size of the fourth section 431b may correspond to the size of the third section 431a. Different applications may be implemented on the third section 431a and the fourth section 431b. For example, a news application may be implemented on the third section 431a, and part (e.g., clock, weather, and various icons to drive applications) of the main screen may be implemented on the fourth section 431b.

The electronic device 400 may implement various applications on the first, second, third, and fourth sections 411a, 411b, 431a, and 431b, allowing the user to simultaneously use various contents on the electronic device.

Figure 48A:
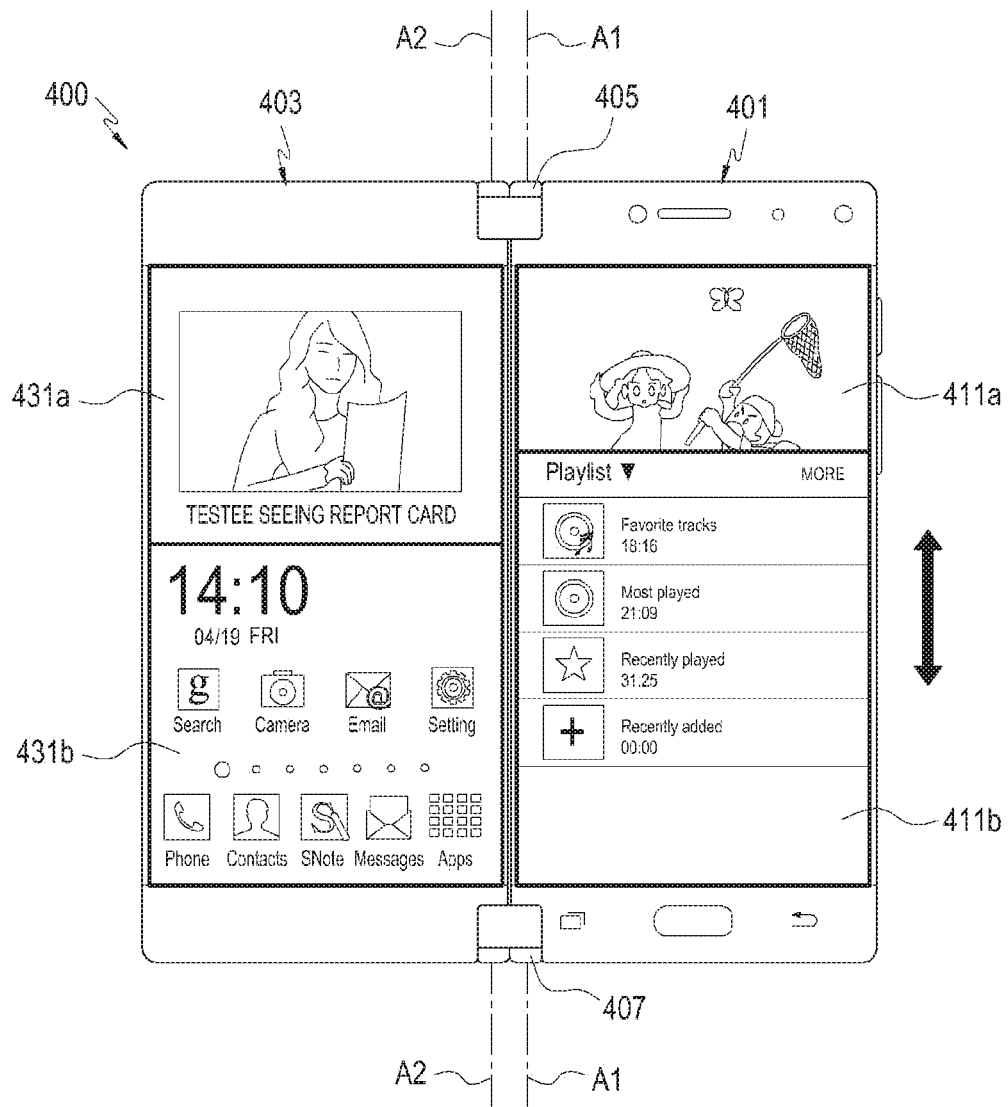
FIG. 48a is a front view illustrating yet another example of using a first and second touchscreen display of an electronic device according to an embodiment of the disclosure.

FIG. 48a is a front view illustrating yet another example of using a first and second touchscreen display of an electronic device according to an embodiment of the disclosure.

Referring to FIG. 48a, when one of the first, second, third, and fourth sections 411a, 411b, 431a, and 431b is touched by a first gesture, the first, second, third, and fourth sections 411a, 411b, 431a, and 431b may be resized. Here, the first gesture may mean touching on a point in the first, second, third, and fourth sections 411a, 411b, 431a, and 431b and moving in a particular direction. For example, when a point in the second section 411b is touched and moved towards the first section 411a, the second section 411b may be enlarged, and the first section 411a may be shrunken as much as the second section 411b is enlarged. In contrast, when a point in the second section 411b is touched and moved away from the first section 411a, the second section 411b may be shrunken, and the first section 411a may be enlarged as much as the second section 411b is shrunken.

According to an embodiment of the disclosure, a first application implemented on the first section 411a, as touched by a second gesture, may be implemented on the second section 411b while a second application implemented on the second section 411b may be simultaneously implemented on the first section 411a. In other words, the first and second applications, as touched by the second gesture, may be implemented on the modified first and second sections 411a and 411b, respectively. Here, the second gesture may mean touching on a point in the first or second section and rotating the touch clockwise or counter-clockwise. However, the second gesture is not limited to a clockwise or counterclockwise rotation but instead may be various patterns of touch. The third and fourth applications implemented on the third and fourth sections 431 and 431b, as touched by the second gesture, may be implemented on the third and fourth sections 431a and 431b that have switched their position.

Figure 48B:
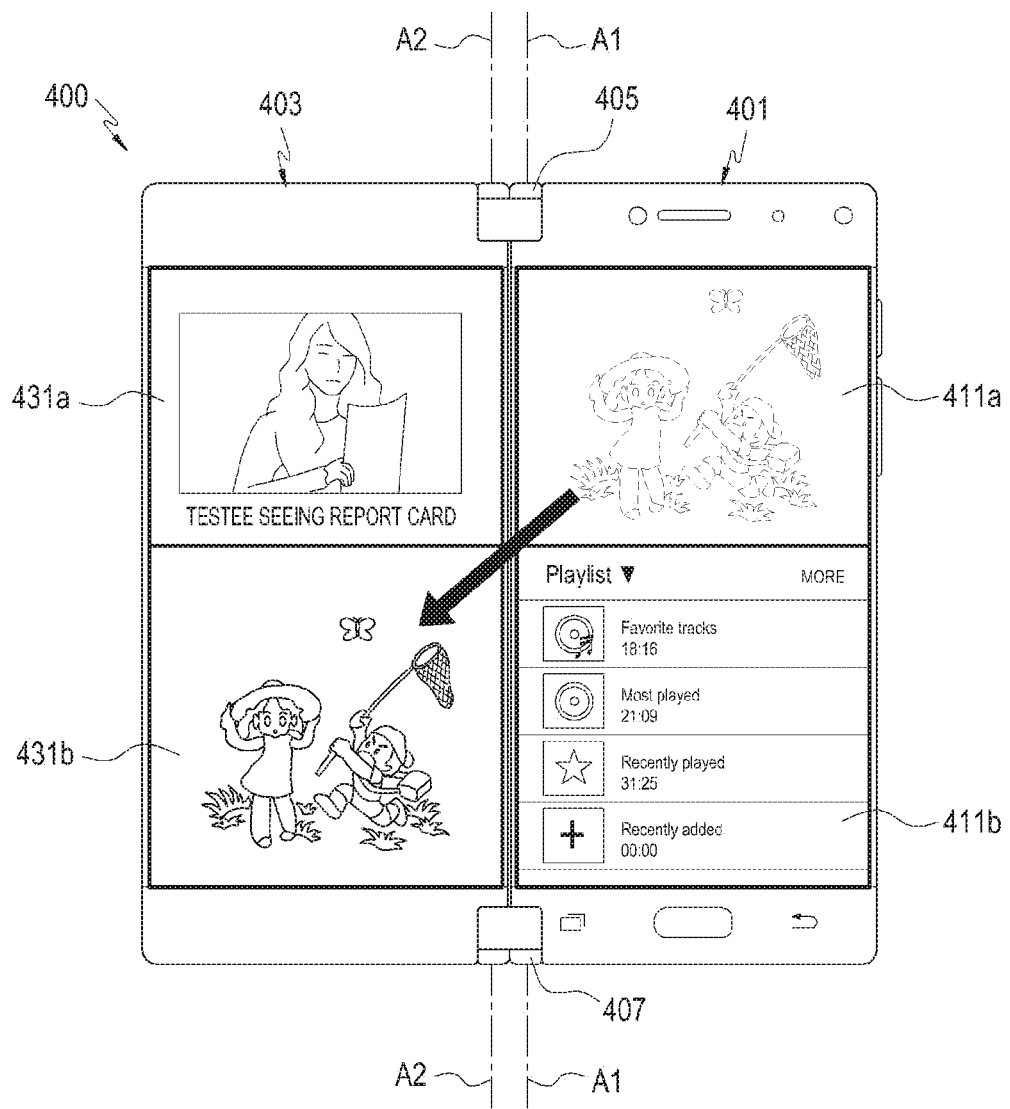
FIG. 48b is a front view illustrating yet another example of using a first and second touchscreen display of an electronic device according to an embodiment of the disclosure.

FIG. 48b is a front view illustrating yet another example of using a first and second touchscreen display of an electronic device according to an embodiment of the disclosure.

Referring to FIG. 48b, one of the first and second applications implemented on the first and second sections 411a and 411b, as touched by a third gesture, may be implemented on one of the third section 431a, the fourth section 431b, and the entire screen of the second touchscreen display 431, which is the merged screen of the third section 431a and the fourth section 431b. The third gesture may mean touching on a point in the first or second section 411a or 411b when the first or second application is implemented and moving the touch towards the second touchscreen display 431. Further, the first or second application implemented on the first or second section 411a or 411b, as touched by the third gesture, may be implemented on the third section 431a or the fourth section 431b. At this time, the application implemented on the third section 431a or the fourth section 431b may be implemented on the first or second section 411a or 411b. In contrast, the third or fourth application implemented on the third or fourth section 431a or 431b, as touched by the third gesture, may be implemented on the first section 411a or the second section 411b. At this time, the application implemented on the first section 411a or the second section 411b may be implemented on the third or fourth section 431a or 431b.

Figure 49:
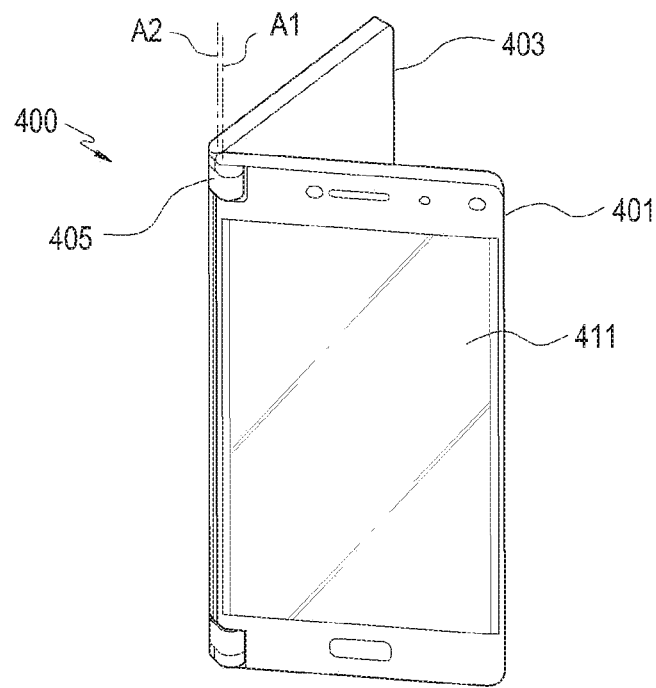
FIG. 49 is a perspective view illustrating an example in which an electronic device is propped up in a longitudinal direction according to an embodiment of the disclosure.

FIG. 49 is a perspective view illustrating an example in which an electronic device is propped up in a longitudinal direction according to an embodiment of the disclosure.

Referring to FIG. 49, the second housing 403 may be rotated at a predetermined angle about the first housing 401. The elastic member 159 (FIG. 1) of the first hinge structure 405 and the elastic members 179 and 179c (FIG. 1) of the second hinge structure 407 may keep the first housing 401 and the second housing 403 agape. As the first housing 401 remains agape at a predetermined angle from the second housing 403, the electronic device 400 may be propped up along its lengthwise direction on a desk or table.

Figure 50:
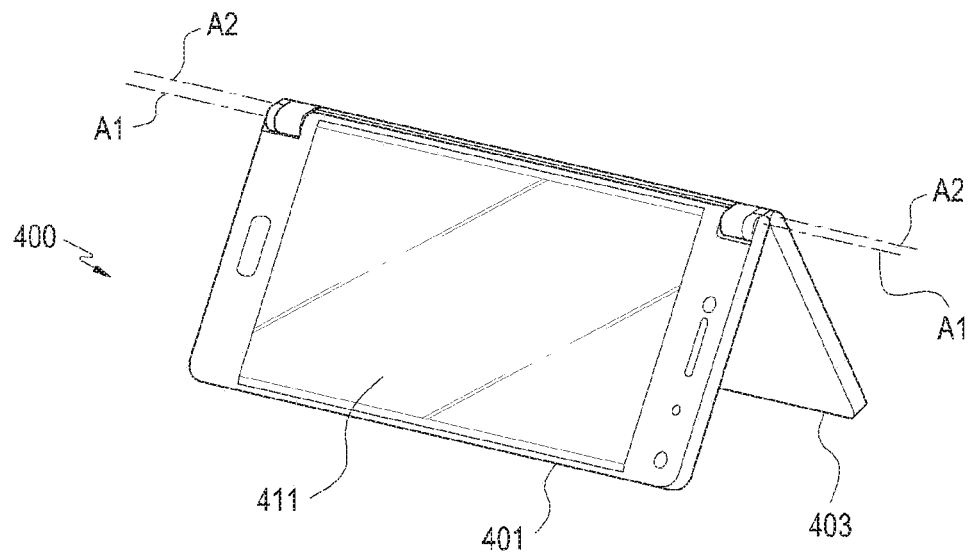
FIG. 50 is a perspective view illustrating an example in which an electronic device is propped up slanted according to an embodiment of the disclosure.

FIG. 50 is a perspective view illustrating an example in which an electronic device is propped up slantedly according to an embodiment of the disclosure.

Referring to FIG. 50, the second housing 403 may be rotated at a predetermined angle about the first housing 401. The elastic member 159 (FIG. 1) of the first hinge structure 405 and the elastic members 179 and 179c (FIG. 1) of the second hinge structure 407 may keep the first housing 401 and the second housing 403 agape. As the first housing 401 remains agape at a predetermined angle from the second housing 403, the first housing 401 and the second housing 403 may be placed slantedly on a desk (or table).

Figure 51:
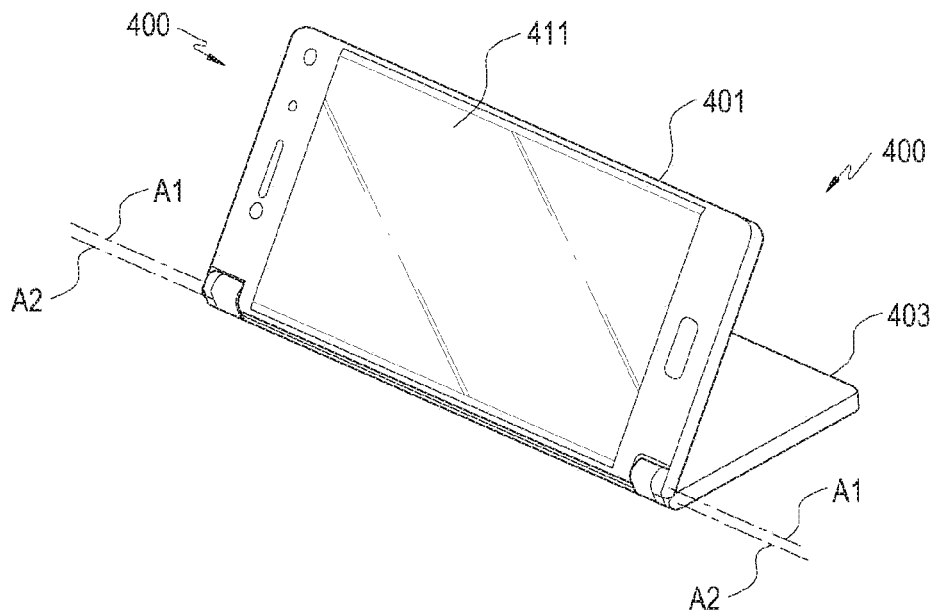
FIG. 51 is a perspective view illustrating an example in which a first housing of an electronic device is propped up slanted according to an embodiment of the disclosure.

FIG. 51 is a perspective view illustrating an example in which the first housing of an electronic device is propped up slantedly according to an embodiment of the disclosure.

Referring to FIG. 51, the second housing 403 may be rotated at a predetermined angle about the first housing 401. The elastic member 159 (FIG. 1) of the first hinge structure 405 and the elastic members 179 and 179c (FIG. 1) of the second hinge structure 407 may keep the first housing 401 and the second housing 403 agape. As the first housing 401 remains agape at a predetermined angle from the second housing 403, the first housing 403 may be propped up slantedly on a desk (or table), with the second housing 403 lying on the desk (or table).

Figure 52:
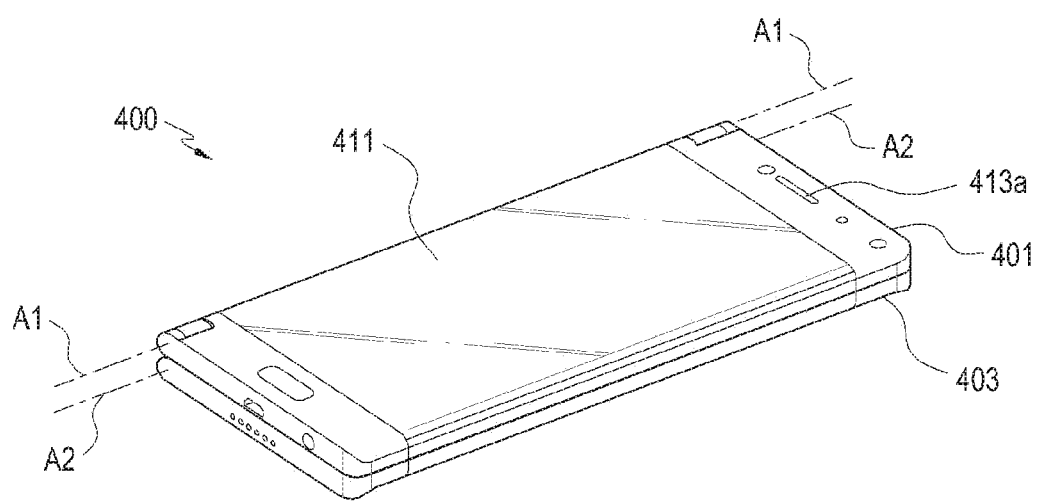
FIG. 52 is a perspective view illustrating a state in which a second surface of a first housing of an electronic device contacts a fourth surface of a second housing, according to an embodiment of the disclosure.
Figure 53:
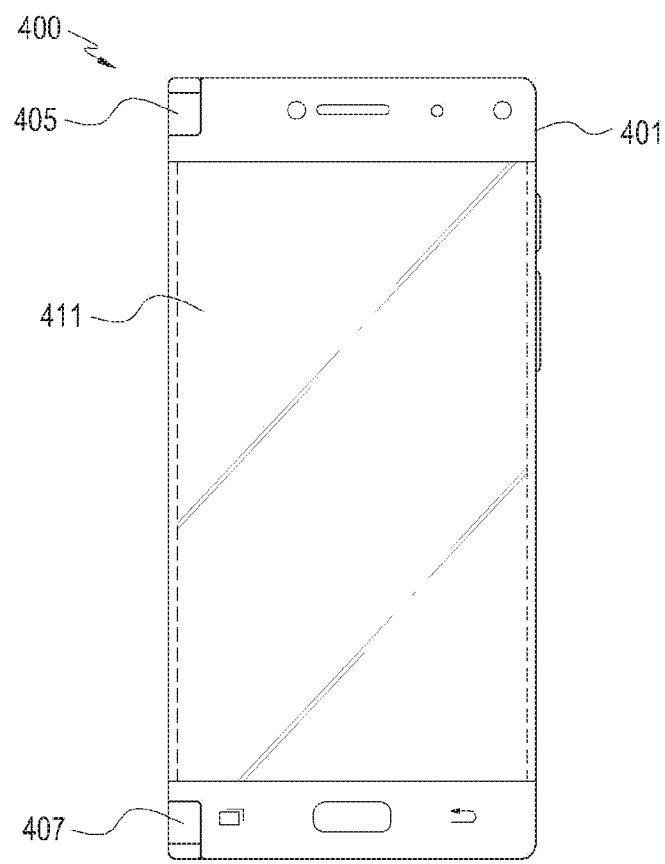
FIG. 53 is a front view of FIG. 52.
Figure 54:
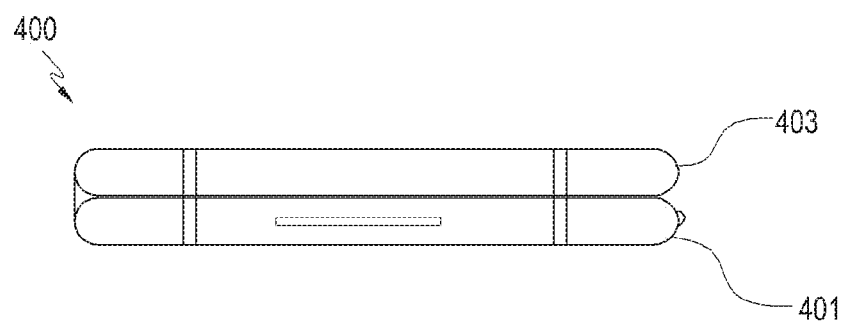
FIG. 54 is a rear view of FIG. 52.
Figure 55:
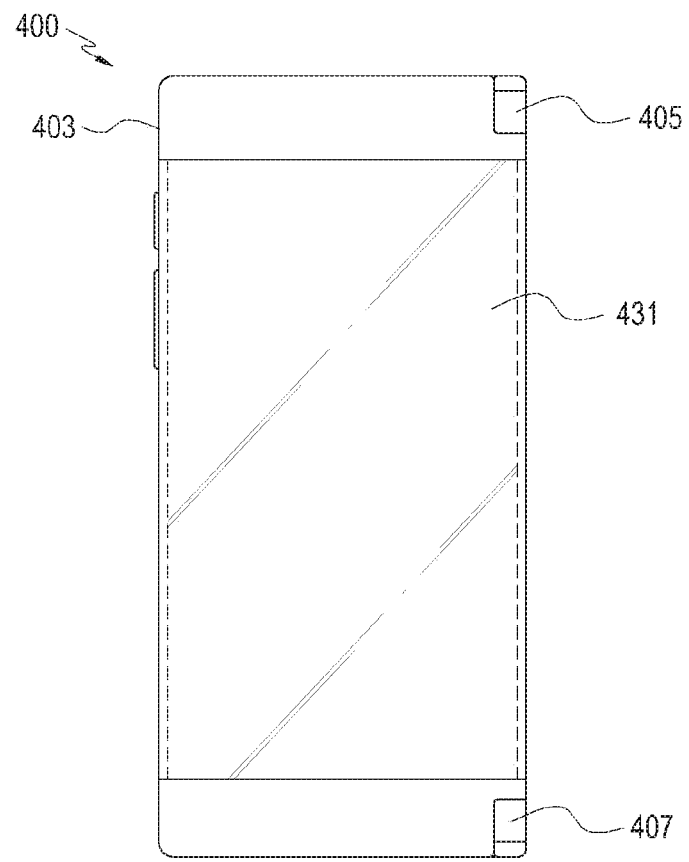
FIG. 55 is a plan view of FIG. 52.
Figure 56:
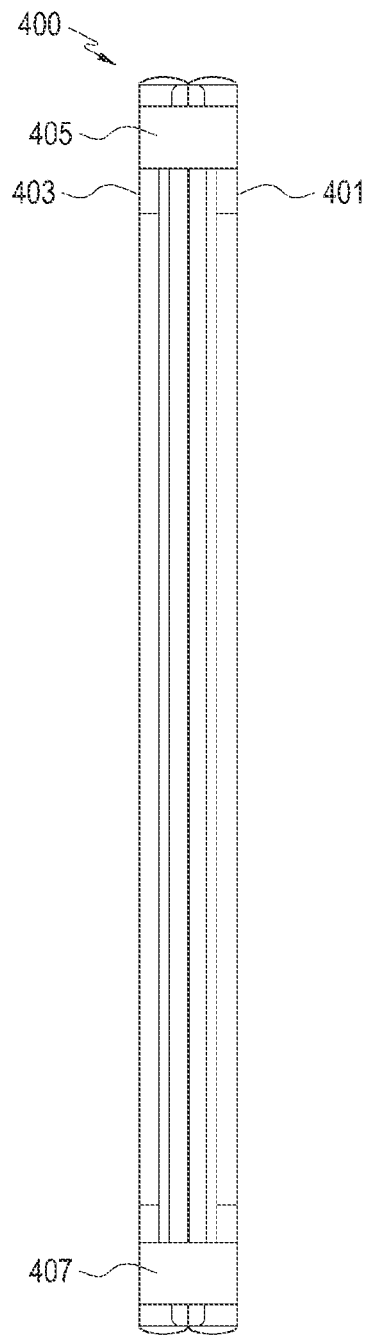
FIG. 56 is a left side view of FIG. 52.
Figure 57:
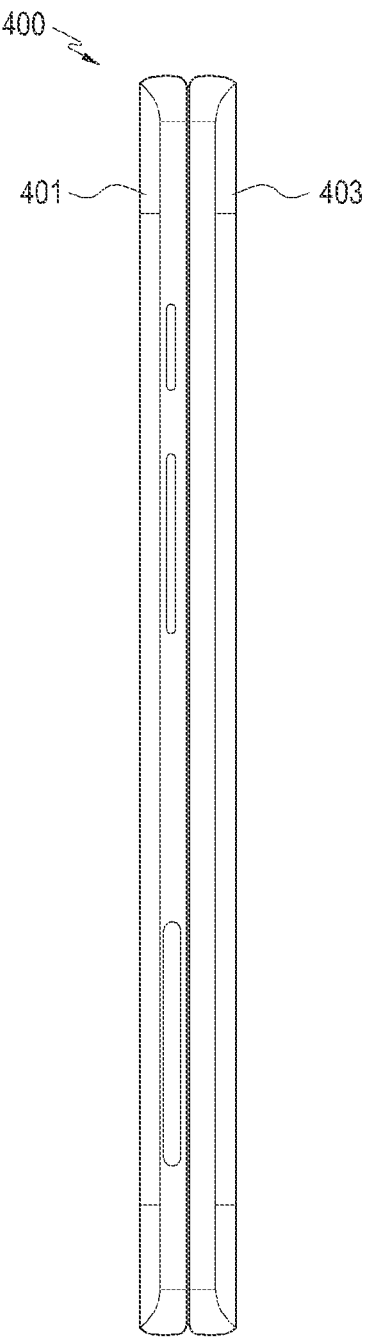
FIG. 57 is a right side view of FIG. 52.
Figure 58:
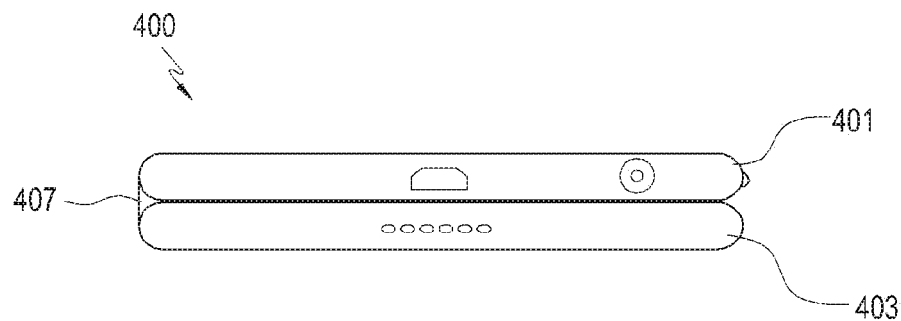
FIG. 58 is a bottom view of FIG. 52.

FIG. 52 is a perspective view illustrating a state in which the second surface of a first housing of an electronic device contacts the fourth surface of a second housing, according to an embodiment of the disclosure. FIG. 53 is a front view of FIG. 52. FIG. 54 is a rear view of FIG. 52. FIG. 55 is a plan view of FIG. 52. FIG. 56 is a left side view of FIG. 52. FIG. 57 is a right side view of FIG. 52. FIG. 58 is a bottom view of FIG. 52.

Referring to FIGS. 52 to 58, the fourth surface of the second housing 403 (e.g., the opposite surface where the second touchscreen display of the second housing 403 is disposed) may contact the second surface of the first housing 401 (e.g., the opposite surface where the first touchscreen display 411 of the first housing 401 is disposed). Here, the state in which the second surface of the first housing 401 contacts the fourth surface of the second housing 403 may be defined as a second state. The second state may be defined as being when the first and third surfaces are angled at 360 degrees therebetween.

As such, according to an embodiment of the disclosure, the first hinge structure 405 and the second hinge structure 407 may allow the first housing 401 and the second housing 403 to rotate relative to each other in the first state and the second state.

The electronic device 401 including the second housing 403 facing the first housing 401 may allow the first touchscreen display 411 to externally display while ensuring increased portability.

A proximity sensor (not shown) may be provided on the second surface of the first housing 401 or the fourth surface of the second housing 403. Upon detecting the second housing 403 facing the first housing 401, the proximity sensor may deliver a detecting signal to the processor 450 described below, and the processor may then cut off power to the second touchscreen display 431. However, whether to cut off power to the second touchscreen display 431 may be determined by software settings implemented on the electronic device. The processor 450 (FIG. 42) may enable the second touchscreen display 431 to output an image to indicate a power saving mode by the software settings.

When the user touches on the second touchscreen display 431 in a predetermined pattern, the predetermined pattern of touch may be utilized as an input signal to the electronic device. For example, when a touch is made on the second touchscreen display 431 along one direction, the screen implemented on the first touchscreen display 411 may be switched to another screen, or the application implemented may be switched to another application. As such, when the user grips the electronic device 400 while viewing the first touchscreen display 411, the user may comfortably produce an input signal by touching the second touchscreen display 431 which is positioned adjacent to their finger.

Meanwhile, a typical electronic device (e.g., a smartphone) may include a front camera installed on the front surface of the housing and a second camera installed on the rear surface of the housing. When the user captures the external environment using a typical electronic device, the touchscreen display installed on the front surface of the housing may implement an image obtained by the rear camera, and the user may capture their desired image of the external environment while viewing the touchscreen display. When the user captures their face or another body part on their own, the touchscreen display installed on the front surface of the housing may implement the image obtained by the front camera. The user may capture an image of their own body while viewing the touchscreen display. A typical electronic device may have two cameras (e.g., a front camera and a rear camera) to allow the user to comfortably capture their own body or the external environment while viewing the touchscreen display.

On the contrary, according to another embodiment of the disclosure, the electronic device 400 may include a single camera 413a to allow an image captured by the camera 413a to be implemented on either the first touchscreen display 411 or the second touchscreen display 431. For example, the camera 413a may be disposed on the first surface but not on the second surface. When the user captures the external environment, the camera 413a may be directed to the external environment so that the second touchscreen display 431 may implement the image obtained by the camera 413a. The user may capture their desired image of the external environment while viewing the second touchscreen display 431. When the user directly captures their face or another body part, the camera 413a may be directed to the user's body so that the first touchscreen display 411 may implement the image obtained by the camera 413a. The user may capture an image of their own body while viewing the first touchscreen display 411a.

According to another embodiment of the disclosure, the electronic device 400 may allow the user to comfortably capture their body or the external environment only with the single camera 431 as the image captured by the camera 413a is implemented on at least one of the first touchscreen display 411 or the second touchscreen display 431.

Further, according to various embodiments, the electronic device 400 may include a plurality of cameras. One of the plurality of cameras may be the camera 413a, and another of the plurality of cameras may be installed on the fourth surface of the second housing 403 (e.g., the surface where the second touchscreen display 431 is installed). Further, according to various embodiments, the electronic device 400 may have a plurality of cameras. One of the plurality of cameras may be the camera 413a, and another of the plurality of cameras may be installed on the first surface of the first housing 401 where the camera 413a has been installed.

Figure 59:
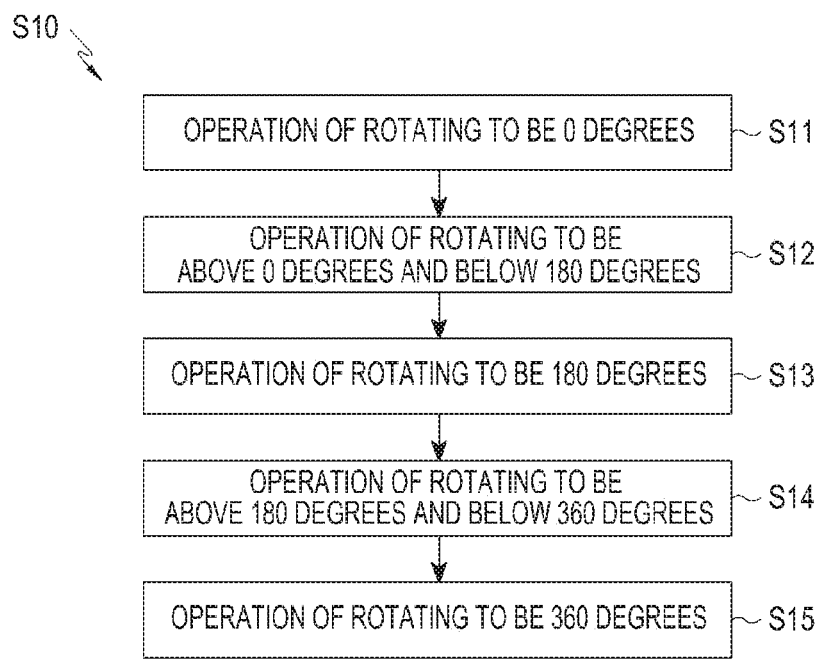
FIG. 59 is a block diagram illustrating an order in which a first and second housing of an electronic device are rotated according to an embodiment of the disclosure.
Figure 60:
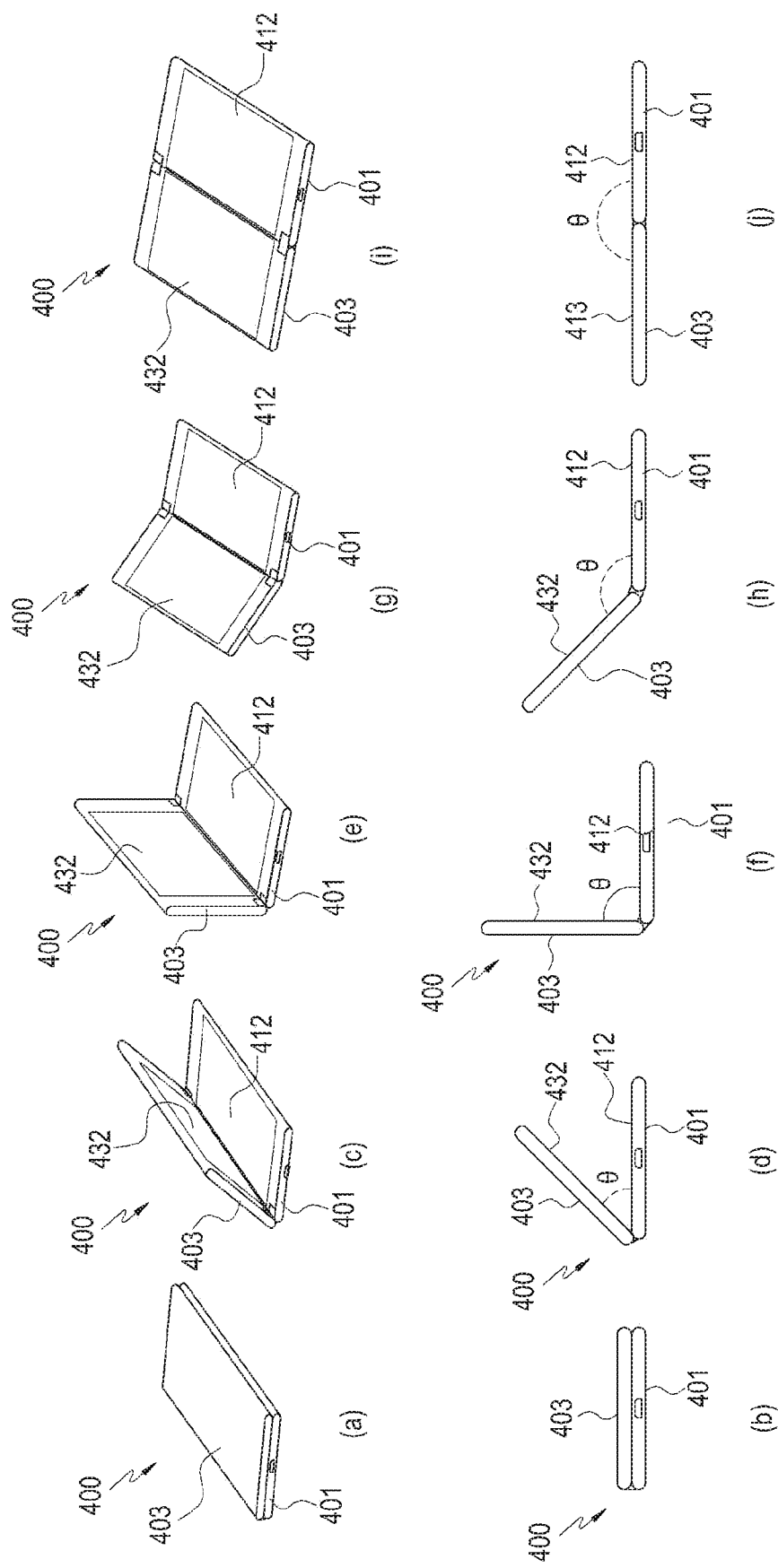
FIG. 60 is a perspective view illustrating an example in which a first and second housing of an electronic device are rotated from 0 degrees to 180 degrees according to an embodiment of the disclosure.
Figure 61:
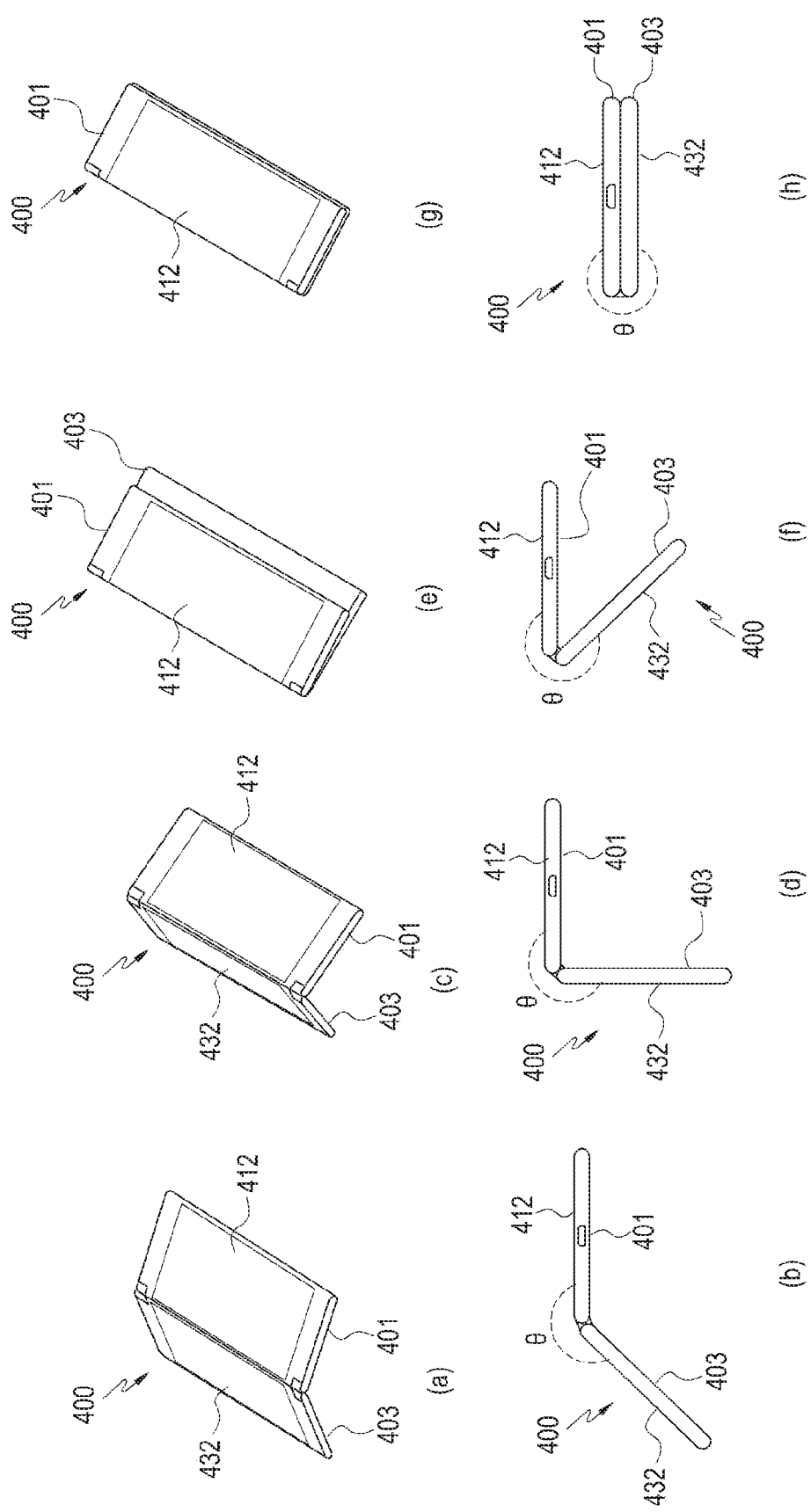
FIG. 61 is a perspective view illustrating an example in which a first and second housing of an electronic device are rotated from 180 degrees to 360 degrees according to an embodiment of the disclosure.

FIG. 59 is a block diagram illustrating the order in which the first and second housing of an electronic device are rotated according to an embodiment of the disclosure. FIG. 60 is a perspective view illustrating an example in which the first and second housing of an electronic device are rotated from 0 degrees to 180 degrees according to an embodiment of the disclosure. FIG. 61 is a perspective view illustrating an example in which the first and second housing of an electronic device are rotated from 180 degrees to 360 degrees according to an embodiment of the disclosure.

Referring to FIGS. 59 to 61, the first and second housings 401 and 403 may be rotated to be angled from 0 degrees to 360 degrees therebetween and may remain in the rotated position. The operation S10 of rotating the first and second housings 401 and 403 may include the operation S11 of rotating so that the angle between the first housing 401 and the second housing 403 is 0 degrees, the operation S12 of rotating so that the angle between the first housing 401 and the second housing 403 exceeds 0 degrees but is less than 180 degrees, the operation S13 of rotating so that the angle between the first housing 401 and the second housing 403 is 180 degrees, the operation S14 of rotating so that the angle between the first housing 401 and the second housing 403 exceeds 180 degrees but is less than 360 degrees, and the operation S15 of rotating so that the angle between the first housing 401 and the second housing 403 is 360 degrees.

First, in the operation S11 of rotating so that the angle is 0 degrees, the first and second housings 401 and 403 allow the first touchscreen display 412 and the second touchscreen display 432 to contact each other as shown in FIGS. 60a and 60b, protecting the first and second touchscreen displays 412 and 432 from the outside. In other words, the first hinge structure and the second hinge structure may permit the first housing 401 and the second housing 430 to rotate relative to each other, subjecting the first housing 401 and the second housing 403 to be in the first state.

In the operation S12 of rotating so that the angle exceeds 0 degrees but is less than 180 degrees, either the first housing 401 or the second housing 403 may be placed on the user's lap (or a desk) as shown in FIGS. 60c to 60h, allowing either the first or second touchscreen display 412 or 432 to display screen. When the second housing 403 is placed on the user's lap, the second touchscreen display 432 of the second housing 403 may be implemented as a keypad.

In the operation S13 of rotating so that the angle between the first housing 401 and the second housing 403 is 180 degrees, the first housing 401 and the second housing 403 may be rotated to be angled at 180 degrees therebetween to allow for the continuous display of the screen on the first and second flexible displays which are made curved, as shown in FIGS. 60i and 60j. Here, "180 degrees" may mean the middle point between the first state and the second state. At the middle point, the first surface and the third surface may together form the first plane, and the second surface and the fourth space may together form the second plane. One screen implemented by the first and second touchscreen displays may be displayed on the first plane, and the second plane may correspond to a surface on which the electronic device is propped up.

In the operation S14 of rotating so that the angle between the first housing 401 and the second housing 403 exceeds 180 degrees but is less than 360 degrees, the first and second housings 401 and 403 are rotated to allow the first and second touchscreen displays 412 and 432 to be mounted, exposed to the outside, as shown in FIGS. 61a to 60f.

In the operation S15 of rotating so that the angle between the first housing 401 and the second housing 403 is 360 degrees, the first and second touchscreen displays 412 and 432 may be folded to each other to be exposed to the outside, and the size of the electronic device 401 is cut in half, as shown in FIGS. 60g and 60h, thereby allowing for the electronic device 401 enhanced portability.

As set forth above, according to various embodiments of the disclosure, an electronic device comprises a first housing including a first touchscreen display, a second housing including a second touchscreen display and rotatably coupled with the first housing, and a hinge structure provided between the first housing and the second housing and coupling the first housing and the second housing to be rotatable about each other, wherein a first side surface of the first touchscreen display positioned adjacent to the hinge structure may be formed of a curved surface, and a second side surface of the second touchscreen display positioned adjacent to the hinge structure may be formed of a curved surface and faces the first side surface of the first touchscreen display.

According to various embodiments of the disclosure, the first touchscreen display or the second touchscreen display may include a window member, a touch panel, and a flexible display module. A display module of the first touchscreen display and a display module of the second touchscreen display may be positioned adjacent to each other.

Further, according to various embodiments of the disclosure, as the display module of the first touchscreen display and the display module of the second touchscreen display are positioned adjacent to each other, the gap between the first and second touchscreen displays may be reduced, allowing for the continuous display of a screen on the first and second touchscreen displays.

Further, according to various embodiments of the disclosure, the hinge structure may include a first hinge structure and a second hinge structure. The first side surface of the first touchscreen display and the second side surface of the second touchscreen display may be disposed between the first hinge structure and the second hinge structure.

Further, according to various embodiments of the disclosure, the electronic device may further comprise a flexible circuit board electrically connecting the first housing with the second housing. At least part of the flexible circuit board may be received in the hinge structure and be bent or unfolded when the first housing and the second housing are rotated about each other to maintain a physical connection between the first housing and the second housing.

Further, according to various embodiments of the disclosure, the first housing may include a speaker, and the second housing may include a speaker hole corresponding to the speaker while the first housing faces the second housing.

Further, according to various embodiments of the disclosure, first magnets may be provided on an internal surface of the first housing, and when the first housing faces the second housing, second magnets corresponding to the first magnets may be provided on an internal surface of the second housing. The first magnets may attract the second magnets, allowing the first housing and the second housing to keep facing each other.

Further, according to various embodiments of the disclosure, a camera may be provided on the first surface of the first housing. An image captured by the camera may be implemented as a preview image on either the first touchscreen display or the second touchscreen display while the first housing and the second housing face each other.

Further, according to various embodiments of the disclosure, when the second housing is rotated about the first housing to be disposed parallel to the first housing, the first and second touchscreen displays may implement a single screen by merging a first image displayed on the first touchscreen display and a second image displayed on the second touchscreen display.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

The invention claimed is:

1. An electronic device, comprising:
 a first housing including a first surface and a second surface facing away from the first surface, wherein the first housing includes a first curved surface extending from the first surface to the second surface along a first periphery and a first side portion and a second side portion on the first periphery, when viewed from above the first surface, and wherein the first surface includes a first touchscreen display that includes a first flexible display extending corresponding to the first curved surface;
 a second housing including a third surface and a fourth surface facing away from the third surface, wherein the second housing includes a second curved surface extending from the third surface to the fourth surface along a second periphery and a third side portion and a fourth side portion on the second periphery extending adjacent to the first periphery, when viewed from above the third surface, and wherein the third surface includes a second touchscreen display that includes a second flexible display extending corresponding to the second curved surface;
 a first hinge structure connected with the first side portion and the third side portion;
 a second hinge structure connected with the second side portion and the fourth side portion;
 at least one processor positioned in at least one of the first housing or the second housing and electrically connected with the first touchscreen display and/or the second touchscreen display via at least one of the first hinge structure or the second hinge structure; and
 a memory positioned in at least one of the first housing or the second housing and electrically connected with the processor,
 wherein the first hinge structure and the second hinge structure allow the first housing and the second housing to rotate relative to each other between a first state and a second state,
 wherein the first surface faces the third surface in the first state, and the second surface faces the fourth surface in the second state,
 wherein the first housing is configured to rotate around a first imaginary axis formed by a first gear shaft, and the second housing is configured to rotate around a second imaginary axis formed by a second gear shaft, and
 wherein a first distance between the first imaginary axis of the first gear shaft and the second imaginary axis of the second gear shaft is larger than a second distance between a first display periphery of the first flexible display and a second display periphery of the second flexible display.

2. The electronic device of claim 1, wherein the first flexible display includes the first display periphery extending along the first periphery, and the second flexible display includes the second display periphery extending along the second periphery.

3. The electronic device of claim 2, wherein the first housing has a first thickness from the first surface to the second surface, and the second housing has a second thickness from the third surface to the fourth surface, and wherein the first imaginary axis is positioned as high as half the first thickness, and the second imaginary axis is positioned as high as half the second thickness.

4. The electronic device of claim 3, wherein a distance between the first imaginary axis and the first surface or the second surface is defined as a first radius of gyration, and wherein the first periphery of the first housing is present inside a circle with the first radius of gyration.

5. The electronic device of claim 3, wherein a distance between the second imaginary axis and the third surface or the fourth surface is defined as a second radius of gyration, and wherein the second periphery of the second housing is present inside a circle with the second radius of gyration.

6. The electronic device of claim 3, wherein a distance between the first imaginary axis and the second imaginary axis is equal to, or larger than, half the sum of the first thickness and the second thickness.

7. The electronic device of claim 1, wherein, in the first hinge structure:
the first hinge connecting part is coupled with the first housing,
the first gear includes a first gear shaft and coupled with the first hinge connecting part,
first idle gear includes a first idle gear shaft and is rotatably engaged with the first gear,
second idle gear includes a second idle gear shaft and is rotatably engaged with the first idle gear,
second gear includes a second gear shaft and is rotatably engaged with the second idle gear,
second hinge connecting part is coupled with each of the second housing and the second gear,
each of the first support and the second support has a plurality of holes through which the first gear shaft, the second gear shaft, the first idle gear shaft, and the second idle gear shaft are inserted and rotatably supports the first gear, the second gear, the first idle gear, and the second idle gear,
the first hinge housing receives the first gear, the second gear, the first idle gear, the second idle gear, and the first and second supports, and
an elastic member is received in the first hinge housing, penetrated by the first gear shaft and the second gear shaft, and pressurizes the first and second supports.

8. The electronic device of claim 7, wherein the first housing is rotated along with the first gear, and the second housing is rotated along with the second gear, and wherein as the first gear is rotated along with the second gear, rotation of the first housing about the second housing is interoperated with rotation of the second housing about the first housing.

9. The electronic device of claim 7, wherein, in the second hinge structure:
the third hinge connecting part is coupled with the second housing,
the third gear includes a third gear shaft and coupled with the third hinge connecting part,
the third idle gear includes a third idle gear shaft and is rotatably engaged with the third gear,
the fourth idle gear includes a fourth idle gear shaft and is rotatably engaged with h the third idle gear,
the fourth gear includes a fourth gear shaft and is rotatably engaged with the fourth idle gear,
the fourth hinge connecting part is coupled with each of the fourth housing and the fourth gear,
each of the third support and the fourth support has a plurality of holes through which the third gear shaft, the fourth gear shaft, the third idle gear shaft, and the fourth idle gear shaft are inserted and rotatably supports the third gear, the fourth gear, the third idle gear, and the fourth idle gear,
the second hinge housing receives the third gear, the fourth gear, the third idle gear, the fourth idle gear, and the third and fourth supports, and
an elastic member is received in the second hinge housing, penetrated by the third gear shaft and the fourth gear shaft, and pressurizes the third and fourth supports.

10. The electronic device of claim 1, wherein the first housing further includes a third curved surface positioned opposite the first curved surface, and the second housing further includes a fourth curved surface positioned opposite the second curved surface, and wherein the first curved surface and the third curved surface have substantially the same curvature, and the second curved surface and the fourth curved surface have substantially the same curvature.

11. An electronic device, comprising:
a first housing including a first surface and a second surface facing away from the first surface, wherein the first housing includes a first curved surface extending from the first surface to the second surface along a first periphery and a first side portion and a second side portion on the first periphery, when viewed from above the first surface, and wherein the first surface includes a first touchscreen display that includes a first flexible display extending corresponding to the first curved surface;
a second housing including a third surface and a fourth surface facing away from the third surface, wherein the second housing includes a second curved surface extending from the third surface to the fourth surface along a second periphery and a third side portion and a fourth side portion on the second periphery extending adjacent to the first periphery, when viewed from above the third surface, and wherein the third surface includes a second touchscreen display that includes a second flexible display extending corresponding to the second curved surface; and
a hinge structure provided between the first housing and the second housing and coupling the first housing and the second housing so as to be rotatable about each other,
wherein a first side surface of the first touchscreen display positioned adjacent to the hinge structure is formed of a curved surface, and a second side surface of the second touchscreen display positioned adjacent to the hinge structure is formed of a curved surface and faces the first side surface of the first touchscreen display,
wherein the first housing is configured to rotate around a first imaginary axis formed by a first gear shaft, and the second housing is configured to rotate around a second imaginary axis formed by a second gear shaft, and
wherein a first distance between the first imaginary axis of the first gear shaft and the second imaginary axis of the second gear shaft is larger than a second distance between a first display periphery of the first flexible display and a second display periphery of the second flexible display.

12. The electronic device of claim 11, wherein the hinge structure includes a first hinge structure and a second hinge structure, and wherein the first side surface of the first touchscreen display and the second side surface of the second touchscreen display are disposed between the first hinge structure and the second hinge structure.

13. The electronic device of claim 11, further comprising a flexible circuit board electrically connecting the first housing with the second housing, wherein at least part of the flexible circuit board is received in the hinge structure and is bent or unfolded when the first housing and the second housing are rotated about each other to maintain a physical connection between the first housing and the second housing.

14. The electronic device of claim 11, wherein the first housing includes a speaker, and the second housing includes a speaker hole corresponding to the speaker while the first housing faces the second housing.

* * * * *